(12) United States Patent
Moy

(10) Patent No.: US 12,293,161 B2
(45) Date of Patent: May 6, 2025

(54) SYSTEMS AND METHODS FOR PROVIDING REAL-TIME AUTOMATED LANGUAGE TRANSLATIONS

(71) Applicant: VONAGE BUSINESS INC., Holmdel, NJ (US)

(72) Inventor: Tony Chan Sion Moy, Santa Clara, CA (US)

(73) Assignee: Vonage Business Inc., Holmdel, NJ (US)

(*) Notice: Subject to any disclaimer, the term of this patent is extended or adjusted under 35 U.S.C. 154(b) by 271 days.

(21) Appl. No.: 17/952,188

(22) Filed: Sep. 23, 2022

(65) Prior Publication Data

US 2023/0096543 A1    Mar. 30, 2023

Related U.S. Application Data

(60) Provisional application No. 63/248,152, filed on Sep. 24, 2021.

(51) Int. Cl.
| | |
|---|---|
| G06F 40/58 | (2020.01) |
| G10L 13/02 | (2013.01) |
| G10L 15/22 | (2006.01) |
| G10L 15/26 | (2006.01) |
| G10L 25/57 | (2013.01) |

(52) U.S. Cl.
CPC ............. *G06F 40/58* (2020.01); *G10L 13/02* (2013.01); *G10L 15/22* (2013.01); *G10L 15/26* (2013.01); *G10L 25/57* (2013.01)

(58) Field of Classification Search
None
See application file for complete search history.

(56) References Cited

U.S. PATENT DOCUMENTS

| | | |
|---|---|---|
| 6,816,468 B1 | 11/2004 | Cruickshank |
| 9,569,431 B2 | 2/2017 | Uszkoreit et al. |
| 2002/0161578 A1 | 10/2002 | Saindon et al. |
| 2008/0300852 A1 | 12/2008 | Johnson et al. |
| 2009/0125295 A1 | 5/2009 | Drewes |
| 2011/0246172 A1 | 10/2011 | Liberman et al. |
| 2012/0078609 A1 | 3/2012 | Chaturvedi et al. |
| 2012/0206497 A1* | 8/2012 | Sarjanoja ............. G06F 3/0481 345/672 |
| 2015/0347399 A1* | 12/2015 | Aue ....................... H04M 3/42 704/2 |
| 2015/0356077 A1 | 12/2015 | Kristjansson et al. |
| 2017/0011740 A1* | 1/2017 | Gauci .................. G06F 40/169 |
| 2019/0273767 A1 | 9/2019 | Nelson et al. |
| 2020/0169591 A1* | 5/2020 | Ingel ..................... G10L 13/08 |

(Continued)

OTHER PUBLICATIONS

International Preliminary Report on Patentability for PCT/US2022/044628 mailed Mar. 26, 2024.

(Continued)

*Primary Examiner* — Antim G Shah
(74) *Attorney, Agent, or Firm* — FisherBroyles, LLP; Joseph Pagnotta

(57) ABSTRACT

Systems and methods for providing one-to-one and audio and video calls or for providing multi-party audio or video conferences also provide language translation services. When language translation services are provided, a party to a call or conference hears both the audio of the speaker, and a translated version of the speaker's audio.

18 Claims, 44 Drawing Sheets

(56) References Cited

U.S. PATENT DOCUMENTS

| | | |
|---|---|---|
| 2021/0264118 A1 | 8/2021 | Alwell et al. |
| 2022/0105389 A1* | 4/2022 | Lianides ............ A63B 24/0075 |
| 2022/0199086 A1* | 6/2022 | Liu ...................... G06F 40/279 |

OTHER PUBLICATIONS

International Search Report dated Jan. 12, 2023 for PCT/US2022/044628.

Written Opinion dated Jan. 12, 2023 for PCT/US2022/044628.

* cited by examiner

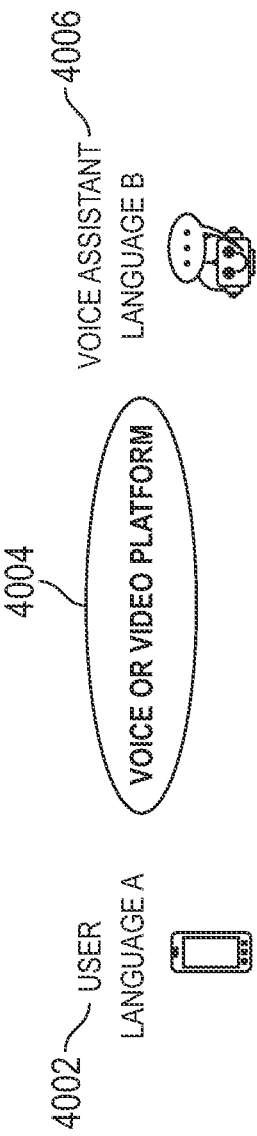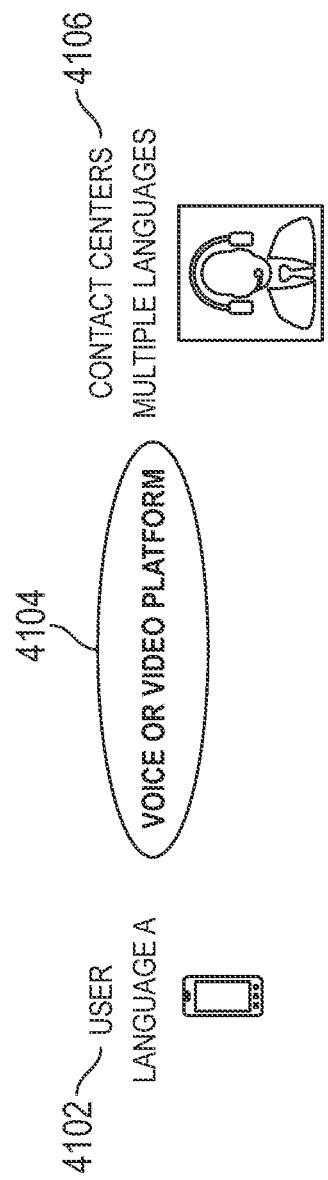

SYSTEMS AND METHODS FOR PROVIDING REAL-TIME AUTOMATED LANGUAGE TRANSLATIONS

This application claims priority to the Sep. 24, 2021 filing date of U.S. Provisional Patent Application No. 63/248,152, the contents of which are incorporated herein by reference.

BACKGROUND OF THE INVENTION

Real-time communications has been an essential aspect of maintaining human interaction as distances between people have grown, yet the desire to stay connected globally has increased. Additionally, the inherent challenges of connecting people who speak different languages has impacted the ability to provide real-time communications, whether the communications environment be one-to-one, one-to-many, Multiple Presenters to an Audience, or other similar communications scenarios.

When two or more individuals that speak different languages are attempting to communicate with one another, it is usually necessary to provide language translations to facilitate the conversation. Typically, a first person speaking a first language will speak to the conclusion of a complete sentence or thought, and then allow such speech to be translated into a second language so that a second person speaking the second language will understand what the first person said. The second person will then respond in the second language, then wait for that response to be translated into the first language so that the first person will understand the response. The pauses that are introduced into the conversation by the need to obtain and deliver translations creates an unnatural communications experience.

Automated language translation systems that do not require a live translator exist and can be used to facilitate a conversation between two individuals that speak different languages. In particular, such automated language translation systems can be employed in electronic communications such as conference calls and video conferences. When such automated language translation systems are used in an electronic communication, the language translation system typically provides each participant to the communication with a control button (or a similar control) that the participant can use to control when a translation of their speech will be created and provided to the other participants. Thus, a first person will activate their control button just before they begin speaking to alert the translation system that the speech that follows is to be translated into a second language. When the first person finishes a sentence or thought, the speaker will pause and release the control button. The translation system then translates the input speech into a second language and delivers the translated speech to one or more participants that speak the second language. Proceeding in this fashion allows each participant to maintain a degree of control over how and when the language translations are generated and delivered to other participants to the communication. However, this type of half-duplex channel management removes or delays the spontaneity of true real-time communications.

It would be desirable for automated language translations systems that are used in conjunction with electronic communications such as conference calls and video conferences to provide for a more natural feeling real-time communication experience. In particular, it would be helpful if automated language translation systems could generate and deliver translations of what each participant says during an electronic communication in real-time or near real-time so that there is little to no delay between when a first individual speaking a first language begins speaking and when other participants that speak a second language begin receiving translation of what the first individual is saying. Proceeding in that fashion would provide a far more natural feeling conversation that is facilitated by language translations.

BRIEF DESCRIPTION OF THE DRAWINGS

FIG. 28 is a diagram illustrating how voice activity detection of a communication session works for barge-in.

FIG. 40 is a diagram associated with the detailed description of the signal flow of a call connected to a voice assistant service in which language translation services are provided.

FIG. 41 is a diagram associated with the detailed description of the signal flow of a call connected to a contact center in which language translation services are provided.

DETAILED DESCRIPTION OF PREFERRED EMBODIMENTS

Figure 1:
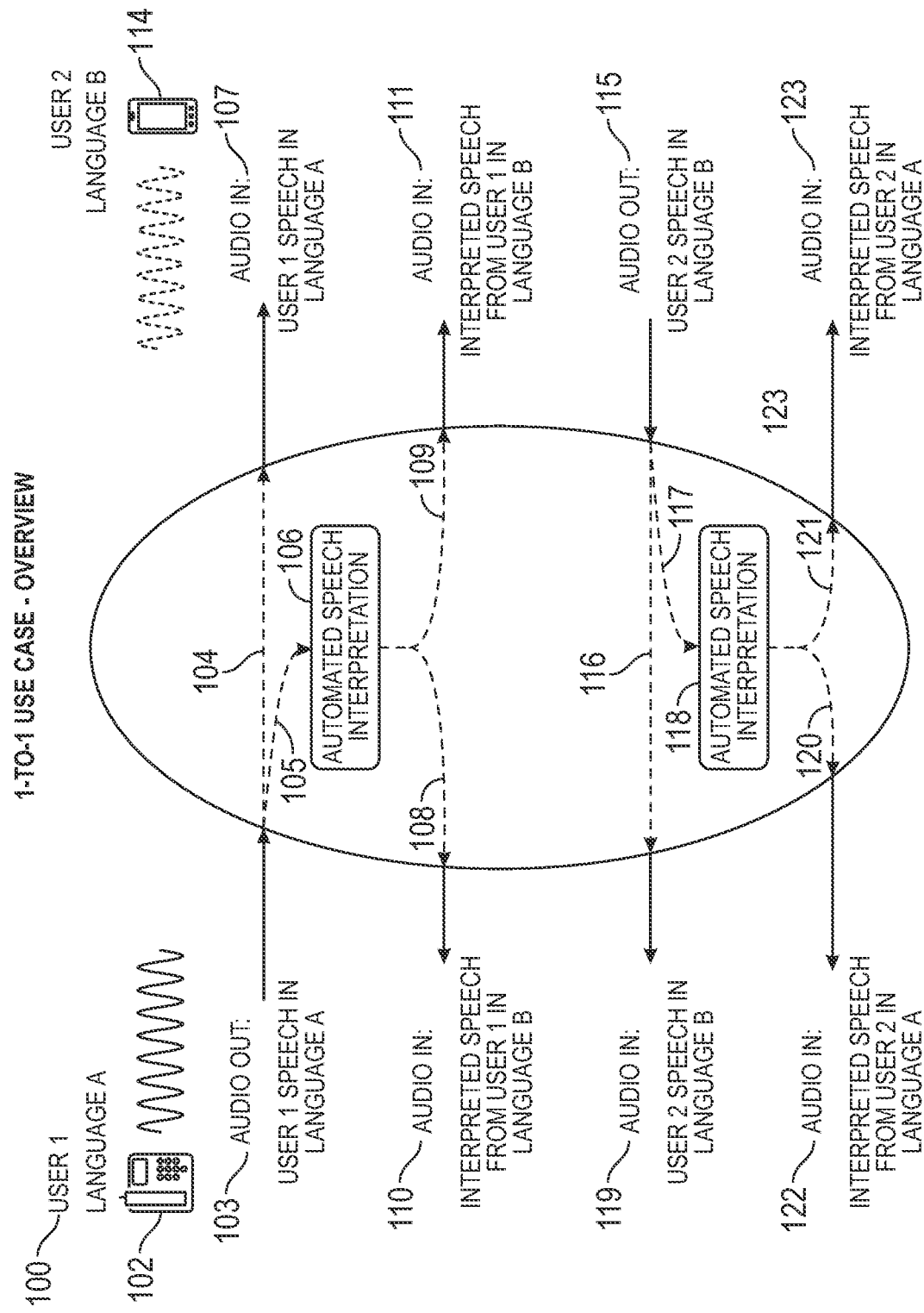
FIG. 1 is a diagram illustrating the flow of audio for a one-to-one audio telephone call with language translation services.

The following detailed description of preferred embodiments refers to the accompanying drawings, which illustrate specific embodiments of the invention. Other embodiments having different structures and operations do not depart from the scope of the present invention.

The following descriptions refer to language "translations" and "interpretations." Both of those terms are intended to refer to the essentially the same thing, which is taking speech provided in a first language and converting it to speech in a second language.

The following description also makes references to "telephony devices" and "devices" and "user devices". All of these terms are intended to refer to and include any device which an individual could use to conduct a telephone call, a video call, a video conference, or virtually any sort of communication in which voice, text and/or video is used to conduct the communication.

The systems and methods described in the present application provide for live voice or video calls between people speaking different languages. Language translations are provided, as necessary, so that each participant can understand that the other participants are saying. Voice and video calls may be one-to-one, as between first and second participants who speak first and second languages, respectively. Voice and video calls may also be between three or more participants that speak different languages. Further, voice or video calls could be structured as one-to-many, where the speech of a first participant is translated into one or more different languages, and the translations are provided to the other participants.

In the disclosed systems and methods, speech from anyone who speaks is automatically translated into the language or languages used by the other parties, and the translations are automatically provided to the proper parties. Anyone may speak at any time without the need to press and/or release a control button, or otherwise actively invoke speech translation operations.

No special equipment is needed for the participants. That is, participants use their usual devices which may include but are not limited to smartphones, cellular telephones, landline telephones, VoIP telephones, video telephone as well as any sort of computing device running a telephony or video conferencing software application. Any and all sorts of audio and video devices that capture and playback audio and video can be used in connection with the disclosed systems and methods. All such user devices can be connected to a system embodying the disclosed technology via conventional means, such as via a wired or wireless network, via a cellular connection or via other means.

Systems and methods embodying the disclosed technology can provide both audio/video versions and written transcripts of input original speech/video and interpreted/translated speech/video.

Systems and methods embodying the disclosed technology can be used in normal interpersonal communications, as well as other communications scenarios. Thus, systems and methods embodying the disclosed technology could be used in connection with emergency calling, food ordering, car rental, hotel booking, tourist assistance, restaurant table ordering, front desk assistance, government services, dating services, customer support, education, learning, schools, logistics, health, finance, hospitality, transportation, retail, tv/radio broadcasting, conferences, trade show events, government entities speeches as well as virtually any other scenario where individuals are attempting to communicate with one another.

The following descriptions, which make references to the drawing figures, discuss various different communications scenarios. The signal paths between elements of systems embodying the disclosed technology are discussed. Also, the way in which the disclosed systems and methods go about obtaining speech/video from communication participants and the way in which the obtained speech/video is translated to other languages and provided to various participants also is discussed.

FIG. 1: One-to-One Use Case

FIG. 1 illustrates a one-to-one voice call with automated language translation.

User 1 100 speaks language A using their existing telephony device 102. The audio out [103] from that telephony device 102 is duplicated into two transmissions, one [104] transmission forwarded to the other user 112, one [105] forwarded to the automated speech interpretation module 106. User 1's voice is forwarded as [107] audio to user 2 112 via user 2's telephony device 114. The automated speech interpretation module 106, translates user 1's input speech [105] into a second language B, and the translated speech is sent as two transmissions to [108] user 1's telephony device 102 and to [109] user 2's telephony device 114. User 1 hears the [110] translation into language B and user 2 hears the same translation [111] into language B.

User 2 112 speaks language B into their telephony device 114. The [115] audio out from that telephony device 114 is duplicated into two transmissions, one [116] transmission forwarded to the first user 100, one [117] forwarded to the automated speech interpretation module 118. User 2's voice is forwarded as [119] audio into user 1's telephony device 102. Thus, user 1 hears user 2 speaking in language B. Also, the automated speech interpretation module 118 translates user 2's speech into language A. The interpreted speech is sent as two transmissions to [120] user 1 and to [121] user 2. User 1 hears User 2's speech [122] interpreted into language A, and user 2 hears the same speech [123] interpreted into language A.

In some embodiments, separate automated speech interpretation modules 106 and 118 may be used for to translate the speech provided by user 1 and user 2. In other embodiments, there may be only a single speech interpretation module that handles the translations of each user's speech into a different language.

In this one-to-one communication scenario, both users may speak at any time, including at the same time. However for the best experience, only one user should speak at a time, and neither user should speak when interpreted speech is heard.

Note that in this scenario, both the first and the second user hear both what each party originally says, and both of the translations. Thus, user 1 100 hears user 2' 112 original speech in language B and the translation of user 2's speech into language A. Likewise, user 2 hears user 1's speech in language A, and the translation of user 1's speech into language B.

Figure 2:
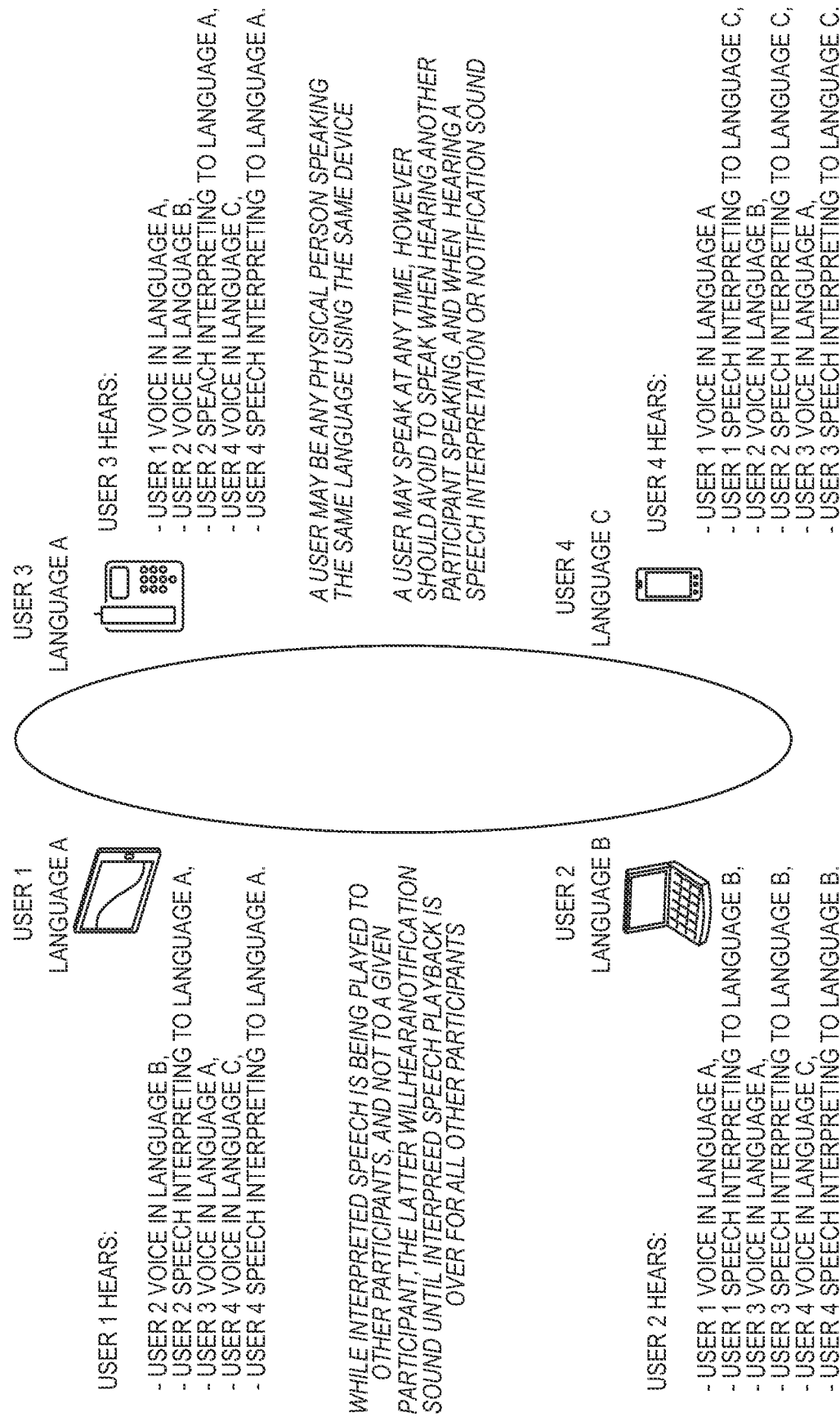
FIG. 2 is a diagram listing what individual parties to a multi-party audio or video conference hear when language translation services are provided.

FIG. 2: Multi-Party Use Case—Overview

FIG. 2 illustrates how a multi-party voice or video call interaction happens. FIG. 2 should be viewed in conjunction with FIG. 5 and its corresponding written description below.

Figure 3:
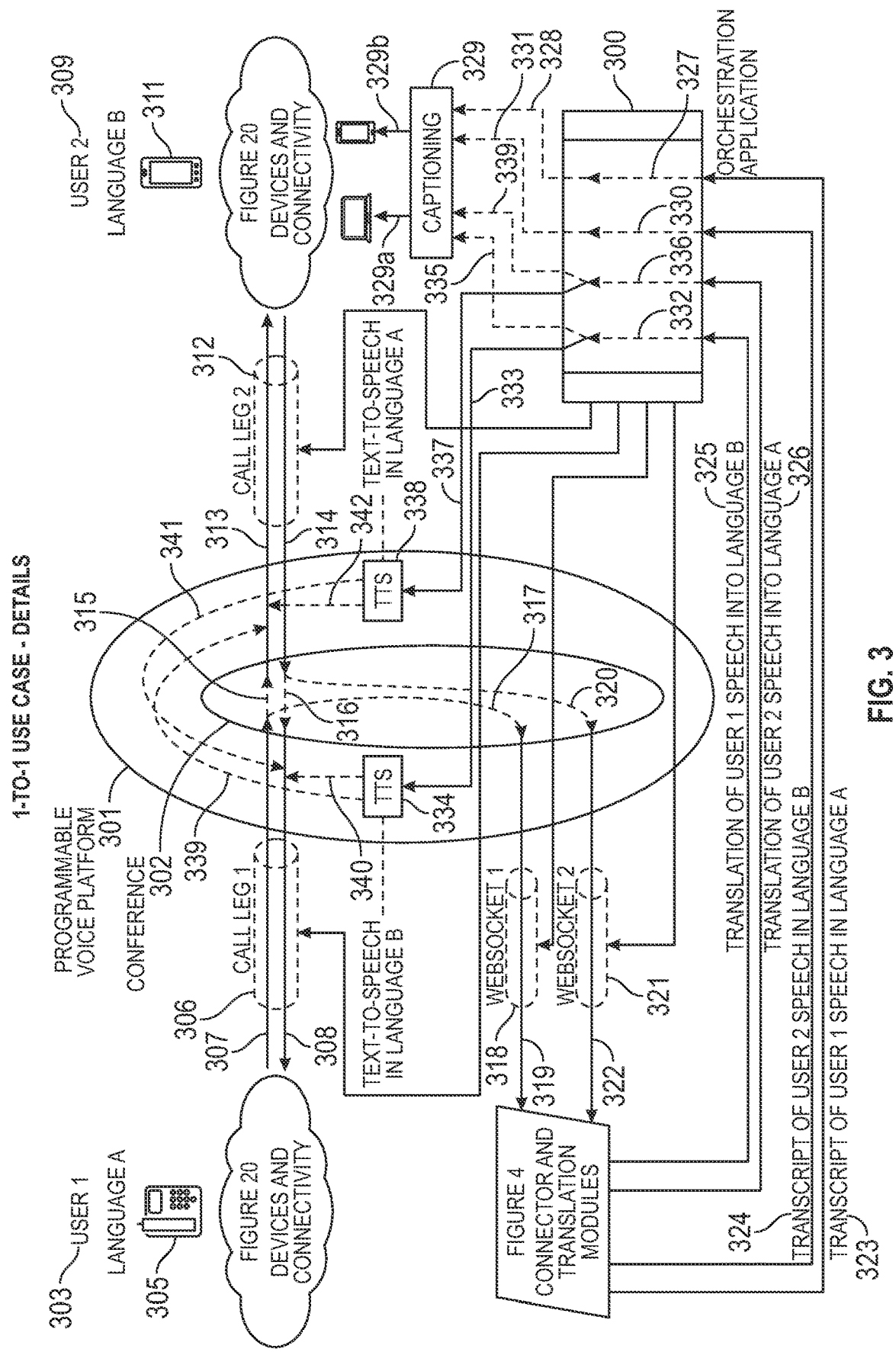
FIG. 3 is a diagram illustrating the signal flow of a one-to-one audio telephone call of FIG. 1 with language translation services.

FIG. 3: One-to-One Use Case—Details

FIG. 3 illustrates details on how a one-to-one voice call interaction happens. A user can be one or more physical persons speaking the same language using a device.

When a user wishes to initiate a language translation assisted communication session, the user may:
  hear a custom greeting,
  interact with an IVR (Interactive Voice Response System) to allow the user to select their native language,
  be prompted to enter or select the other party's language and contact information, such as a telephone number, and
  hear an announcement explaining that the call will have an automated real-time translations of each other's speech.

During the call, either user may speak at any time in their native language. When the first user speaks, the second user will hear the original speech of the first user, followed by an automated interpretation of the first user's speech to the second user's native language. The first user will also hear the interpretation of his speech into the second user's language. Similarly, when the second user speaks the first user will hear the second user's speech in the second user's native language, followed by a translation of the second user's speech in to the first user's native language. The second user will also hear the translation of his speech into the first user's native language.

There are no restrictions on when either user may speak, it will not affect the system operation. In practice, it is helpful if each user speaks only when the other user is not speaking, or when an interpreted speech is one being played to both users.

WebSocket technology is used extensively in the disclosed systems and methods to process media. WebSocket is a computer communications protocol, providing full-duplex communication channels over a single TCP connection. The WebSocket protocol was standardized by the IETF as RFC 6455 in 2011.

Figure 4:
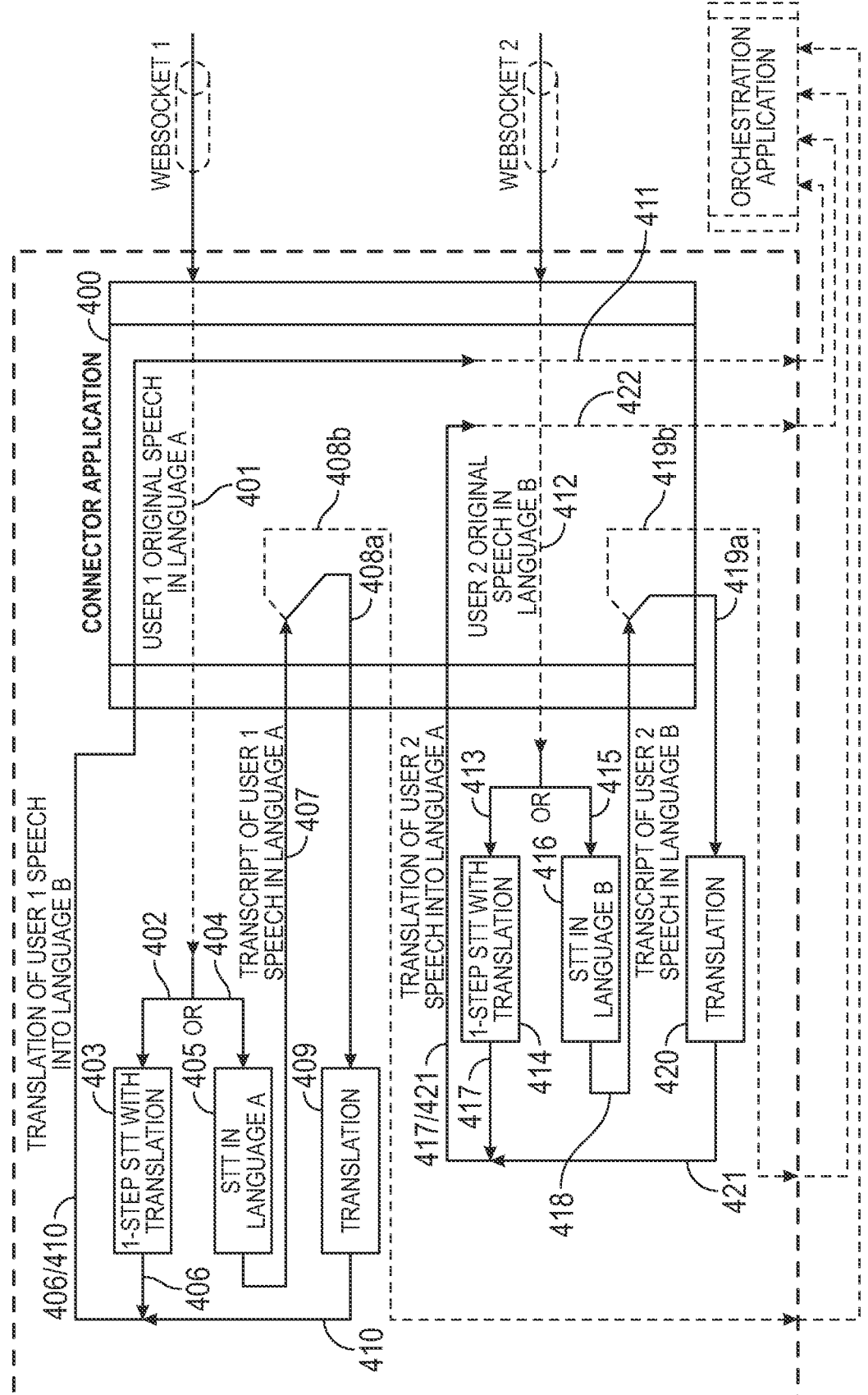
FIG. 4 illustrates additional details about the signal flow of the one-to-one audio telephone call with language translation services that is illustrated in FIG. 3 and in FIG. 21.

With reference to FIG. 3, An orchestration application 300 will be:
  using the programmable voice platform 301 and its conference sub component 302 to handle the establishment of [306] [312] call legs with both users, and the [318] [321] WebSockets to the connector and translation modules illustrated in FIG. 4, handling transcripts of original speeches, translations, text-to-speech for interpreting speech playback, and passing transcripts of original speeches and translations text to an optional captioning module 329.

As illustrated in FIG. 3, User 1 303 speaks [304] language A using their own existing telephony device 305. A [306] call leg is established between that telephony device 305 and the conference 302, with [307] audio out from the telephony device 305 and [308] audio in to that telephony device 305. User 2 309 speaks [310] language B using their own existing telephony device 311. A [312] call leg is established between that telephony 311 device and the conference 302, with [313] audio in to that telephony device 311 and [314] audio out from that telephony device 311. [315] Audio from user 1 is forwarded to user 2. [316] Audio from user 2 is forwarded to user 1. [317] Audio from user 1 is also forwarded to [318] WebSocket 1. WebSocket 1 transmits only the audio from user 1 and not from any other audio source. The Connector and Translation modules (discussed in detail in FIG. 4 and the corresponding written description) receive the [319] audio from user 1. [320] Audio from user 2 is also forwarded to [321] WebSocket 2. WebSocket 2 transmits only the audio from user 2 and not from any other audio source.

The connector and translation modules illustrated in FIG. 4 receive the [322] audio from user 2. The connector and translation modules forward to the orchestration application 300 a [323] transcript of user 1 speech in language A, a [324] transcript of user 2 speech in language B, a [325] translation of user 1 speech into language B, and a [326] translation of user 2 speech into language A.

The orchestration application 300 forwards the [327] transcript of user 1 speech in language A [328] to the optional captioning module 329 that will serve client applications and devices requesting captioning. The orchestration application 300 forwards the [330] transcript of user 2 speech in language B [331] to the captioning module 329. The orchestration application 300 forwards the [332] translation of user 1 speech into language B [333] to a first Text-to-Speech (TTS) module 334, and forwards the translation [335] to the captioning module 329. The orchestration application 300 forwards the [336] translation of user 2 speech into language A [337] to a second TTS module 338, and forwards the translation [339] to the captioning module 329.

The resulting Text-to-Speech audio translation in language B is played to both [339] user 2 and [340] user 1. The resulting Text-to-Speech audio translation in language A is played to both [341] user 1 and [342] user 2.

FIG. 4: Connector and Translation Modules

FIG. 4 depicts the details of a connector application 400 that handles the [401] speech audio from user 1 in language A, then depending on the actual pair source language A and target language B, it sends the speech audio either [402] to the 1-step speech-to-text (STT) module 403 with translation included module, or [404] to the regular speech-to-text (STT) module 405. In the former case, the [406] translation into language B is directly available; in the latter case, the [407] transcript in language A is sent to the connector application 400, which [408a] forwards it to the translation module 409 and [408b] forwards it to the orchestration application 300.

The translation module 409 produces the [410] translation into language B. The translation into language B from either module is [411] forwarded to the orchestration application 300.

The connector application 400 handles the [412] speech audio from user 2 in language B, then depending on the actual pair source language B and target language A, it sends the speech audio either [413] to the 1-step speech-to-text (STT) module 414 with translation included module, or [415] to the regular speech-to-text (STT) module 416. In the former case, the [417] translation into language A is directly available. In the latter case, the [418] transcript in language B is sent to the connector application 400, which [419a] forwards it to the translation module 420. The translation module 420 then [419b] forwards it to the orchestration application 300. The translation module 420 produces the [421] translation into language A. The translation into language A from either module is [422] forwarded to the orchestration application 300.

Figure 5:
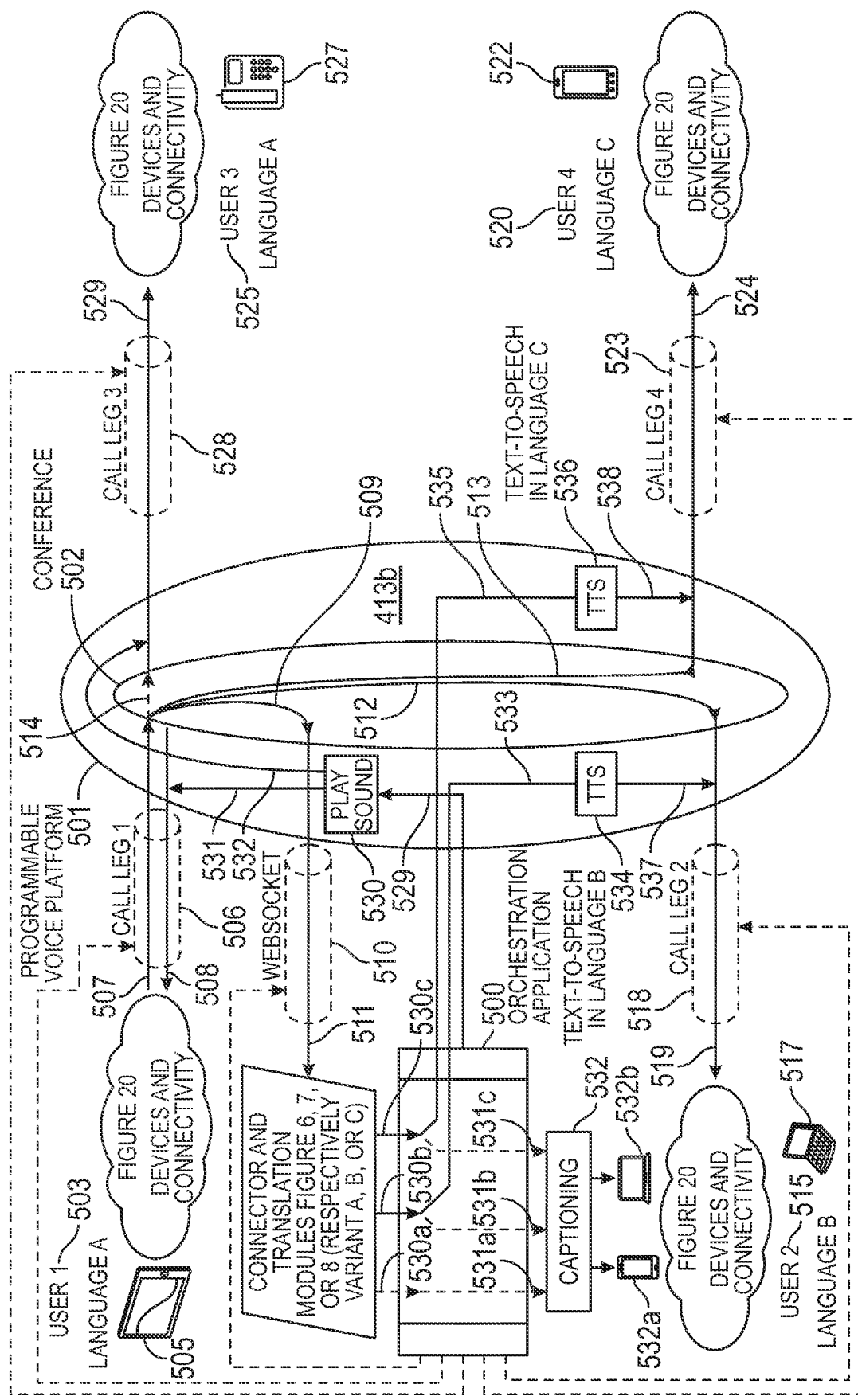
FIG. 5 illustrates the signal flow of a multi-party audio or video conference as outlined in FIG. 2 when a first user is speaking.

FIG. 5: Multi-Party Use Case—Example 1—User 1 Speaking

Figure 6:
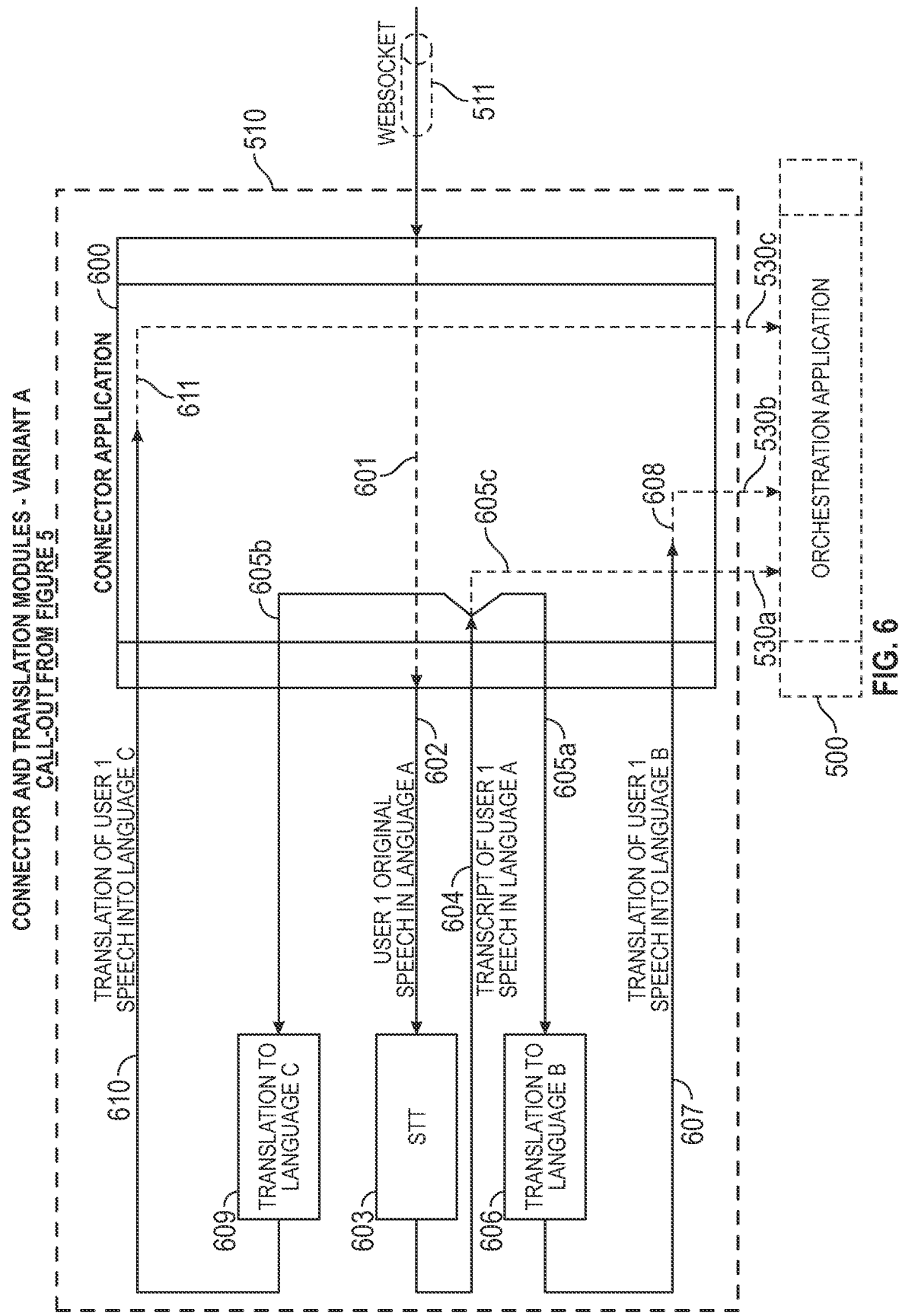
FIG. 6 illustrates details about a first variant of the signal flow of the multi-party audio or video conference outlined in FIG. 2 when a first user is speaking as illustrated in FIG. 5.
Figure 7:
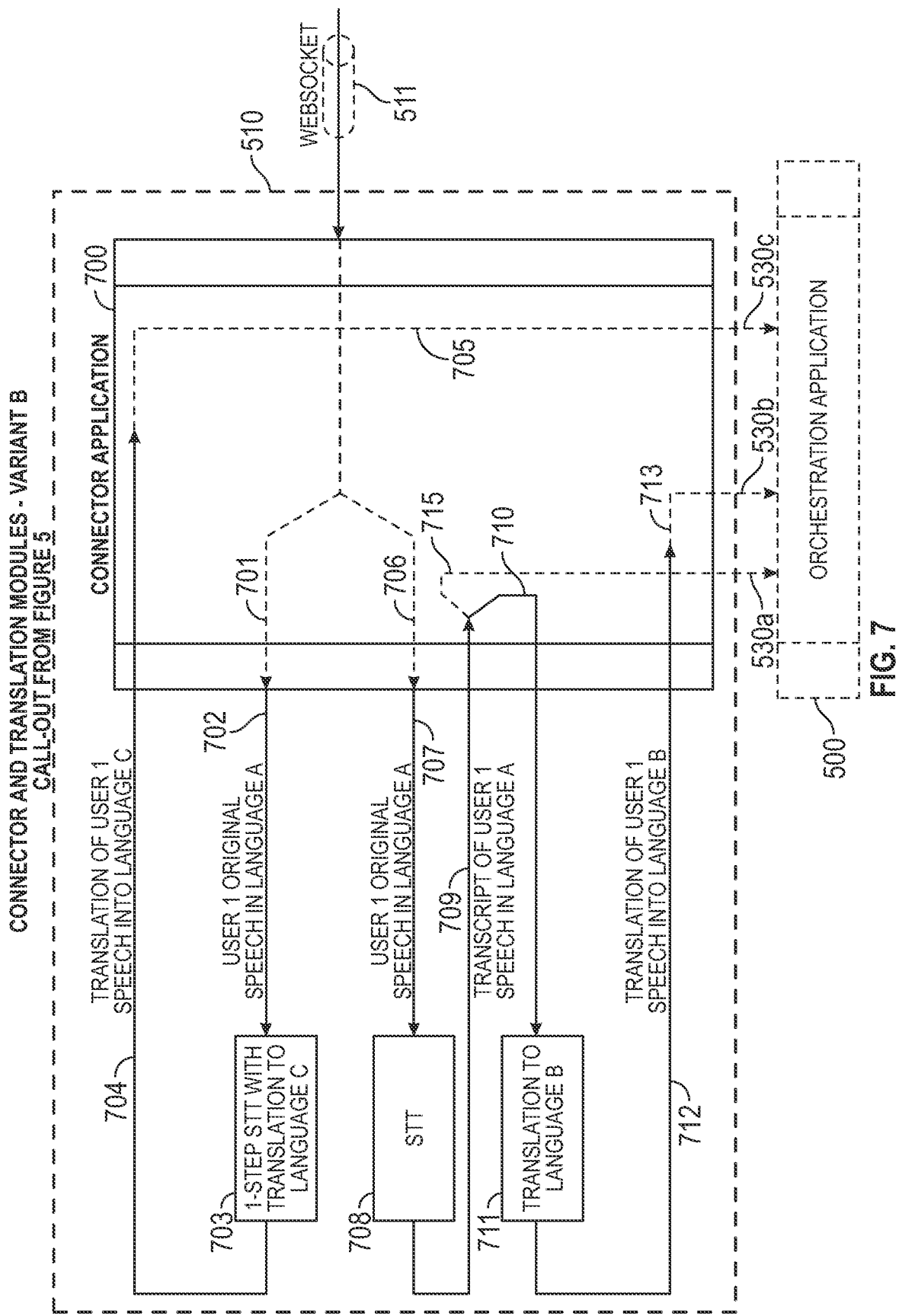
FIG. 7 illustrates details about a second variant of the signal flow of the multi-party audio or video conference outlined in FIG. 2 when a first user is speaking as illustrated in FIG. 5.
Figure 8:
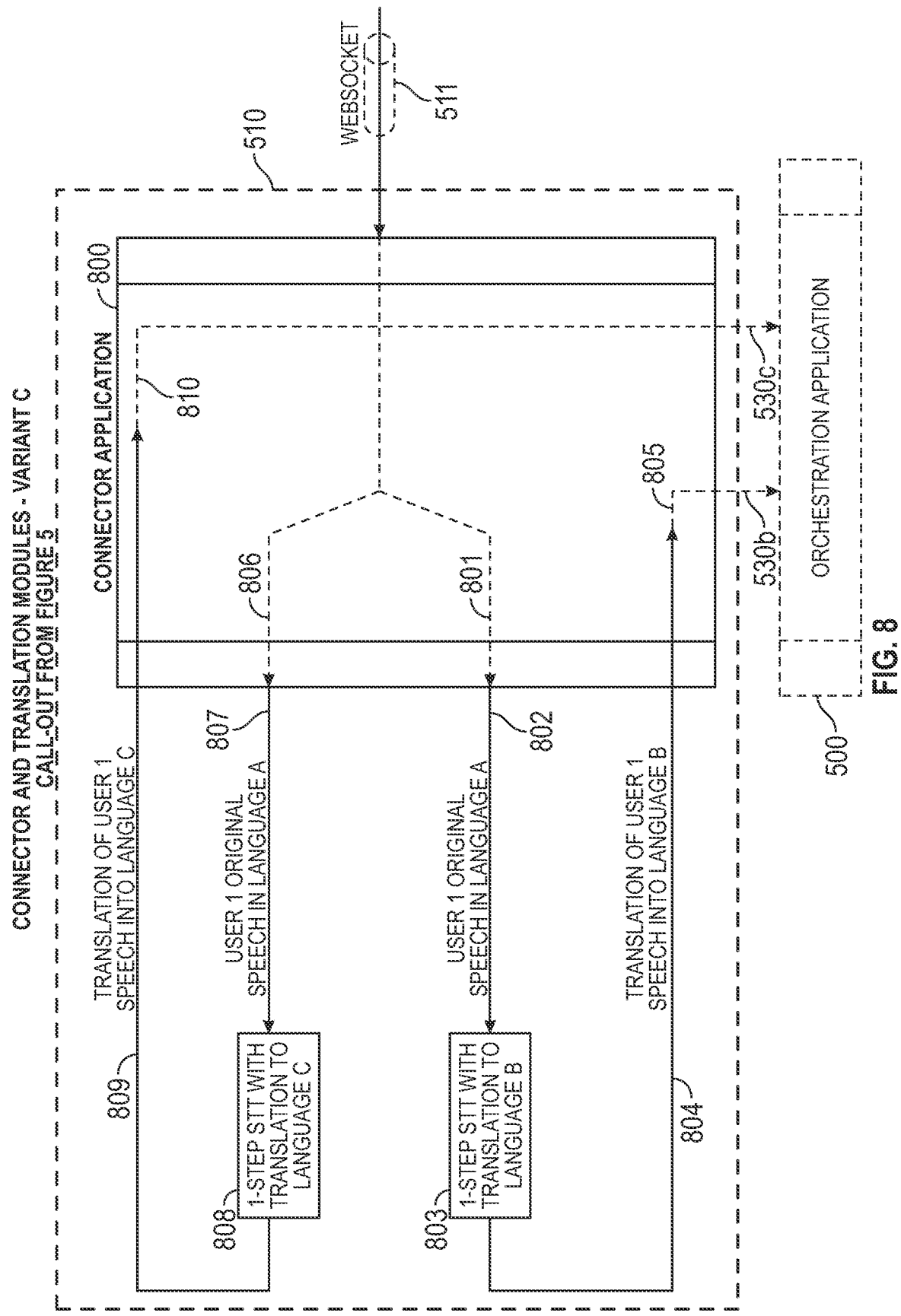
FIG. 8 illustrates details about a third variant of the signal flow of the multi-party audio or video conference outlined in FIG. 2 when a first user is speaking as illustrated in FIG. 5.

An orchestration application 500 will be:

using the programmable voice platform 501 and its conference sub component 502 to handle the establishment of [506] [518] [523] [528] call legs with multiple users, and the [510] WebSocket to the connector and translation modules illustrated in FIGS. 6-8, handling transcripts of original speeches, translations, text-to-speech for interpreting speech playback, and passing transcripts of original speeches and translated text to an optional captioning module 532.

There is one WebSocket per user call leg. But for the purpose of explaining what happens when user 1 is speaking, only one WebSocket is involved, thus only one WebSocket is shown in this diagram.

In a multi-party conference, any user may speak at any time, including at the same time as others. In this example 1, there are four users, user 1 503 and user 3 525 speak the same language A, user 2 515 speaks language B, and user 4 520 speaks language C. In this example, User 1 who speaks language A is speaking.

In example 2, which is discussed in connection with FIG. 9, there are the same users as in FIG. 5. In example 2, user 2 515 who speaks language B is speaking.

For the purposes of these examples, a user can be one or more physical persons speaking the same language using the same telephony device. In some instances, this would mean a single person using a telephony device and speaking a single language. In other instances, multiple individuals could all be using the same telephony device and speaking the same language, as would occur in a conference room or where two or more individuals are using a telephony device in speakerphone mode.

When a user initiates a language translation assisted communication he user may:

hear a custom greeting, interact with an IVR (Interactive Voice Response) application that allows the user to input or select their native language, and/or hear an announcement explaining that the call will have an automated real-time language translation of other participants' speech.

In this first example, User 1 503 speaks [504] language A using their telephony device 505, and a [506] call leg is established between that telephony device 505 and the conference 502, with [507] audio out from the telephony device 505 and [508] audio in to that telephony device 505.

[509] Audio from user 1 is forwarded to the first WebSocket 510. The first WebSocket 510 transmits only the audio from user 1 and not from any other audio source. In other words, the first WebSocket 510 is listening only to the audio from user 1 and not from any other users.

The connector and translation modules (discussed in connection with FIGS. 6-8) receive the [511] audio from user 1. Audio from user 1 is also forwarded to [512] user 2, [513] user 4, and [514] user 3.

User 2 515 speaks language B and uses their own existing telephony device 517. A [518] call leg is established between that telephony device 517 and the conference 502, with [519] audio into that telephony device 517. Of course in actual usage, there is also audio out from that device, but it is not relevant to the explanation here because only user 1 503 is speaking in this example. For that reason, audio out from telephony device 517 is omitted.

User 4 speaks language C and uses their own existing telephony device 522. A [523] call leg is established between that telephony device 522 and the conference 502, with [524] audio into that telephony device 522. Of course in actual usage, there is also audio out from that telephony device 522. But it is not relevant to the explanation here because in this example only user 1 503 is speaking. This is why that audio out is omitted.

User 3 525 speaks language A and uses their own existing telephony device 527. A [528] call leg is established between that telephony device 527 and the conference 502, with [529] audio into that telephony device 527. In actual usage, there is also audio out from that telephony device 527, but it is not relevant to the explanation here because only user 1 503 is speaking in this example. This is why that audio out is omitted.

The connector and translation modules illustrated in FIGS. 6-8 forward to the orchestration application 500 a [530a] transcript of user 1's speech in language A, a [530b] translation of user 1's speech into language B, and a [530c] translation of user 1's speech into language C. The orchestration application 500 forwards the [531a] transcript of user 1's speech in language A to the captioning module 532 that will serve [532a] [532b] client applications and devices requesting captioning. The orchestration application 500 forwards the [533] translation of user 1's speech into language B so that it can be played via a Text-to-Speech (TTS) module 534 in language B and forwards the [531b] translation text to the captioning module 532. The orchestration application 500 forwards the [535] translation of user 1's speech into language C to a Text-to-Speech (TTS) 536 so that it can be played in language C, and optionally the [531c] translation text to the captioning module 532.

The resulting Text-to-Speech audio translation in language B is played to [537] user 2. The resulting Text-to-Speech audio translation in language C is played to [538] user 4. User 3 understands the same language as user 1, so does not need to hear any translation of user 1's voice.

While translated audio speech-to-text is being played to either or both user 2 and user 4, the orchestration application 500 causes a sound generation module 530 to play a notification sound [531] to user 1 and [532] to user 3 while the translated speech is being played. If translated audio speech-to-text playback is finished for user 2, but still in progress for user 4, user 2 will also hear a notification sound until playback is over for user 4. The same is true for user 4 until playback is over for user 2.

In this example, only one user is speaking to simplify the explanations. In real usage, there are no restrictions on when any user may speak, it will not affect the system operation.

In practice, it is helpful is a user does not speak while another user is speaking, and while the user is hearing a translation of another user's speech or a notification tone indicating that translated speech is being played for another user.

FIG. 6: Connector and Translation Modules—Variant A

The connector application 600 handles the [601] speech audio from user 1 in language A and it sends [602] it to a speech-to-text (STT) module 603. The [604] transcript in language A is sent to the connector application 600 which [605a] forwards it to the translation module 606 for language B and [605b] forwards it to the translation module 609 for language C. Finally, [605c] forwards it to the orchestration application 500.

The translation module 606 produces the [607] translation into language B and sends it to the connector application 600, which in turn forwards it [608] to the orchestration application 500.

The translation module 609 produces the [610] translation into language C and sends it to the connector application 600, which in turn forwards it [611] to the orchestration application 500.

FIG. 7: Connector and Translation Modules—Variant B

The connector application 700 handles the speech audio from user 1 in language A. It creates two [701] [706] audio transmissions and sends one to a 1-step speech-to-text (STT) module 703 with translation included from language A to language C module and sends the other one to a regular speech-to-text (STT) module 708. In the former case, the [704] translation into language C is directly available; in the latter case, the [709] transcript in language A is sent to the connector application 700, which [710] forwards it to the translation to language B module 711 and [715] forwards it to the orchestration application 500.

The [704] translation into language C is received by the connector application 700, which in turn forwards it [705] to the orchestration application 500.

The translation module 711 produces the [712] translation into language B and sends it to the connector application 700, which in turn forwards it [713] to the orchestration application 500.

FIG. 8: Connector and Translation Modules—Variant C

The connector application 800 handles the speech audio from user 1 in language A. It creates two [801] [806] audio transmissions and sends [802] one to a 1-step speech-to-text (STT) module 803 with translation included from language A to language B and sends the other [807] one to a 1-step speech-to-text (STT) module 808 with translation included from language A to language C. In both cases, the translation into language B [804] and translation into language C [809] are directly available and sent to the connector application 800 which in turn forwards them [805] [810] respectively to the orchestration application 500.

In this variant, a transcript of original user 1's speech is not available. If needed, it is possible for the connector application 800 to create a third audio transmission to a speech-to-text (STT) module that would transcribe language A. Alternatively, the 1-step speech-to-text (STT) with translation included module may also produce the transcripts of original speech in addition to the translation text.

Figure 9:
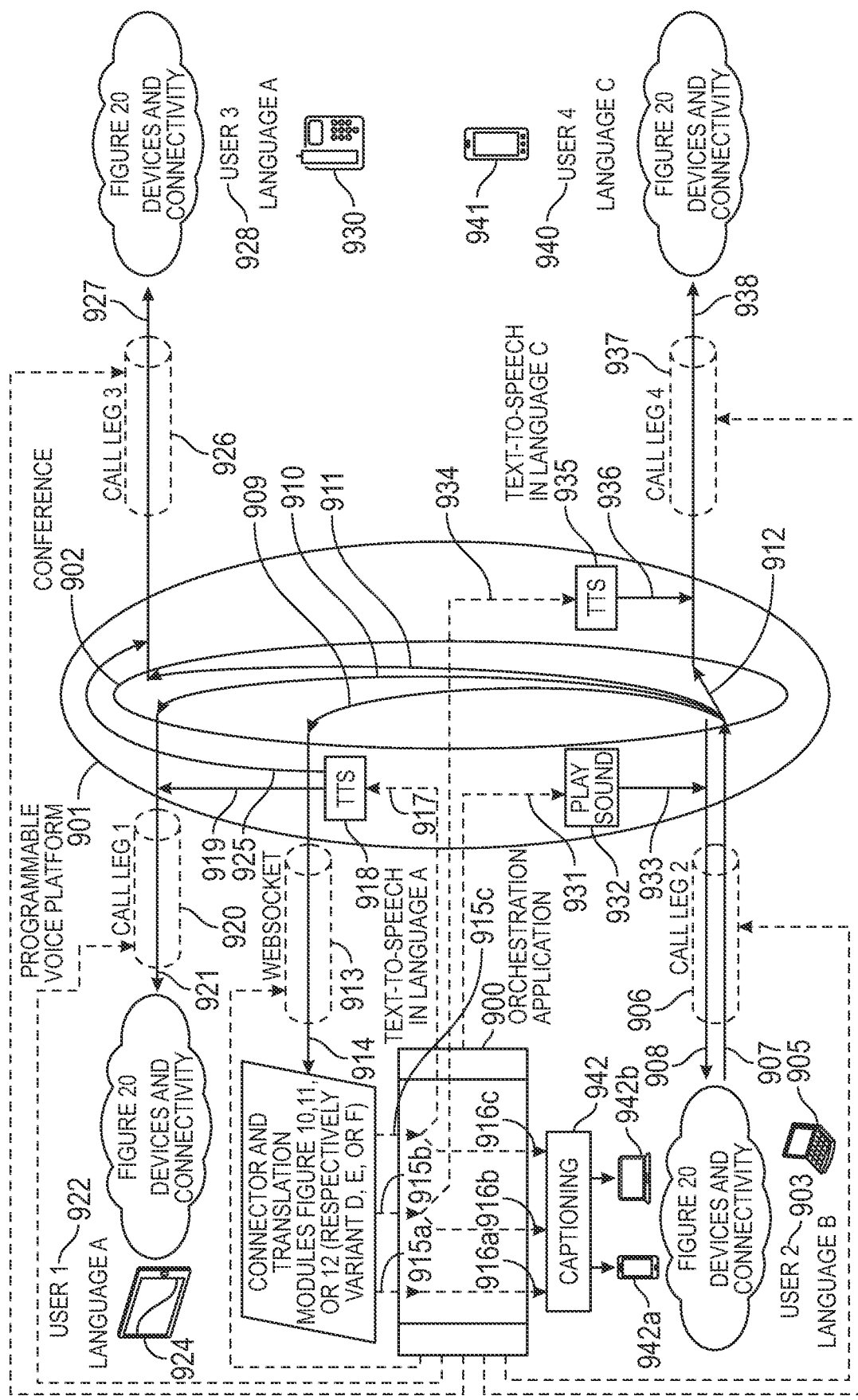
FIG. 9 illustrates the signal flow of the multi-party audio or video conference as outlined in FIG. 2 when a second user is speaking.

FIG. 9: Multi-Party Use Case—Example 2—User 2 Speaking

Figure 10:
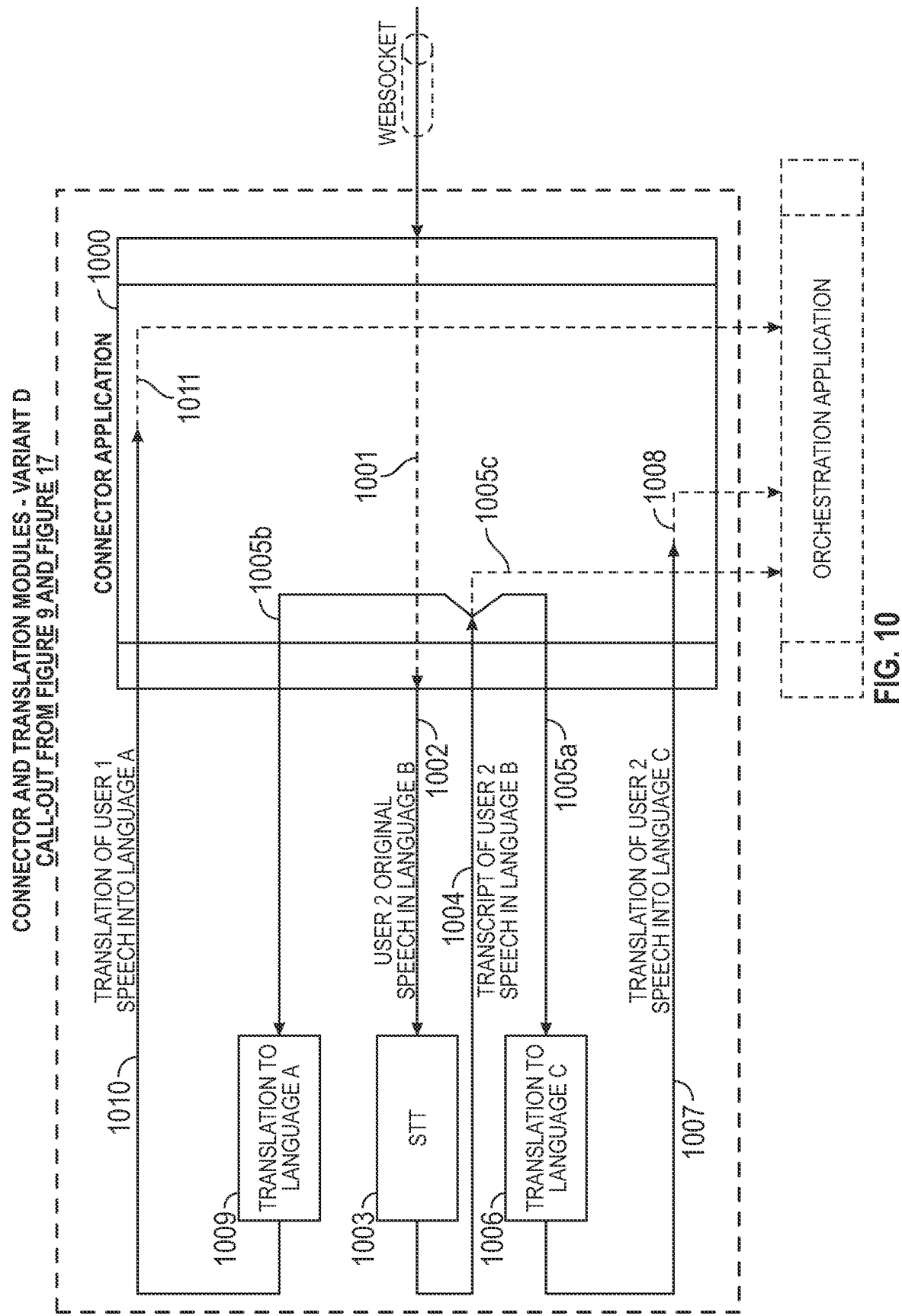
FIG. 10 illustrates details about a fourth variant of the signal flow of the multi-party audio or video conference as outlined in FIG. 2 when a second user is speaking as illustrated in FIG. 9 and in FIG. 15.
Figure 11:
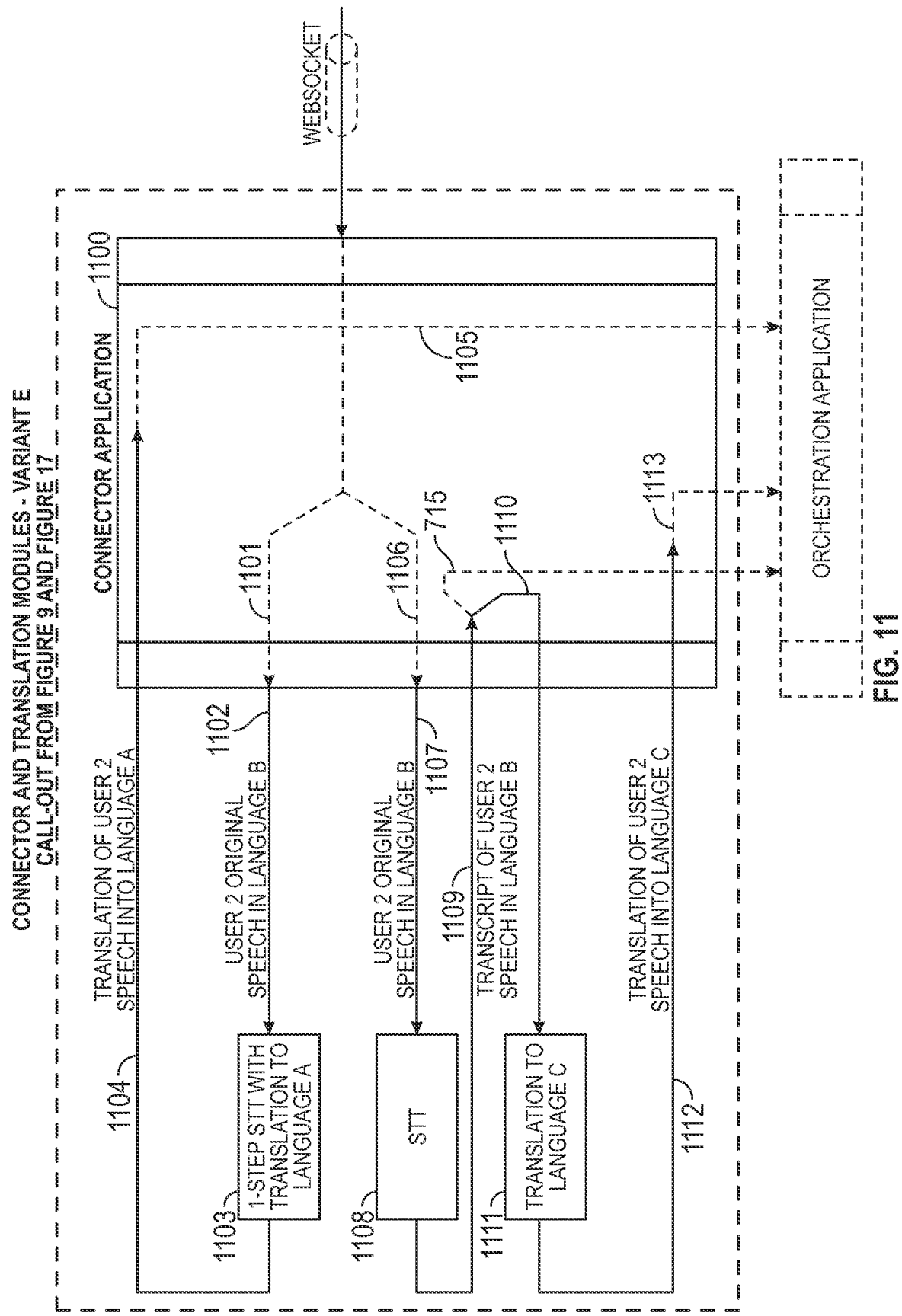
FIG. 11 illustrates details about a fifth variant of the signal flow of the multi-party audio or video conference as outlined in FIG. 2 when a second user is speaking as illustrated in FIG. 9 and in FIG. 15.
Figure 12:
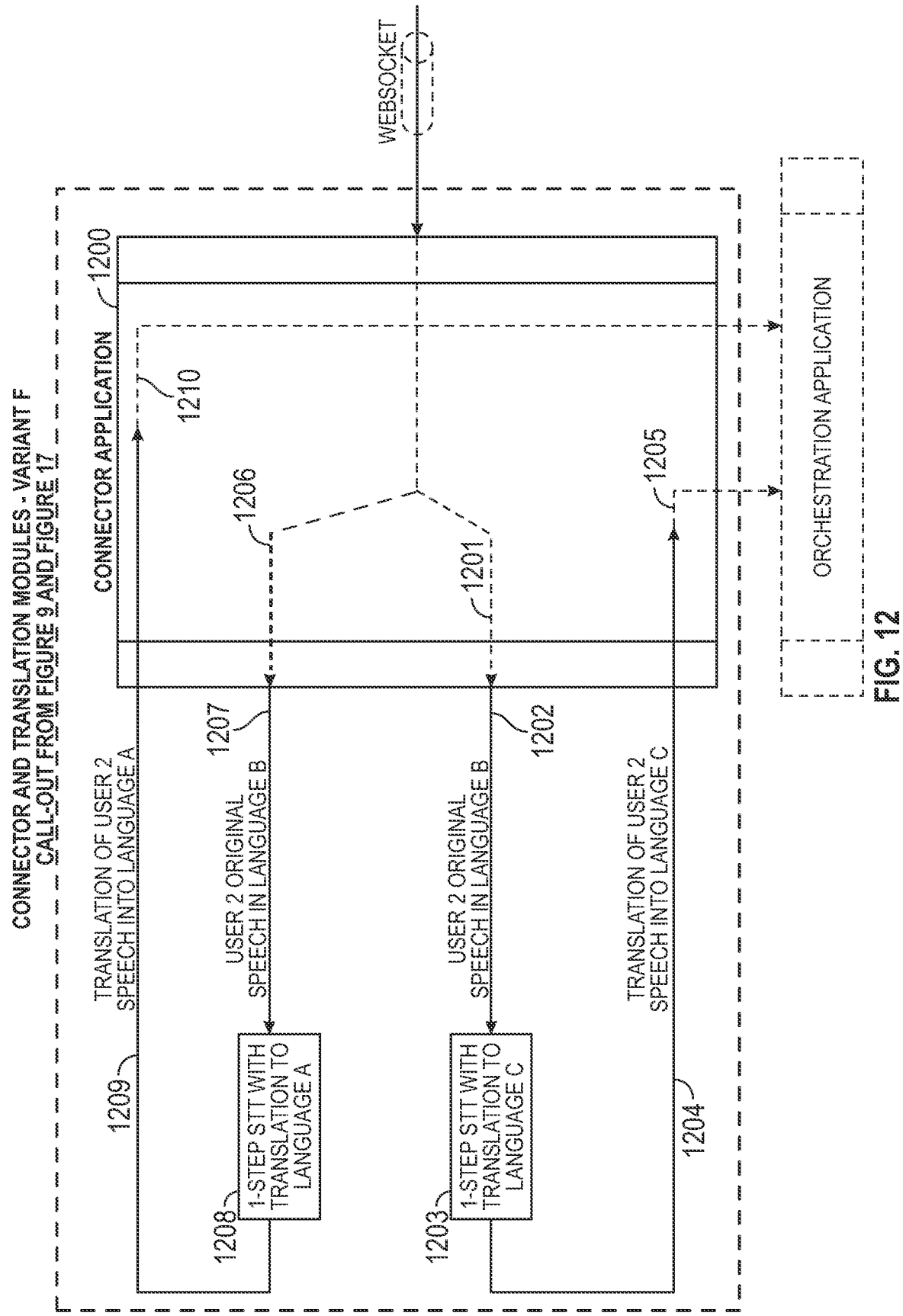
FIG. 12 illustrates details about a sixth variant of the signal flow of the multi-party audio or video conference as outlined in FIG. 2 when a second user is speaking as illustrated in FIG. 9 and in FIG. 15.

An orchestration application 900 will be:
using the programmable voice platform 901 and its conference sub component 902 to handle the establishment of [920] [906] [927] [937] call legs with multiple users, and WebSocket 913 to the connector and translation modules illustrated in FIGS. 10-12, handling transcripts of original speeches, translations, text-to-speech for interpreting speech playback, and/or passing transcripts of original speeches and translations text to an optional captioning module 942.

There is one WebSocket per user call leg, but for the purpose of explaining what happens when user 2 is speaking, only one WebSocket 913 is involved, thus only one WebSocket 913 is shown in this diagram.

In a multi-party conference, any user may speak at any time, including at the same time as others.

In this example 2, like in example 1, there are four users, user 1 922 and user 3 928 speak language A, user 2 903 speaks language B, and user 4 939 speaks language C. User 2 903 is speaking.

User 2 903 speaks [904] language B using their own telephony device 905. A [906] call leg is established between that telephony device 905 and the conference 901, with [907] audio out from that telephony device 905 and [908] audio into that telephony device 905. Audio from user 2 is forwarded to the WebSocket 913. The WebSocket 913 transmits only the audio from user 2 and not from any other audio source. In other words, that WebSocket 913 is listening only to the audio from user 2 and not from any other users.

The connector and translation modules illustrated in FIGS. 10-12 receive the [914] audio from user 2. Audio from user 2 is also forwarded to [910] user 1, [911] user 3, and [912] user 4. User 1 understands language A and uses their own existing telephony device 924. A [920] call leg is established between that device 924 and the conference 901, with [921] audio in to that telephony device 924. Of course in actual usage, there is also audio out from that device, but it is not relevant to the explanation here because in this example only user 2 is speaking.

User 3 understands language A and uses their own existing telephony device 930. A [926] call leg is established between that telephony device 930 and the conference 901, with [927] audio in to that telephony device 930. Of course in actual usage, there is also audio out from that device, but it is not relevant to the explanation here because in this example, only user 2 is speaking.

User 4 understands language C and uses their own existing telephony device 941. A [937] call leg is established between that telephony 941 device and the conference 901, with [938] audio in to that telephony device 941. Of course in actual usage, there is also audio out from that device, but it is not relevant to the explanation here because in this example only user 2 is speaking.

The connector and translation modules illustrated in FIGS. 10-12 forward to the orchestration application 900 the [915*a*] transcript of user 2's speech in language B, the [915*b*] translation of user 2's speech into language C, and the [915*c*] translation of user 2's speech into language A.

The orchestration application 900 forwards the [916*a*] transcript of user 2's speech in language A to the captioning module 942 that will serve [942*a*] [942*b*] client applications and devices requesting captioning. The orchestration application 900 forwards the [917] translation of user 2's speech into language A and has it played via a first Text-to-Speech (TTS) module 918. The orchestration application 900 forwards the translation [916*c*] to the captioning module 942. The orchestration application 900 forwards the [934] translation of user 2's speech into language C to have it played via a second Text-to-Speech (TTS) module 935, and forwards the translation [916*b*] to the captioning module 942.

The resulting Text-to-Speech audio translation in language A is played to [919] user 1 and [925] user 3. The resulting Text-to-Speech audio translation in language C is played to [936] user 4.

While translated audio speech-to-text are being played to any of user 1, user 3, or user 4, the orchestration application 900 causes a sound generating module 932 to play a notification sound [933] to user 2. If translated speech-to-text audio playback is finished for a user, but still in progress for any other user, that user will also hear a notification sound until playback is over for all other users.

In this example only a single user is speaking in order to simplify the explanations. In real usage, there are no restrictions on when any user may speak, it will not affect the system operation.

FIG. 10: Connector and Translation Modules—Variant D

The connector application 1000 handles the [1001] speech audio from user 2 in language B. It sends [1002] it to the a speech-to-text (STT) in language B module 1003. The [1004] transcript in language B is sent to the connector application 1000 which [1005*a*] forwards it to the translation module from language B to language C 1006. Subsequently, [1005*b*] forwards it to the translation module from language B to language A 1009, and [1005*c*] forwards it to the orchestration application 900.

The translation module 1006 produces the [1007] translation into language C and sends it to the connector application 1000, which in turn forwards it [1008] to the orchestration application 900. The translation module 1009 produces the [1010] translation into language A and sends it to the connector application 1000, which in turn forwards it [1011] to the orchestration application 900.

FIG. 11: Connector and Translation Modules—Variant E

The connector application 1100 handles the speech audio from user 2 in language B. It creates two [1101] [1106] audio transmissions and sends [1102] one to a 1-step speech-to-text (STT) with translation included from language B to language A module 1103 and sends the other [1107] one to a regular speech-to-text (STT) in language B module 1108. In the former case, the [1104] translation into language A is directly available; in the latter case, the [1109] transcript in language B is sent to the connector application 1100, which [1110] forwards it to the translation from language B to language C module 1111.

The [1104] translation into language A is received by the connector application 1100, which in turn forwards it [1105] to the orchestration application 900. The translation module 1111 produces the [1112] translation into language C and sends it to the connector application 1100, which in turn forwards it [1113] to the orchestration application 900.

FIG. 12: Connector and Translation Modules—Variant F

The connector application 1200 handles the speech audio from user 2 in language B. It creates two [1201] [1206] audio transmissions and sends [1202] one to a 1-step speech-to-text (STT) with translation included from language B to language C module 1203 and sends the other [1207] one to a 1-step speech-to-text (STT) with translation included from language B to language A module 1208. In both cases, the translation into language C [1204] and translation into language A [1209] are directly available and sent to the connector application 1200 which in turn forwards them [1205] [1210] respectively to the orchestration application 900.

In this variant, a transcript of original user 2 speech is not available. If really needed, it is possible for the connector application 1200 to create a third audio transmission to a speech-to-text (STT) module that would transcribe language B. Alternatively, the 1-step speech-to-text (STT) with translation included module may also produce the transcripts of original speech in addition to the translation text.

Figure 13:
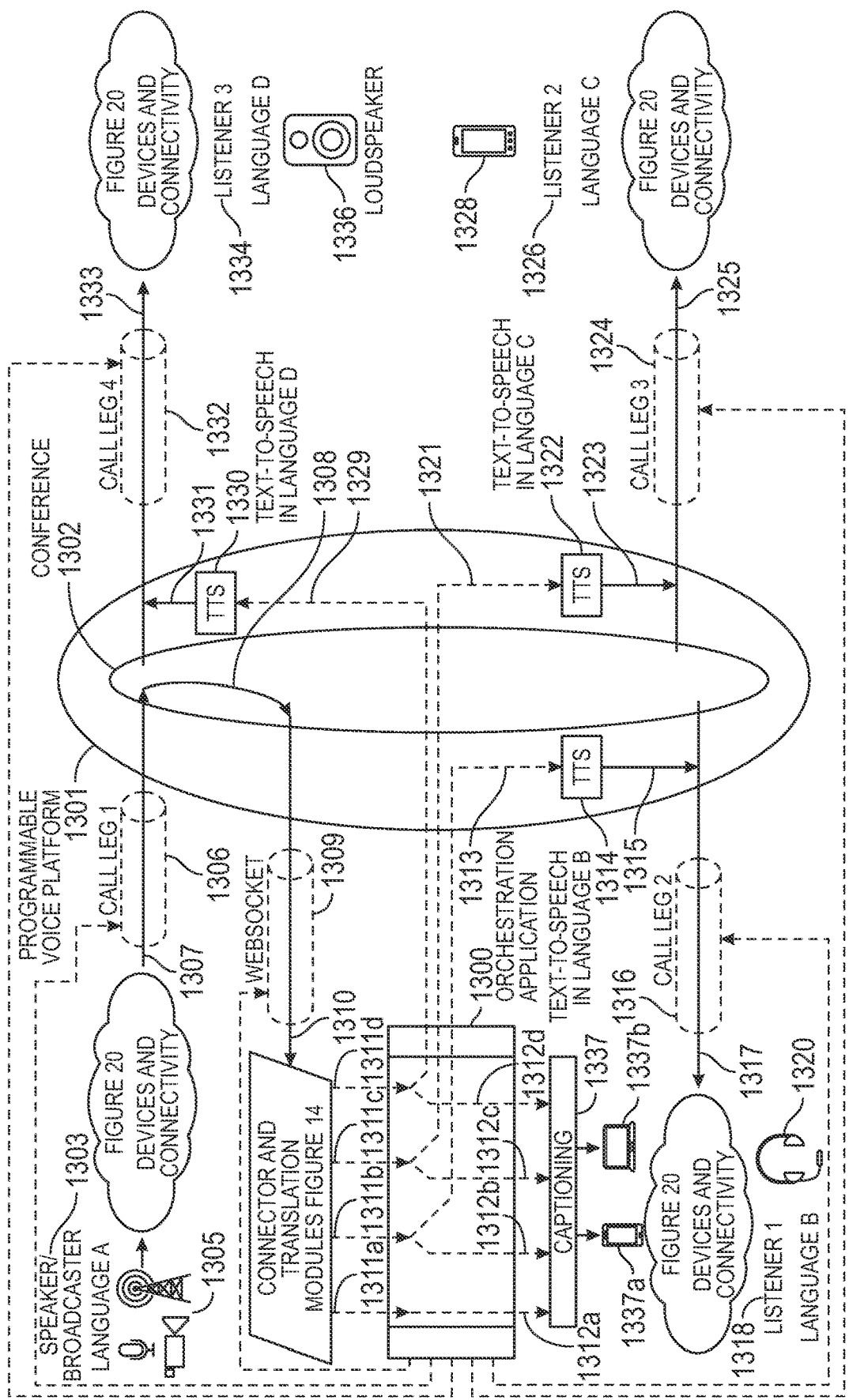
FIG. 13 illustrates the signal flow of an audio or video conference that is setup as a single party sending audio to multiple participants and where language translation services are provided so that each participant can obtain a translation of the audio into a different language.

FIG. 13: One-to-Many Use Case—One-Way Audio—Multiple Target Languages

Figure 14:
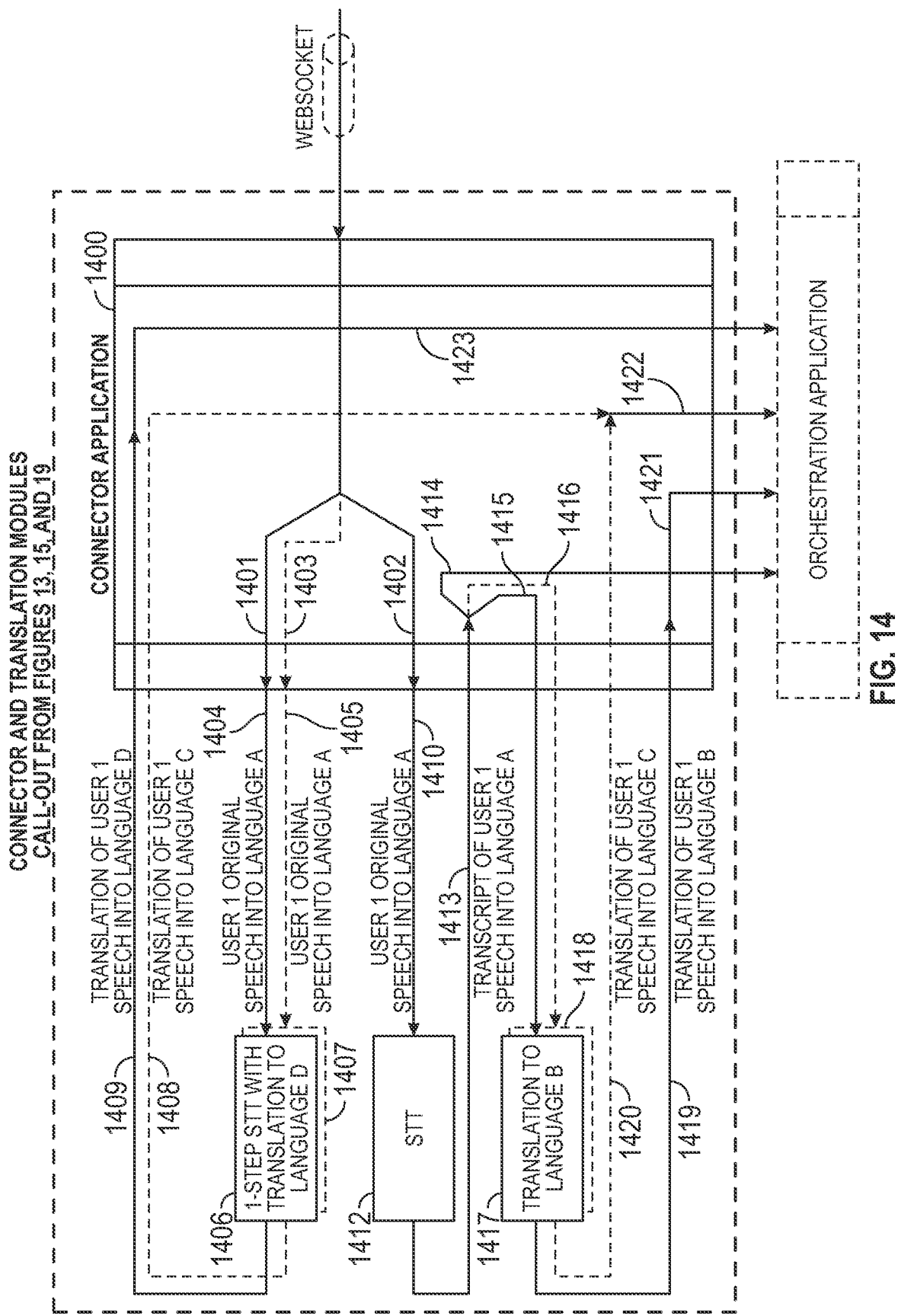
FIG. 14 illustrates details about the signal flow of an audio or video conference as illustrated in FIG. 13, in FIG. 15, and in FIG. 19.

An orchestration application 1300 will be:

using the programmable voice platform 1301 and its conference sub component 1302 to handle the establishment of [1306] [1316] [1324] [1332] call legs with multiple users, and the WebSocket 1309 to the connector and translation modules illustrated in FIG. 14, handling transcripts of original speeches, translations, text-to-speech for interpreting speech playback, and passing transcripts of original speeches and translations text to an optional captioning module 1337.

In this use case, only one WebSocket 1309 is needed, which listens only to the audio from the speaker/broadcaster 1303.

In this use case, the speaker/broadcaster 1303 can be a physical person, a live speech broadcast, a speech recording playback, a streaming audio or video source, any speech source, speaking in a given language. The speaker/broadcaster 1303 only speaks in Language A and does not listen. All other participants are only listeners understanding a different language from the speaker/broadcaster 1303.

In this example, there are four participants, the speaker/broadcaster 1303 who is the original speech source in language A, listener 1 1318 who speaks language B, listener 2 1326 who speaks language C, and listener 3 1334 who speaks language D.

When a listener is connected to the system, the listener may:

hear a greeting, if user's device permits, interact with an IVR, web page, or application to select a desired language, and/or hear an announcement explaining what will happen during the call, streaming session, or broadcast session.

Speaker/broadcaster speaks in language A using their own existing device 1305. A [1306] call leg is established between that device 1305 and the conference 1302, with [1307] audio out from that device 1305. That [1307] audio may be:

real-time audio in a voice call or video call, audio from an audio streaming or video streaming session, an analog AM/FM radio or VHF/UHF TV broadcast in which the analog audio signal is converted to a digital signal, digital audio from a digital radio, digital TV from cable/satellite/fiber, an analog speech audio signal converted to digital, from any device that produces speech audio in general.

The audio [1308] from the speaker/broadcaster is forwarded to the [1309] WebSocket 1309. The WebSocket 1309 transmits only the audio from the speaker/broadcaster and not from any other audio source. In other words, the WebSocket 1309 is listening only to the audio from the speaker/broadcaster and not from any other users. The connector and translation modules illustrated in FIG. 14 receive the [1310] audio from the speaker/broadcaster.

Listener 1 1318 understands language B and uses their own existing device 1320. A [1316] call leg is established between that device 1320 and the conference 1302, with [1317] audio into that device 1320. In actual usage, there may also be audio out from that device 1320, but it is not relevant for the use case here, which is why that audio out is omitted.

Listener 2 1326 understands language C and uses their own existing device 1328. A [1324] call leg is established between that device 1328 and the conference 1302, with [1325] audio into that device 1328. Of course in actual usage, there is also audio out from that device 1328, but it is not relevant to the explanation here, which is why that audio out is omitted.

Listener 3 1334 understands language D and uses their own existing device 1336. A [1332] call leg is established between that device 1336 and the conference 1302, with [1333] audio into that device 1326.

The connector and translation modules illustrated in FIG. 14 forward to the orchestration application 1300 a [1311a] transcript of the speaker/broadcaster speech in language A, a [1311b] translation of the speaker/broadcaster speech into language B, a [1311c] translation of the speaker/broadcaster speech into language C, and a [1311d] translation of the speaker/broadcaster speech into language D.

The orchestration application 1300 forwards the [1312a] transcript of the speaker/broadcaster speech in language A to the optional captioning module 1337 that will serve [1337a] [1337b] client applications and devices requesting captioning. The orchestration application 1300 forwards the [1313] translation of the speaker/broadcaster speech in language B and has it played via a first Text-to-Speech (TTS) module 1314 and forwards the translation [1312b] to the captioning module 1337. The orchestration application 1300 forwards the [1321] translation of the speaker/broadcaster speech into language C and has it played via a second Text-to-Speech (TTS) module 1322 and forwards the translation [1312c] to the captioning module 1337. The orchestration application 1300 forwards the [1329] translation of the speaker/broadcaster speech into language D has it played via a third Text-to-Speech (TTS) module 1330 and forwards the translation [1312d] to the captioning module 1337.

The resulting Text-to-Speech audio translation in language B is played to [1315] listener 1. The resulting Text-to-Speech audio translation in language C is played to [1323] listener 2. The resulting Text-to-Speech audio translation in language D is played to [1331] listener 3.

The orchestration application 1300 controls the TTS (Text-to-Speech) modules 1314, 1322 and 1330 to automatically adapt to the speech rate of the speaker/broadcaster so that the translation play backs do not lag over time. This is achieved by using SSML (Speech Synthesis Markup Language) for the TTS requests and a feedback loop to track intervals between original speech transcripts and TTS playback timestamps such that the TTS playback speed maintains even with the speaker/broadcaster speech rate.

FIG. 14: Connector and Translation Modules

The connector application 1400 handles the speech audio from the speaker/broadcaster in language A. Depending on the actual pair source language A and a given target language, it sends the speech audio either to a 1-step speech-to-text (STT) with translation included module or to regular speech-to-text (STT) in language A module, then has the transcript sent to a translation module via the connector application 1400.

In this example, translation to language B is shown through a speech-to-text (STT) module 1412 in language A, then through a translation module 1417 to language B, translation to language D is through a 1-step speech-to-text (STT) with translation included module. Translation to language C may use either way.

For target language B, the connector application 1400 creates an [1402] audio transmission that is [1410] sent to a regular speech-to-text (STT) in language A module 1412.

The [1413] transcript in language A is sent to the connector application 1400, which [1415] forwards it to the translation to language B module 1417 and to the [1414] orchestration application 1300. The [1419] translation to language B is sent to the connector application 1400, which [1421] forwards it to the orchestration application 1300.

For target language D, the connector application 1400 creates an [1401] audio transmission that is [1404] sent to a 1-step speech-to-text (STT) with translation included to language D module 1406. The [1409] translation to language D is sent to the connector application 1400, which [1423] forwards it to the orchestration application 1300.

For target language C, either:
the connector application 1400 uses the existing [1402] audio transmission that is [1410] sent to a regular speech-to-text (STT) in language A module 1412, the [1413] transcript in language A is sent to the connector application 1400, which [1416] forwards it to the translation to language C module 1418. The [1420] translation to language C is sent to the connector application 1400, which [1422] forwards it to the orchestration application 1300.

or:
the connector application 1400 creates an [1403] audio transmission that is [1405] sent to a [1407] 1-step speech-to-text (STT) with translation included to language C module, the [1408] translation to language C is sent to the connector application 1400, which [1422] forwards it to the orchestration application 1300.

Figure 15:
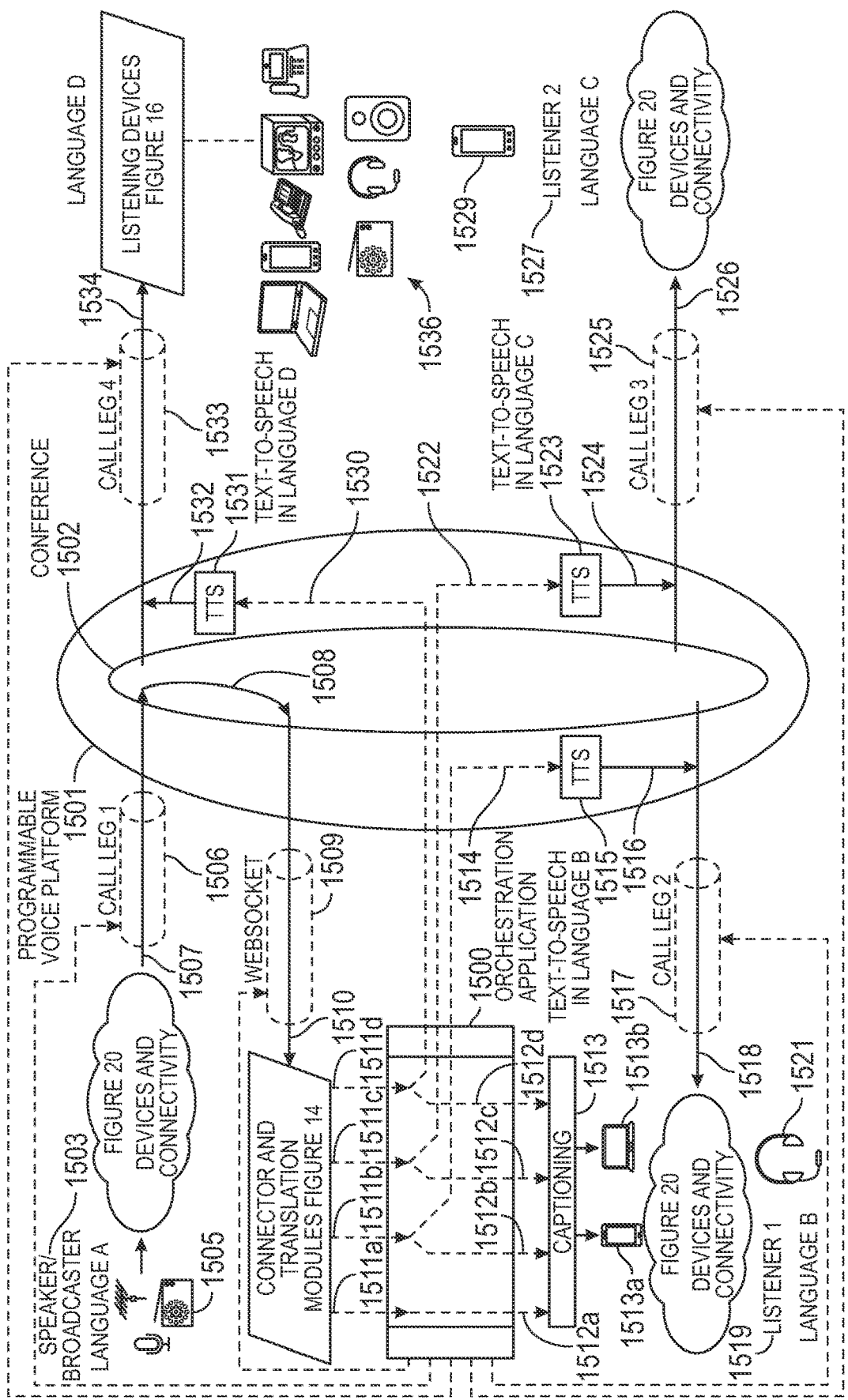
FIG. 15 illustrates the signal flow of an audio or video conference that is setup as a single party sending audio to multiple participants as outlined in FIG. 13, where language translation services are provided for multiple different languages, and where multiple participants obtain audio of the same language translation.

FIG. 15: One-to-Many Use Case—One-Way Audio—Multiple Target Languages—Multiple Listeners for a Target Language An orchestration application 1500 will be:
using the programmable voice platform 1501 and its conference sub component 1502 to handle the establishment of [1506] [1517] [1525] [1533] call legs with multiple users, the WebSocket 1509 to the connector and translation modules illustrated in FIG. 14,
handling transcripts of original speeches, translations, text-to-speech for interpreting speech playback, and/or passing transcripts of original speeches and translations text to an optional captioning module 1513.

In this use case, the speaker/broadcaster 1503 can be a physical person, a live speech broadcast, a speech recording playback, a streaming audio or video source, any speech source, speaking language A. The speaker/broadcaster 1503 only speaks and does not listen. All other participants are only listeners understanding a different language from the speaker/broadcaster 1503.

In this example, there are four participants, the speaker/broadcaster 1503 who is the original speech source in language A, listener 1 1519 who speaks language B, listener 2 1527 who speaks language C, and group of listeners 1536 who speak language D.

The speaker/broadcaster 1503 speaks in [1304] language A using their own device 1505. A [1506] call leg is established between that device 1505 and the conference 1502, with [1507] audio out from that device 1505.

That [1507] audio may be:
real-time audio in a voice call or video call,
audio from an audio streaming or video streaming session,
an analog AM/FM radio or VHF/UHF TV broadcast which an analog audio signal is converted to a digital signal,
digital audio from a digital radio, digital TV from cable/satellite/fiber,
an analog speech audio signal converted to digital,
from any device that produces speech audio in general.

The audio [1508] from the speaker/broadcaster 1503 is forwarded to the WebSocket 1509. The WebSocket 1509 transmits only the audio from the speaker/broadcaster 1503 and not from any other audio source. In other words, the WebSocket 1509 is listening only to the audio from the speaker/broadcaster 1503 and not from any other users. The connector and translation modules illustrated in FIG. 14 receive the [1510] audio from the speaker/broadcaster 1503.

Listener 1 1519 understands language B and uses their own existing device 1521. A [1517] call leg is established between that device 1521 and the conference 1502, with [1518] audio into that device 1521. In actual usage, there may also be audio out from that device 1521, but it is not relevant to the explanation here, which is why that audio out is omitted.

Listener 2 1527 understands language C and uses their own existing device 1529. A [1525] call leg is established between that device 1529 and the conference 1502, with [1526] audio into that device 1529. Of course in actual usage, there is also audio out from that device, but it is not relevant to the explanation here, which is why that audio out is omitted.

A group of listeners 1536 understand language D and use their own existing devices. A [1533] call leg is established between those devices and the conference 1502, with [1534] audio into those devices.

The connector and translation modules illustrated in FIG. 14 forward to an orchestration application 1500 a [1511a] transcript of the speaker/broadcaster speech in language A, a [1511b] translation of the speaker/broadcaster speech into language B, a [1511c] translation of the speaker/broadcaster speech into language C, and a [1511d] translation of the speaker/broadcaster speech into language D.

The orchestration application 1500 forwards the [1512a] transcript of the speaker/broadcaster speech in language A to the captioning module 1513 that will serve [1513a] [1513b] client applications and devices requesting captioning. The orchestration application 1500 forwards the [1514] translation of the speaker/broadcaster speech in language B and has it played via a first Text-to-Speech (TTS) module 1515 and forwards the translation [1512b] to the captioning module 1513. The orchestration application 1500 forwards the [1522] translation of the speaker/broadcaster speech into language C and has it played via a second Text-to-Speech (TTS) module 1523 and forwards the translation [1512c] to the captioning module 1513. The orchestration application 1500 forwards the [1530] translation of the speaker/broadcaster speech into language D and has it played via a third Text-to-Speech (TTS) module 1531 and optionally forwards the translation [1512d] to the captioning module 1513.

The resulting Text-to-Speech audio translation in language B is played to [1516] listener 1. The resulting Text-to-Speech audio translation in language C is played to [1526] listener 2. The resulting Text-to-Speech audio translation in language D is played to the [1534] group of listeners 1536.

The orchestration application 1500 controls the TTS (Text-to-Speech) modules 1515, 1523 and 1531 to automatically adapt to the speech rate of the speaker/broadcaster 1503 so that the translations play back without lags. This is achieved by using SSML (Speech Synthesis Markup Language) for the TTS requests and a feedback loop to track intervals between original speech transcripts and TTS playback timestamps such that the TTS playback maintains pace with the speaker/broadcaster's speech rate.

Figure 16:
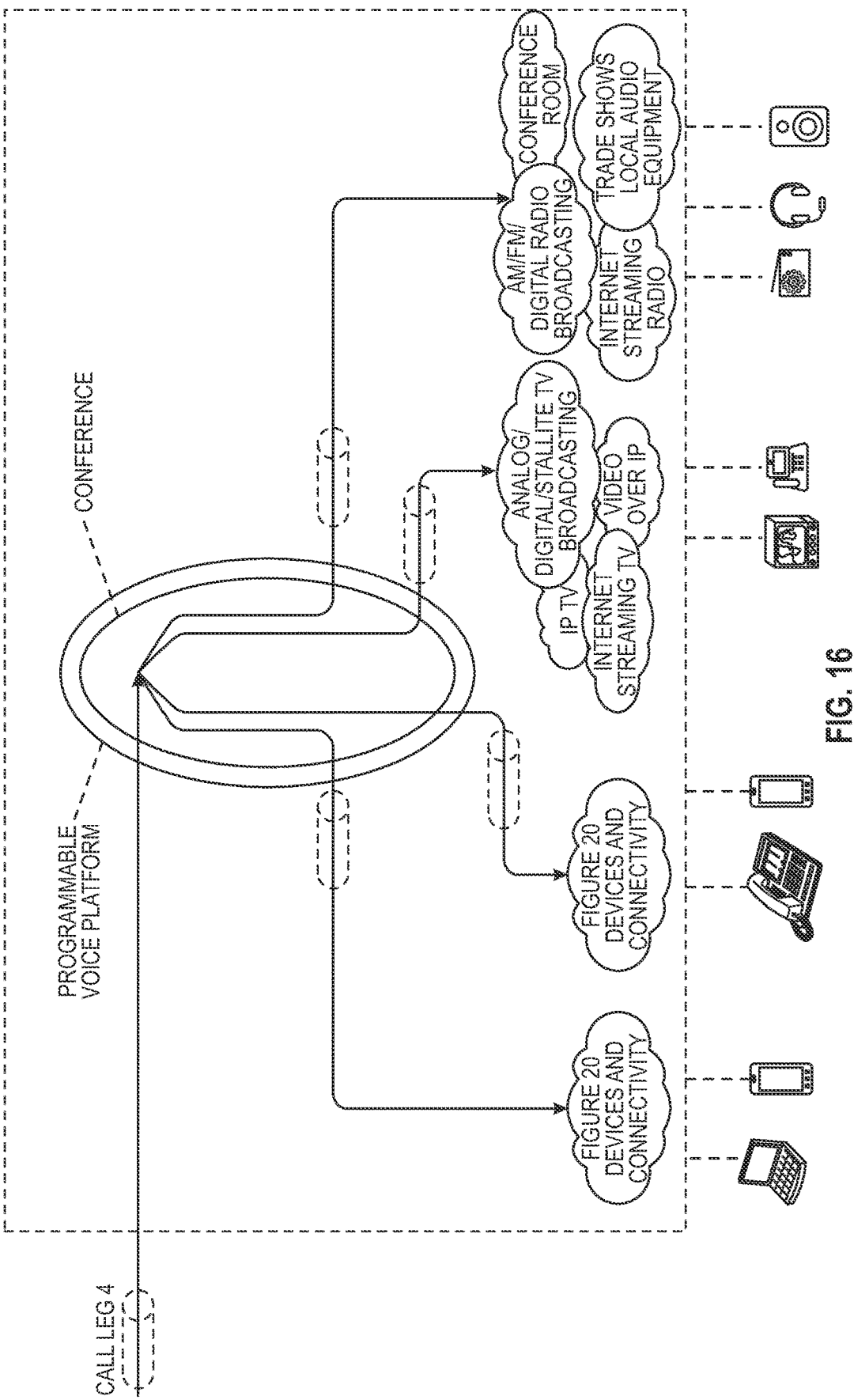
FIG. 16 illustrates details of the signal flow of an audio or video conference as illustrated in FIG. 15 to the various listening devices.

FIG. 16: Listening Devices

FIG. 16 illustrates how any of multiple listening devices may be connected to listen to a real-time interpretation of a speaker/broadcast's speech.

Figure 17:
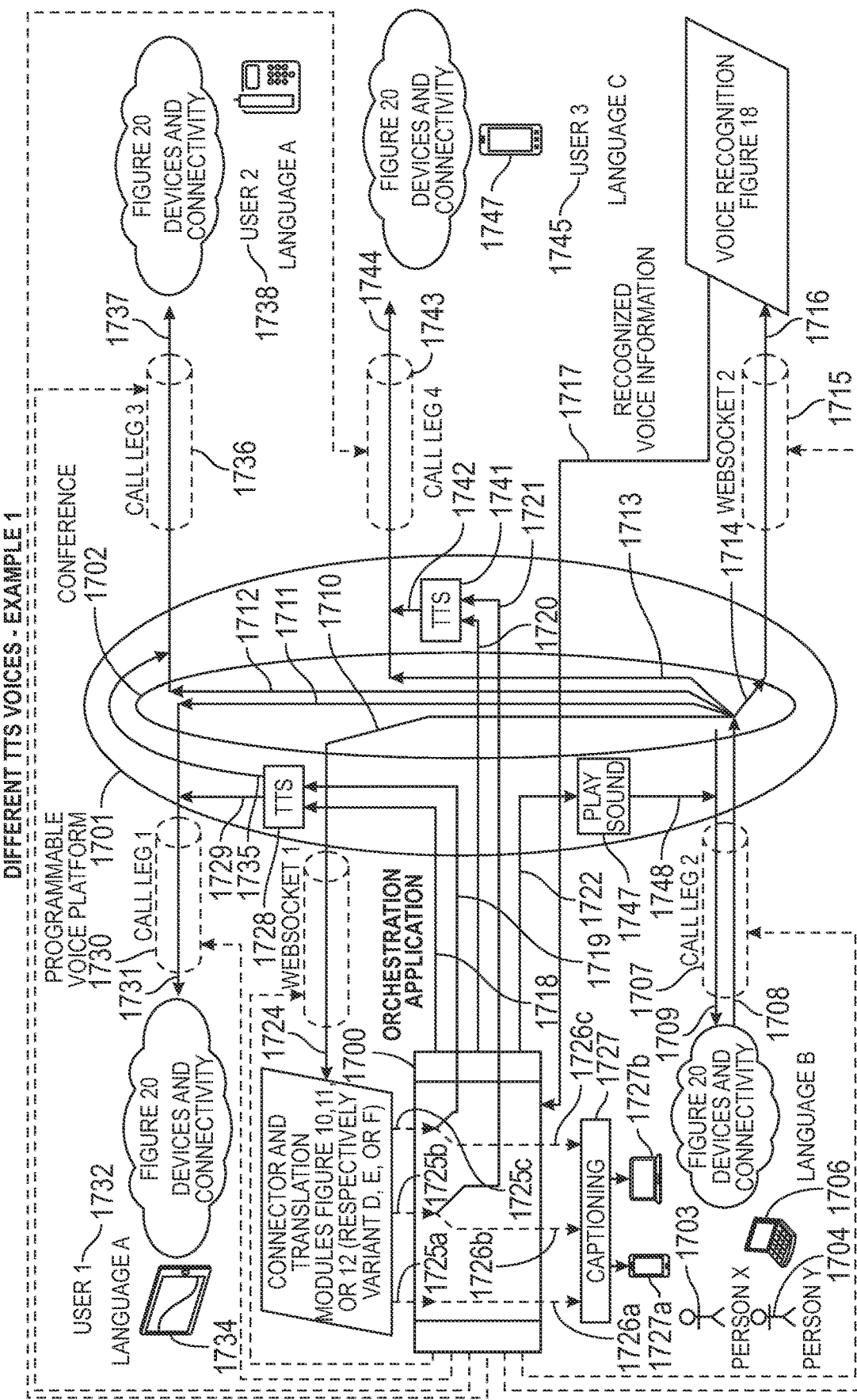
FIG. 17 illustrates the signal flow for a multi-party audio or video conference where two or more parties to the conference are speaking the same language from the same device, then depending on the speaker, respective translations are played with different synthesized voices.
Figure 20:
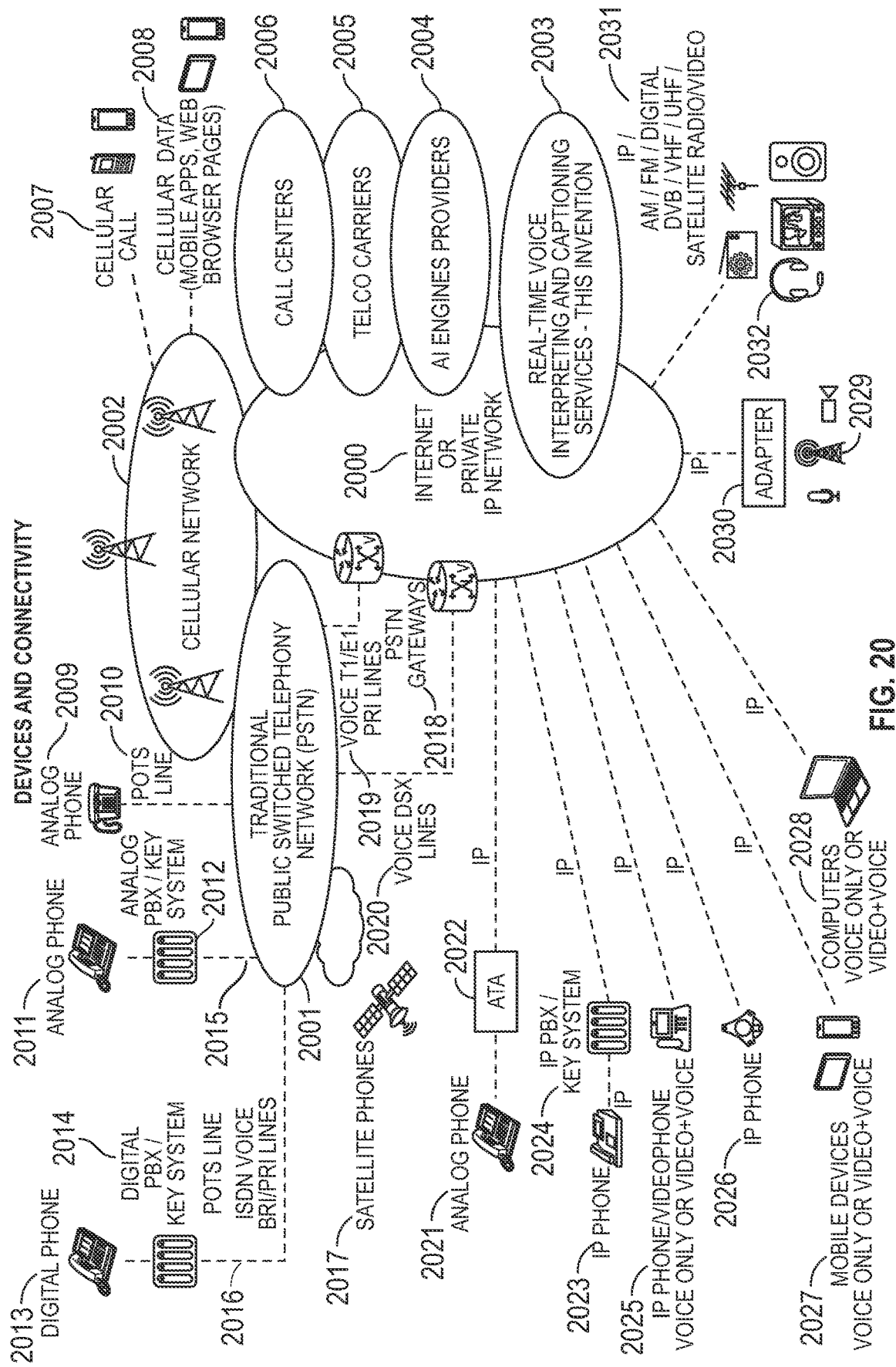
FIG. 20 is a diagram illustrating existing communications environment in which systems and methods embodying the invention can be used.

The listening devices may be connected:
As illustrated in FIG. 20,
Via IP TV,
Via analog Radio/TV (Terrestrial),
Via digital Radio/TV broadcasting (Terrestrial, Cable, Satellite, Fiber, xDSL),
Via Internet Radio/TV streaming,
Via video over IP,
In conference rooms audio/video equipment, and/or
In trade shows, any events, local audio/video equipment FIG. 17: Different TTS Voices—Example 1

Figure 18:
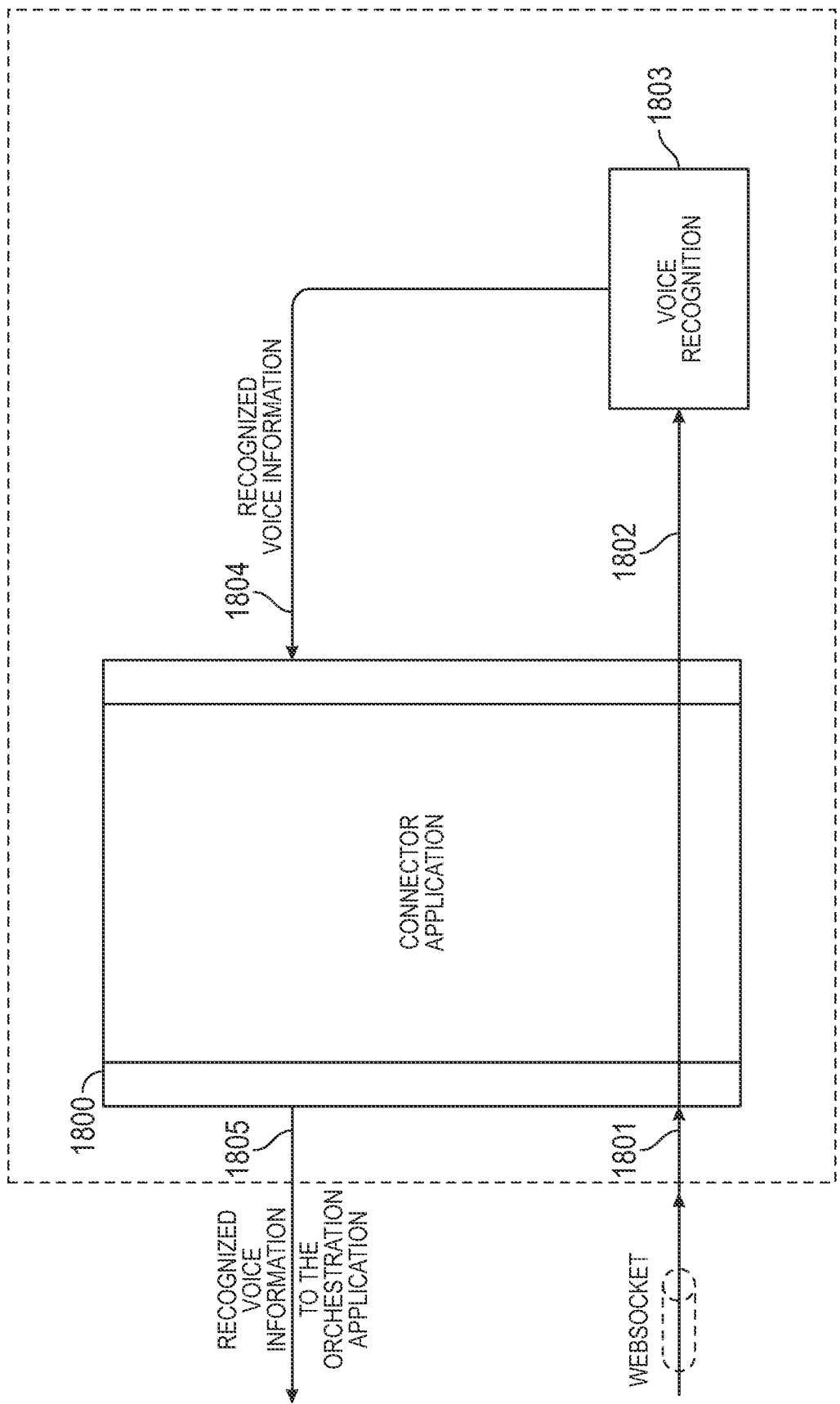
FIG. 18 illustrates details of the signal flow path for the audio or video conference illustrated in FIG. 17, and in FIG. 19.

An orchestration application 1700 will be using the programmable voice platform 1701 and its conference sub component 1702 to handle the establishment of [1730] [1707] [1736] [1743] call legs with multiple users, the WebSocket 1723 to the connector and translation modules illustrated in FIG. 14, handling transcripts of original speeches, translations, text-to-speech for interpreting speech playback, and optional captioning, and the WebSocket 1715 to the voice recognition module illustrated in FIG. 18.

There are two WebSockets per user call leg, but for the purpose of explaining what happens when person X 1703 or person Y 1704 is speaking, only two WebSockets are involved, thus only two WebSockets are shown in this diagram.

At the beginning of this communication session, when a listener is connected to the system the user may hear a greeting or an announcement explaining what will happen during the call or broadcast.

Person X 1703 or Person Y 1704 may be speaking in language B using their own existing devices 1706. A [1707] call leg is established between those devices 1706 and the conference 1702, with [1708] audio out from those devices 1706, and [1709] audio in to those devices 1706. That [1708] audio is forwarded to both [1710] [1714] WebSockets 1715 and 1723, and all [1711] [1712] [1713] other call legs. Both WebSockets 1715 and 1723 transmit only the audio from [1707] call leg 2, and not from any other audio source. In other words, both WebSockets 1715 and 1723 are listening only to the audio from the [1706] devices 1706 of person X and person Y, and not from any other users.

The connector and translation modules illustrated in FIGS. 10-12 receive the [1724] audio from WebSocket 1 1723. The voice recognition module illustrated in FIG. 18 receives the [1716] audio from WebSocket 2 1715.

User 1 1732 understands language A and uses their own existing device 1734. A [1730] call leg is established between that device 1734 and the conference 1702, with [1731] audio into that device 1734. Of course in actual usage, there is also audio out from that device 1734, but it is not relevant for the explanation here, which is why that audio out is omitted.

User 2 1738 understands language A and uses their own existing device 1740. A [1736] call leg is established between that device 1740 and the conference 1702, with [1737] audio into that device 1740. Of course in actual usage, there is also audio out from that device 1740, but it is not relevant for the explanation here, which is why that audio out is omitted.

User 3 1745 understands language C and uses their own existing device 1747. A [1743] call leg is established between that device 1747 and the conference 1702, with [1744] audio into that device 1747. Of course in actual usage, there is also audio out from that device, but it is not relevant for the explanation here, which is why that audio out is omitted.

The connector and translation modules illustrated in FIGS. 10-12 forward to the orchestration application 1700 a [1725*a*] transcript of person X or person Y speech in language B, a corresponding [1725*b*] translation into language C, and [1725*c*] into language A.

The orchestration application 1700 forwards the [1725*a*] transcript of the original speech in language B to the optional captioning module 1727 that will serve [1727*a*] [1727*b*] client applications and devices requesting captioning. The orchestration application 1700 forwards the [1721] translation of the speech into language C and has it played via a first Text-to-Speech (TTS) module 1741 and forwards the translation [1726*b*] to the captioning module 1727. The orchestration application 1700 forwards the [1719] translation of the speech into language A and has it played via a second Text-to-Speech (TTS) module 1728 and forwards the translation [1726*c*] to the captioning module 1727.

The voice recognition module illustrated in FIG. 18 recognizes the speaker's voice, for example either person X or person Y, and it forwards the [1717] recognized voice information to the orchestration application 1700. The orchestration application 1700 uses that information to select a different translation [1718] [1720] TTS voice for the same language, depending on who the speaker is.

The resulting [1719] translation with a given [1718] TTS voice selection is played via the second TTS module 1728 in language A to user 1 1732 and user 2 1738. The resulting [1721] translation with a given [1720] TTS voice selection is played via the first TTS module 1741 in language C to user 3 1745.

While translated audio speech-to-text are being played to any of user 1, user 2, or user 3, the orchestration application 1700 causes a sound generating module 1747 to play a [1748] notification sound via the devices 1706 used by person X and person Y. If translated audio speech-to-text playback is finished for a first user, but still in progress for one or more another users, the first will also hear a notification sound until playback is over for all other users.

FIG. 18: Voice Recognition

FIG. 18 depicts details of voice recognition to determine which of multiple users are currently speaking. The connector application 1800 in this diagram is the same as:
the one inside FIGS. 10-12, or
the one inside FIG. 14.

The connector application 1800 receives the [1801] audio from the WebSocket 1715 and forwards [1802] it to a voice recognition module 1803. The connector application 1800 receives the [1804] recognized voice information, which it forwards [1805] to the orchestration application 1700.

Figure 19:
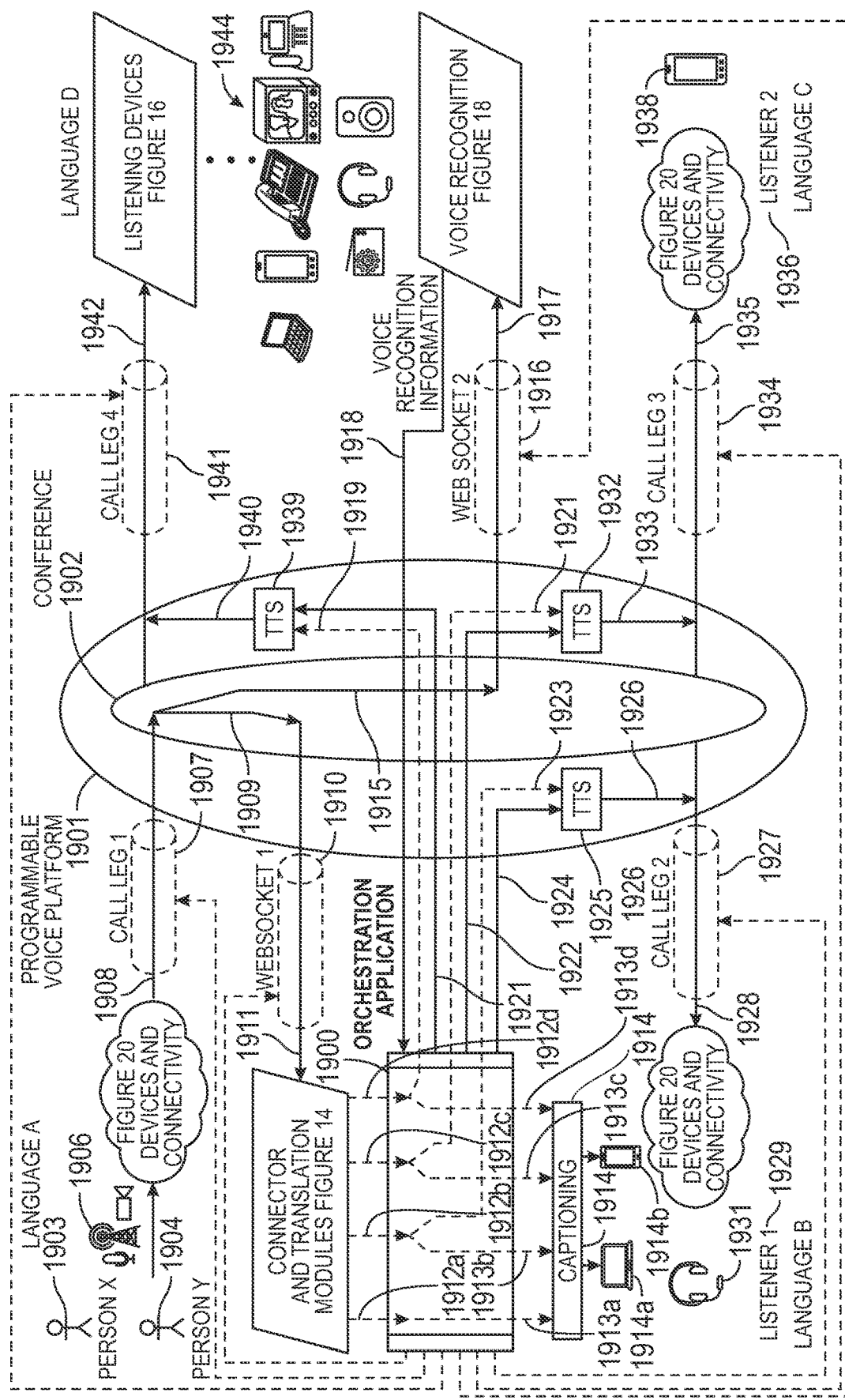
FIG. 19 illustrates the signal flow of an audio or video conference that is setup as multiple parties speaking the same language from a single device sending audio to multiple participants, then depending on the speaker, respective translations are played with different synthesized voices.

FIG. 19: Different TTS Voices—Example 2—One-Way-Audio

An orchestration application 1900 will be using a programmable voice platform 1901 and its conference sub component 1902 to handle the establishment of [1907] [1927] [1941] [1934] call legs with multiple users, the WebSocket 1910 to the connector and translation modules illustrated in FIG. 14, handling transcripts of original speeches, translations, text-to-speech for interpreting speech playback, and optional captioning, and the WebSocket 1916 to the voice recognition module illustrated in FIG. 18.

There are two WebSockets per user call leg, but for the purpose of explaining what happens when person X or person Y is speaking, only two WebSockets are involved, thus only two WebSockets are shown in this diagram.

At the very beginning of the communication session, when a listener is connected to the system the user may hear a greeting, or an announcement explaining what will happen during the call or broadcast.

Person X 1903 or Person Y 1904 speaks in language A using their own existing devices 1906. A [1907] call leg is established between those device 1906 and the conference 1902, with [1908] audio out from those devices 1906. That [1908] audio is forwarded to both WebSockets 1910 and 1916. Both WebSockets 1910 and 1916 transmit only the audio from [1907] call leg 1, and not from any other audio source. In other words, both WebSockets 1910 and 1916 are listening only to the audio from the devices 1906 of person X and person Y, and not from any other users. The connector and translation modules illustrated in FIG. 14 receive the [1911] audio from WebSocket 1 1910. The voice recognition module illustrated in FIG. 18 receives the [1917] audio from WebSocket 2 1916.

Listener 1 1929 understands language B and uses their own existing device 1931. A [1927] call leg is established between that device 1931 and the conference 1902, with [1928] audio into that device.

Listener 2 1936 understands language C and uses their own existing device 1938. A [1934] call leg is established between that device 1938 and the conference 1902, with [1935] audio into that device 1938. In actual usage, there is also audio out from that device, but it is not relevant for the usage and explanation here, which is why that audio out is omitted.

A group of users 1944 understand language D and use their own existing devices, as depicted in FIG. 16. One or more [1941] call legs are established between those devices and the conference 1902, with [1942] audio into those listening devices.

The connector and translation modules illustrated in FIG. 14 forward to the orchestration application 1900 a [1912*a*] transcript of person X or person Y speech in language A, a corresponding [1912*b*] translation into language B, [1912*c*] into language C, and [1912*d*] into language D.

The orchestration application 1900 forwards the [1913*a*] transcript of the original speech in language A to the optional captioning module 1913 that will serve [1913*a*] [1913*b*] client applications and devices requesting captioning. The orchestration application 1900 forwards the [1923] translation of the speech into language B and has it played via a first Text-to-Speech (TTS) module 1925 and forwards the translation [1913*b*] to the captioning module 1914. The orchestration application 1900 forwards the [1921] translation of the speech into language C and has it played via a second Text-to-Speech (TTS) module 1932 and forwards the translation [1913*c*] to the captioning module 1914. The orchestration application 1900 forwards the [1919] translation of the speech into language D and has it played via a third Text-to-Speech (TTS) module 1939 and forwards the translation [1913*d*] to the captioning module 1914.

The voice recognition module illustrated in FIG. 18 recognizes the speaker's voice, for example either person X or person Y, and forwards the [1918] recognized voice information to the orchestration application 1900. The orchestration application 1900 uses that information to select a different translation [1924] [1922] [1920] TTS voice for the same language depending on who is the speaker.

The resulting [1923] translation with a given [1924] TTS voice selection is played via the first TTS module 1925 in language B to [1926] listener 1. The resulting [1921] translation with a given [1922] TTS voice selection is played via the second TTS module 1932 in language C to [1933] listener 2. The resulting [1919] translation with a given [1920] TTS voice selection is played via the third TTS module 1939 in language D to [1940] listener 3.

The orchestration application 1900 controls the TTS (Text-to-Speech) modules 1925, 1932 and 1939 to automatically adapt to the speech rate of the speakers 1903/1904 such that the translations do not include lags. This is achieved by using SSML (Speech Synthesis Markup Language) for the TTS requests and a feedback loop to track intervals between original speech transcripts and TTS playback timestamps such that the TTS playback speed maintains pace with the speaker's speech rate.

FIG. 20: Devices and Connectivity

FIG. 20 illustrates how existing applications and devices can take advantage of real-time interpreting and captioning services as described herein by virtue of their various connection capabilities to the system described.

Figure 21:
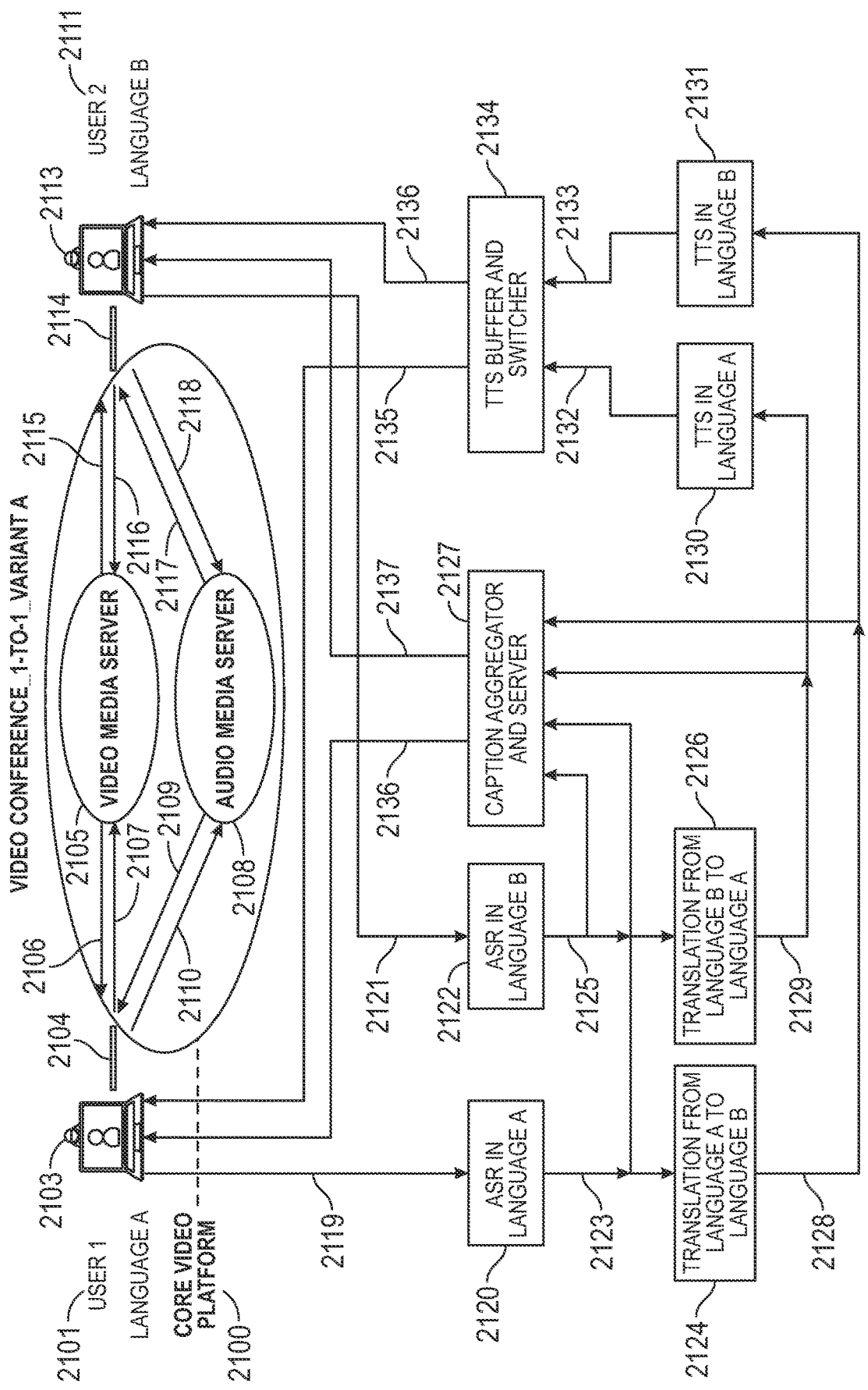
FIG. 21 is a diagram illustrating a first variant of the signal flow paths for a one-to-one video conference in which language translation services are provided.

FIG. 21: Video Conference—One-to-One—Variant A

The core video platform 2100 includes a video media server 2105 and an audio media server 2108. User 1 2101 speaks language A with a device 2103 supporting video communications. User 2 2111 speaks language B with a device 2113 supporting video communications. User 1's device 2103 is connected [2104] to the core video platform 2100 using video communications protocols which include WebRTC. SIP (Session Initiation Protocol), H.323. User 2's device 2113 is connected [2114] to the core video platform 2100 using video communications protocols which include WebRTC. SIP (Session Initiation Protocol), H.323.

User 1's device 2103 subscribes to the video media stream from the other participant [2106] and publishes its own video media stream [2107]. User 2's device 2113 subscribes to the video media stream from the other participant [2115] and publishes its own video media stream [2116].

User 1's device 2103 subscribes to the audio media stream from the other participant [2109] and publishes its own audio media stream [2110]. User 2's device 2113 subscribes to the audio media stream from the other participant [2117] and publishes its own audio media stream [2118].

There is also an orchestrator application such as that depicted in FIG. 3 and a connector application such as that depicted in FIG. 4 involved; they are not shown in this diagram.

User 1's device 2103 also sends a duplicate [2119] of its published audio media stream to the ASR (Automatic Speech Recognition) module 2120 in language A. User 2's device 2113 also sends a duplicate [2121] of its published audio media stream to the ASR (Automatic Speech Recognition) module 2122 in language B. The ASR module in language A 2120 sends its transcript results [2123] to the translation module 2124 from language source A to target language B. The translation module 2124 from language source A to target language B sends translation text [2128] to the TTS (Text-to-Speech) module 2131 in language B. The TTS module 2131 in language B sends the TTS audio payload [2133] to the TTS buffer and switcher module 2134. The ASR module in language B 2122 sends its transcript results [2125] to the translation module 2126 from language source B to target language A. The translation module 2126 from language source B to target language A sends translation text [2129] to the TTS (Text-to-Speech) module 2130 in language A. The TTS module 2130 in language A sends the TTS audio payload [2132] to the TTS buffer and switcher module 2134.

The TTS buffer and switcher module 2134:
Acts as a buffer for the TTS playback, meaning TTS playbacks never overlap,
Acts as a switcher for the TTS playback, meaning it alternates between the languages as corresponding TTS payload are received from the TTS modules 2132, 2133,
Sends the TTS audio payload [2135] to User 1's device 2103 which is played by the device's video application alongside the audio received [2108] [2104] from the core video platform 2100,
Sends the TTS audio payload [2136] to User 2's device 2113 which is played by the device's video application alongside the audio received [2117] [2114] from the core video platform 2100.

The captions aggregator and server module 2127:
Acts as an aggregator for the original speech transcripts [2123] [2125], and the translation texts [2128] [2129],
Acts as a server as:
  It sends text payload information [2136] to User 1's device 2103, which is displayed by the device's video application as captions,
  It sends text payload information [2137] to User 2's device 2113 which is displayed by the device's video application as captions.

Figure 22:
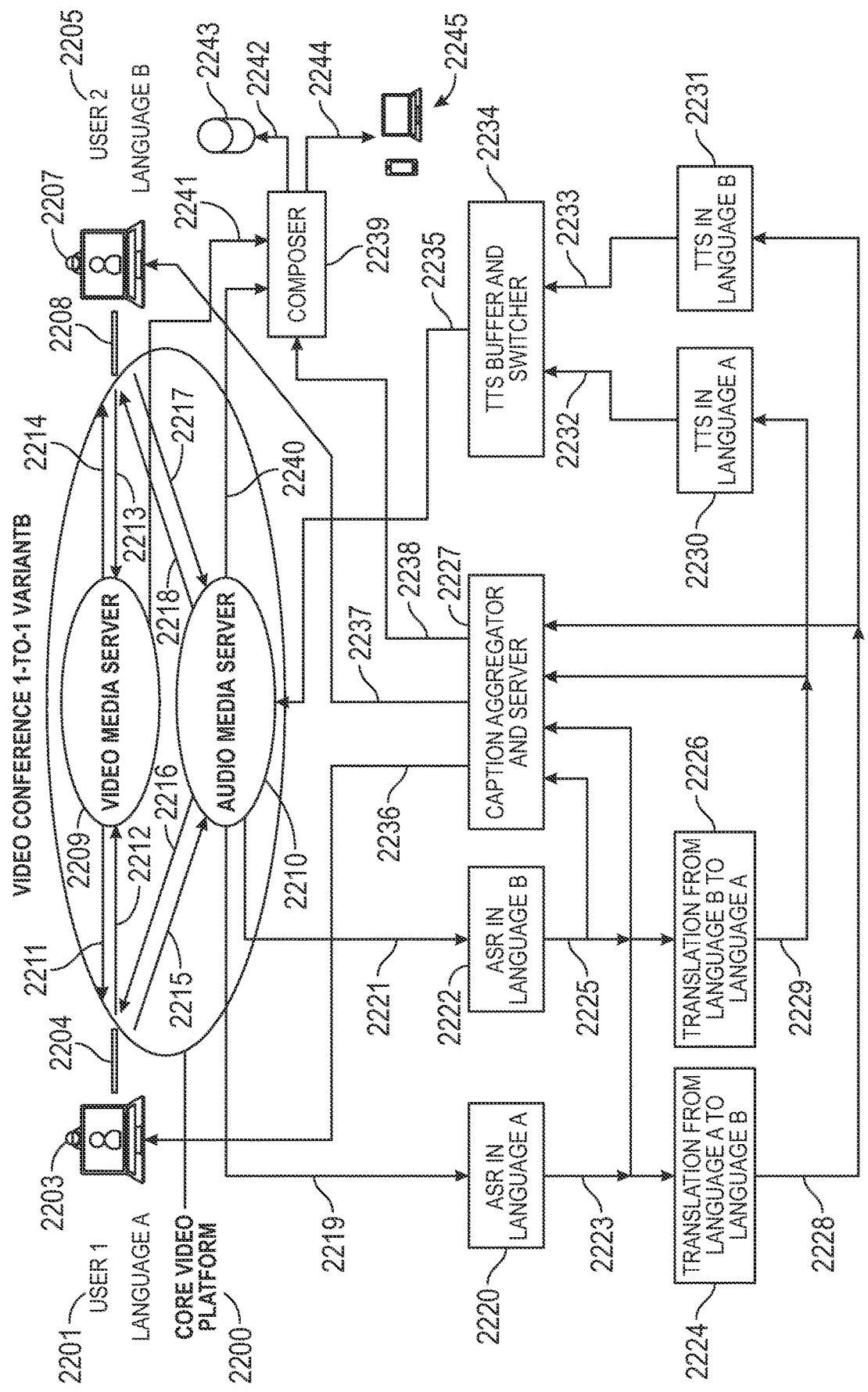
FIG. 22 is a diagram illustrating a second variant of the signal flow paths for a one-to-one video conference in which language translation services are provided.

FIG. 22: Video Conference—One-to-One—Variant B

The core video platform 2200 of FIG. 22 includes a video media server 2209 and an audio media server 2210. User 1 2201 speaks language A with a device 2203 supporting video communications. User 2 2205 speaks language B with a device 2207 supporting video communications. User 1's device 2203 is connected [2204] to the core video platform 2200 using video communications protocols which include WebRTC. SIP (Session Initiation Protocol), H.323. User 2's device 2207 is connected [2208] to the core video platform 2200 using video communications protocols which include WebRTC. SIP (Session Initiation Protocol), H.323.

User 1's device 2203 subscribes to the video media stream from the other participant [2211] and publishes its own video media stream [2212]. User 2's device 2207 subscribes to the video media stream from the other participant [2214] and publishes its own video media stream [2213]. User 1's device 2203 subscribes to the audio media stream from the other participant and the TTS translation media stream [2216], it publishes its own audio media stream [2215]. User 2's device 2207 subscribes to the audio media stream from the other participant and the TTS translation media stream [2218], it publishes its own audio media stream [2117].

There is also an orchestrator application such as that depicted in FIG. 3 and a connector application such as that depicted in FIG. 4 involved; they are not shown in this diagram. It does not affect the explanation on how this video conference works.

The connector application gets the audio from user 1's device through the audio media server 2210 and forwards it [2219] to the ASR (Automatic Speech Recognition) module 2220 in language A. The connector application gets the audio from user 2's device through the audio media server 2210 and forwards it [2221] to the ASR (Automatic Speech Recognition) module 2222 in language B. The ASR module in language A 2220 sends its transcript results [2223] to the translation module 2224 from language source A to target language B.

The translation module 2224 from language source A to target language B sends translation text [2228] to the TTS (Text-to-Speech) module 2231 in language B. The TTS module 2231 in language B sends the TTS audio payload [2233] to the TTS buffer and switcher module 2234.

The ASR module in language B 2222 sends its transcript results [2225] to the translation module 2226 from language source B to target language A. The translation module 2226 from language source B to target language A sends translation text [2229] to the TTS (Text-to-Speech) module 2230 in language A. The TTS module 2230 in language A sends the TTS audio payload [2232] to the TTS buffer and switcher module 2234. The TTS module 2231 in language B sends the TTS audio payload [2233] to the TTS buffer and switcher module 2234.

The TTS buffer and switcher module 2234:
Acts as a buffer for the TTS playback, meaning TTS playbacks never overlap,
Acts as a switcher for the TTS playback, meaning it alternates between the languages as corresponding TTS payload are received from the TTS modules 2232, 2233,
Sends the TTS translation audio payload [2235] to the media server 2210 of the core video platform 2100, each video device 2203, 2207 subscribes to that TTS translation audio payload stream in addition to the audio stream from the other device 2216, 2218.

The captions aggregator and server module 2227:
Acts as an aggregator for the original speech transcripts [2223] [2225], and the translation texts [2228] [2229],
Acts as a server as:
  It sends those text payload information [2236] to User 1's device 2203 which is displayed by the device's video application as captions,
  It sends those text payload information [2237] to User 2's device 2207 which is displayed by the device's video application as captions.

The composer module [2239]:
Subscribes to all video streams [2241] published by the devices 2203, 2207,
Subscribes to all audio streams published by the devices 2203, 2207 and the TTS translation audio stream [2240],
Receives the text payloads [2238] from the captions aggregator and server module 2227.
It creates a custom combination of the different video streams, audio streams including TTS translations, captions from received payloads, which is used for recording [2242], recording storage [2243] and for real-time broadcast or streaming broadcast of video with audio, and captions [2244] to video devices or audio-only devices 2245.

Figure 23:
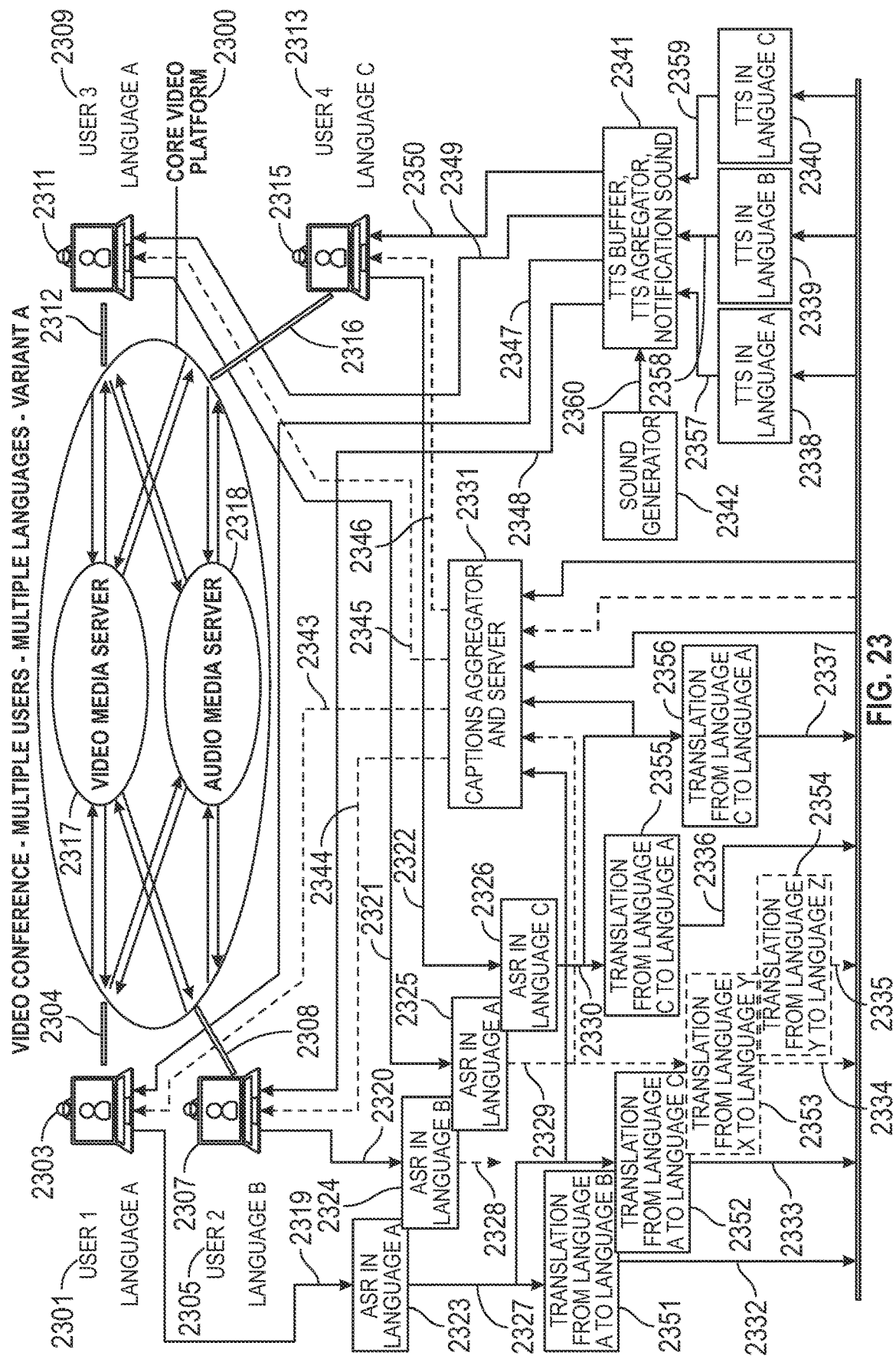
FIG. 23 is a diagram illustrating a first variant of the signal flow paths for a multi-party and multi-language video conference in which language translation services are provided.

FIG. 23: Video Conference—Multiple Users—Multiple Languages—Variant A

The core video platform 2300 of FIG. 23 includes a video media server 2317 and an audio media server 2318. User 1 2301 speaks language A with a device 2303 supporting video communications. User 2 2305 speaks language B with a device 2307 supporting video communications. User 3 2309 speaks also language A with a device 2311 supporting video communications. User 4 2313 speaks language C with a device 2315 supporting video communications.

User devices 2303, 2307, 2311 and 2315 are connected [2304] [2308] [2312] [2316] to the core video platform 2300 using video communications protocols which include WebRTC. SIP (Session Initiation Protocol), H.323. User devices 2303, 2307, 2311 and 2315 subscribe to the video media streams from the other participants and publish their own respective video media stream [2304] [2308] [2312] [2316]. User devices 2303, 2307, 2311 and 2315 subscribe to the audio media streams from the other participants and publish their own respective audio media streams [2304] [2308] [2312] [2316].

There is also an orchestrator application such as that depicted in FIG. 3 and a connector application such as that depicted in FIG. 4 involved; they are not shown in this diagram. It does not affect the explanation on how this video conference works.

User devices 2303, 2307, 2311 and 2315 also send a duplicate [2319] [2320] [2321] [2322] of their respective published audio media stream to the ASR (Automatic Speech Recognition) modules 2323, 2324, 2325 and 2326 in the corresponding languages. There is one ASR module instance per user. The ASR modules 2323, 2324, 2325 and 2326 send their transcript results [2327] [2328] [2329] [2330] to the respective translation modules 2351, 2352, 2353, 2354, 2355 and 2356.

For diagram simplification:
Translation modules downstream of ASR module in language B 2324 are not shown, they exist on the actual functional system,
Translation modules downstream of ASR module in language A 2325 are shown but in a generic description way, meaning there would be as many modules as needed for handling more users and more languages in a video conference.

The translation modules 2351, 2352, 2353, 2354, 2355 and 2356 send translation texts [2332] [2333] [2334] [2335] [2336] [2337] to the respective TTS (Text-to-Speech) modules 2338, 2339 and 2340.

The TTS modules 2338, 2339 and 2340 send the TTS audio payload [2357] [2358] [2359] to the TTS buffer and switcher module 2341.

The TTS buffer, TTS aggregator, notification sound module 2341:
Acts as a buffer for the TTS playback, meaning TTS playbacks for a given language never overlap, and it plays a notification sound [2360] from a sound generator 2342 to a user when TI'S playback in other languages are still in progress,
Acts as an aggregator for the TTS playback, meaning it collects the TTS translations for all target languages [2357] [2358] [2359] as received from the TTS modules 2338, 2339 and 2340,
Sends the TTS audio payload [2348] [2347] [2349] [2350] to respective user devices 2303, 2307, 2311 and 2315 which is played by the each device's video application alongside the audio received [2304] [2308] [2312] [2316] from the core video platform 2300.

The captions aggregator and server module 2331:
Acts as an aggregator for the original speech transcripts [2327] [2328] [2329] [2330], and the translation texts [2332] [2333] [2334] [2335] [2336] [2337],
Acts as a server as sends those text payload information [2343] [2344] [2345] [2346] to the respective user devices device 2303, 2307, 2311 and 2315, which is displayed by the devices video applications as captions.

Figure 24:
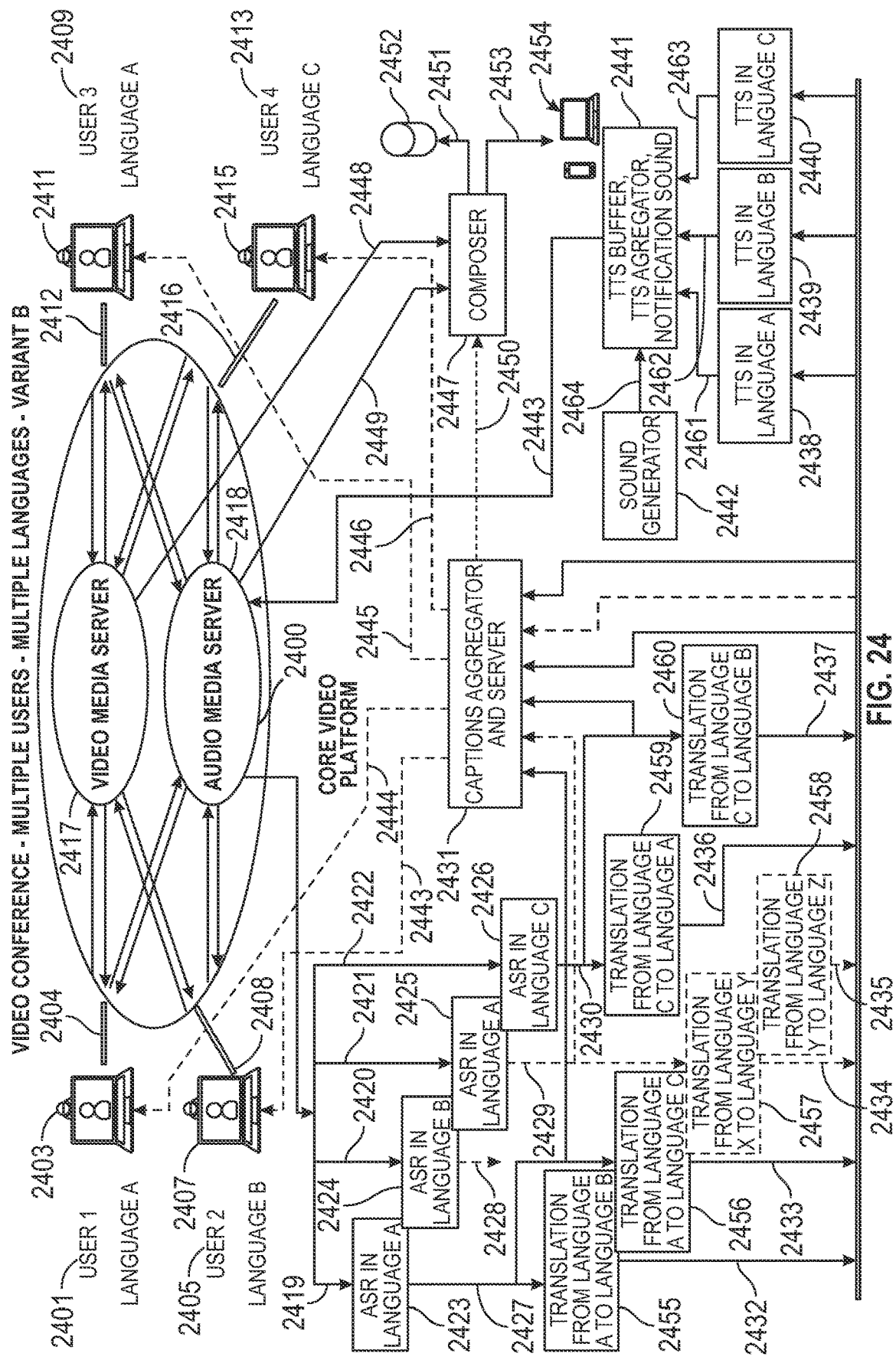
FIG. 24 is a diagram illustrating a second variant of the signal flow paths for a multi-party and multi-language video conference in which language translation services are provided.

FIG. 24: Video Conference—Multiple Users—Multiple Languages—Variant B

The core video platform 2400 of FIG. 24 includes a video media server 2417 and an audio media server 2418. User 1 2401 speaks language A with a device 2403 supporting video communications. User 2 2405 speaks language B with a device 2407 supporting video communications. User 3 2409 speaks also language A with a device 2411 supporting video communications. User 4 2413 speaks language C with a device 2415 supporting video communications.

User devices 2403, 2407, 2411 and 2415 are connected [2404] [2408] [2412] [2416] to the core video platform 2400 using video communications protocols which include WebRTC. SIP (Session Initiation Protocol), H.323. User devices 2403, 2407, 2411 and 2415 subscribe to the video media streams from the other participants and publish their own respective video media streams [2404] [2408] [2412] [2416]. User devices 2403, 2407, 2411 and 2415 subscribe to the audio media streams from the other participants, subscribe to the translation TTS audio for their respective language, and publish their own respective audio media streams [2404] [2408] [2412] [2416].

There is also an orchestrator application such as that depicted in FIG. 3 and a connector application such as that depicted in FIG. 4 involved; they are not shown in this diagram. It does not affect the explanation on how this video conference works.

The connector application gets the respective audio from the users devices through the audio media server 2418 and forward them [2419] [2420] [2421] [2422] to the respective ASR (Automatic Speech Recognition) modules 2423, 2424, 2425 and 2426. The ASR modules 2423, 2424, 2425 and 2426 send their transcript results [2427] [2428] [2429] [2430] to the respective translation modules 2455, 2456, 2457, 2458, 2459 and 2460.

For diagram simplification:
Translation modules downstream of ASR module in language B[2424 are not shown, they exist on the actual functional system,
Translation modules downstream of ASR module in language A 2425 are shown but in a generic description way, meaning there would be as many modules as needed for handling more users and more languages in a video conference.

The translation modules 2455, 2456, 2457, 2458, 2459 and 2460 send translation texts [2432] [2433] [2434] [2435] [2436] [2437] to the respective TTS (Text-to-Speech) modules 2438, 2439 and 2440. The TTS modules 2438, 2439 and 2440 send the TTS audio payload [2461] [2462] [2463] to the TTS buffer and switcher module 2441.

The TTS buffer, TTS aggregator, notification sound module 2441:
Acts as a buffer for the TTS playback, meaning TTS playbacks fora given language never overlap, and it plays a notification sound [2464] from the sound generator 2442 to a user when TTS playback in other languages are still in progress,
Acts as an aggregator for the TTS playback, meaning it collects the TTS translations for all target languages [2443] as received from the TTS modules 2438, 2439 and 2440,
Arrow [2443] in the diagram in fact represents all the TTS translation audio streams, one stream per target language,
Sends the TTS audio payload streams [2443] to the audio media server 2418, each respective user device 2403, 2407, 2411 and 2415 subscribe to their TTS translation audio stream for their respective language.

The captions aggregator and server module 2431:
Acts as an aggregator for the original speech transcripts [2427] [2428] [2429] [2430], and the translation texts [2432] [2433] [2434] [2435] [2436] [2437],
Acts as a server as:
It sends text payload information [2443] [2444] [2445] [2446] to the respective user devices device 2403, 2407, 2411 and 2415 which get displayed by the devices video applications as captions.

The composer module 2447:
Subscribes to all video streams [2248] published by all devices 2403, 2407, 2411 and 2415,
Subscribes to all audio streams published all devices 2403, 2407, 2411 and 2415 and all TTS translation audio streams [2449],
Receives text payloads [2450] from the captions aggregator and server module 2431,
Creates a custom combination of the different video streams, audio streams including TTS translations, captions from received payloads, which is used for recording [2451], recording storage [2452] and for real-time broadcast or streaming broadcast of video with audio, and captions [2453] to video devices or audio-only devices 2454.

Figure 25:
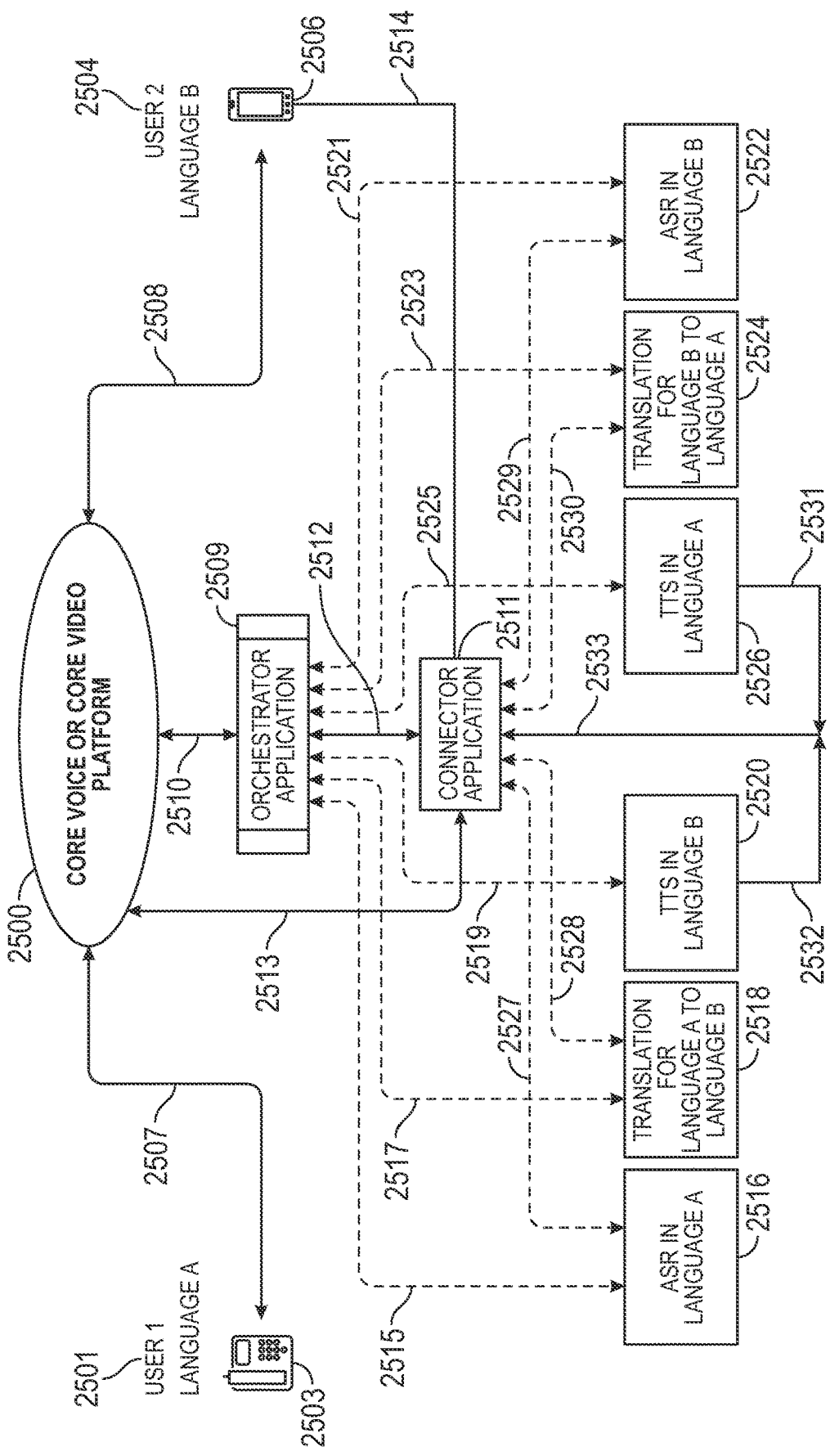
FIG. 25 is a diagram illustrating a high level description of the different main components of the language translation services.

FIG. 25: Automated Speech Interpretation Main Components

The automated speech interpretation system of the disclosed technology includes the core voice or core video platform 2500. The voice core or core video platform 2500 handles connections [2507] & [2508] to/from audio-only devices 2503 and video devices 2506 of User 1 2501 speaking Language A and User 2 2504 speaking Language B, respectively.

The orchestrator application 2509 communicates with the core voice or core video platform 2500, the connector application 2511 and other modules as shown via paths [2515], [2517], [2519], [2525], [2523] & [2521].

The connector application 2511 handles:
The forwarding of audio media [2513] from the core voice or core video platform 2500 to the ASR (Automatic Speech Recognition) modules 2516 and 2522 via paths 2527 and 2529 respectively,
In some cases the forwarding of audio media [2514] directly from video devices 2506 or through the core video platform 2508 and 2513 to the ASR modules 2516 and 2522,
The forwarding of data from one component to the next, for instance forwarding an ASR module 2516 and 2522 output to a translation module 2518 and 2524 along paths 2528 and 2530 respectively, forwarding a translation module 2518 and 2524 output to a TTS module 2520 and 2526 or to the orchestrator application 2509 via path [2519] & [2525] & [2512], forwarding a TTS output [2531], [2532], [2533] to the core voice 2500, core video platform 2500, or to a video device 2514 and 2506.

For easier understanding the orchestrator application and the connector application are separated in this diagram, but functionally they could be combined.

The audio media [2507] from/to an audio-only device is forwarded to/from the connector application 2511 through the core voice platform 2500.

The audio media from/to a video device 2506 is forwarded to/from the connector application 2511:
Either through the core video platform 2508 and 2513,
Or directly [2514] between the video device 2506 and the connector application 2511,
Also for one direction, the audio media may go through the core video platform 2508, and the other direction may directly transmit [2514] between the device and the connector application.

Figure 26:
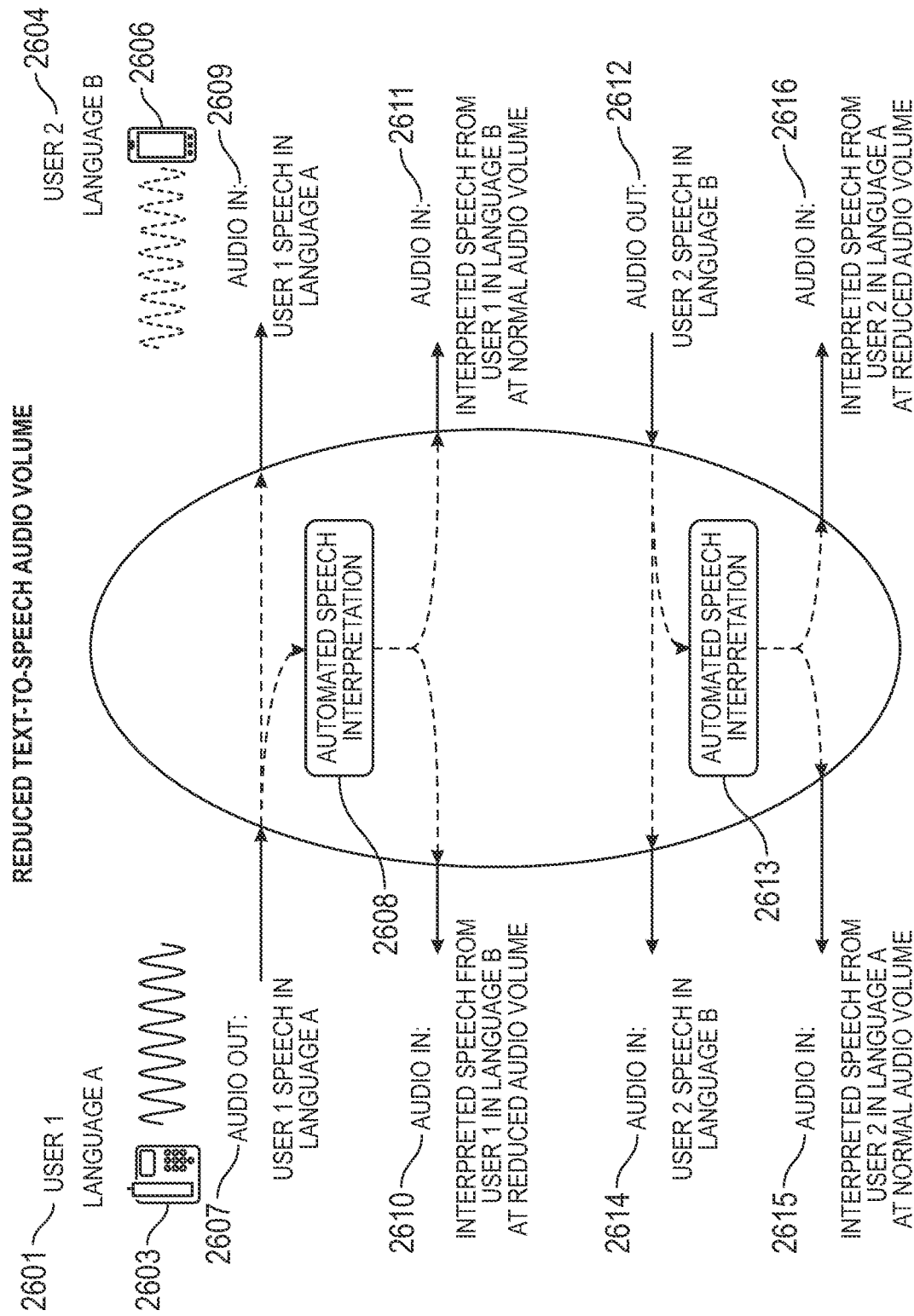
FIG. 26 is a diagram illustrating how the user experience of a communication session may be improved by reducing the audio volume for the other party's target language translations.

FIG. 26: Reduced Audio Volume for Text-to-Speech Target Translation Languages FIG. 26 depicts the general flow of audio during a communication session in accordance with the disclosed technology when conditions for reduced volume are desired/required. Specifically and to improve the user's experience, the system of the subject invention provides the option to play back the TTS (Text-to-Speech) of a target translation language unfamiliar to a participant at a reduced audio volume [2610] [2616] while other target translation languages familiar to a participant are played at normal audio volume [2611] [2615].

FIG. 27: Barge-In

Figure 27:
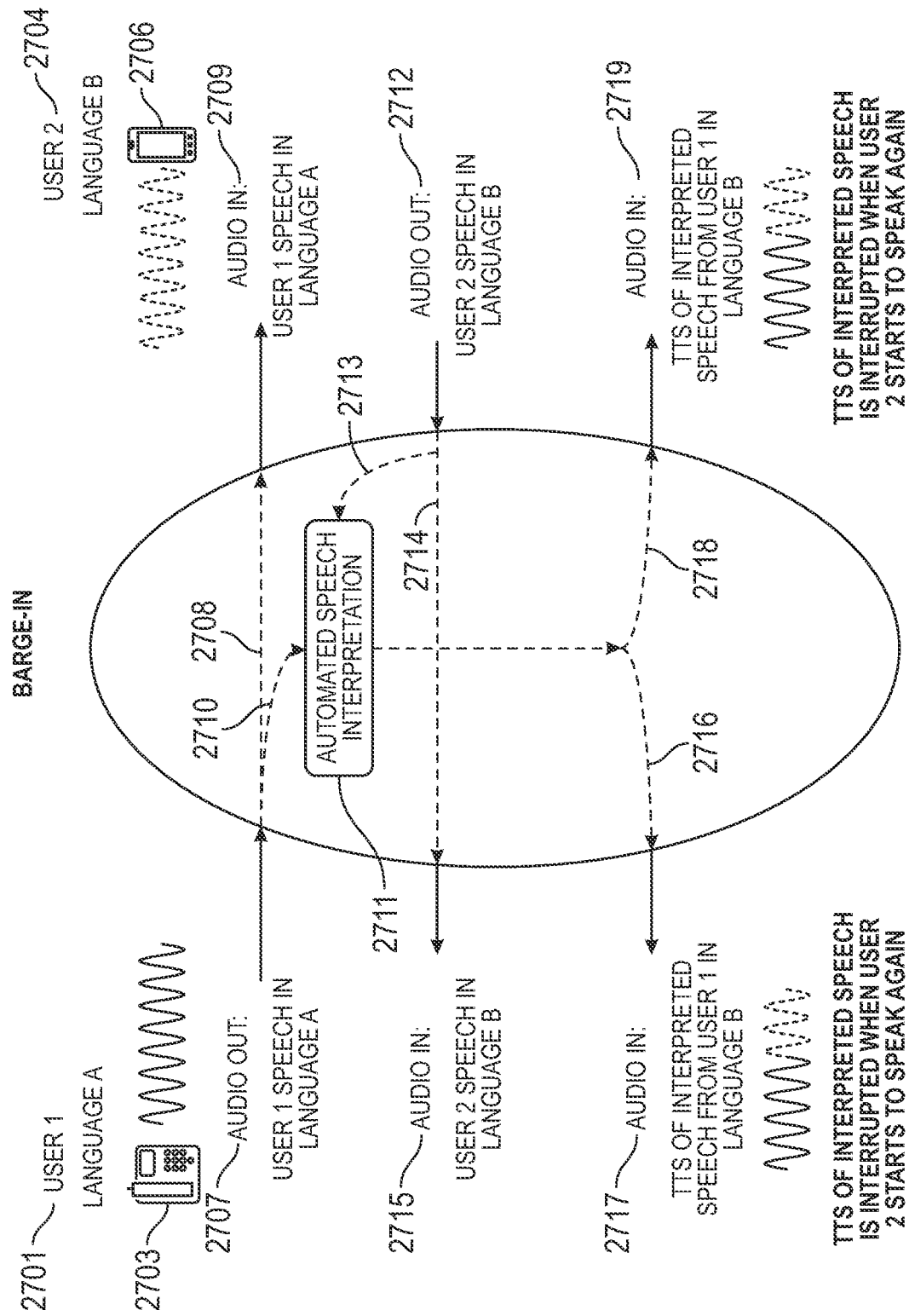
FIG. 27 is a diagram illustrating how the user experience of a communication session may be improved with barge-in capability.

FIG. 27 depicts the general flow of audio during a communication session in accordance with the subject invention when conditions for barge-in of the current media flow is desired/required. Specifically and to improve the user's experience, the system provides the option for a participant to interrupt their own target translation text-to-speech by starting to speak. For example, when the user generally understood the original speech in another language, the user does not need to continue to listen to the whole corresponding translation text-to-speech. This capability is also known as barge-in.

Figure 28:
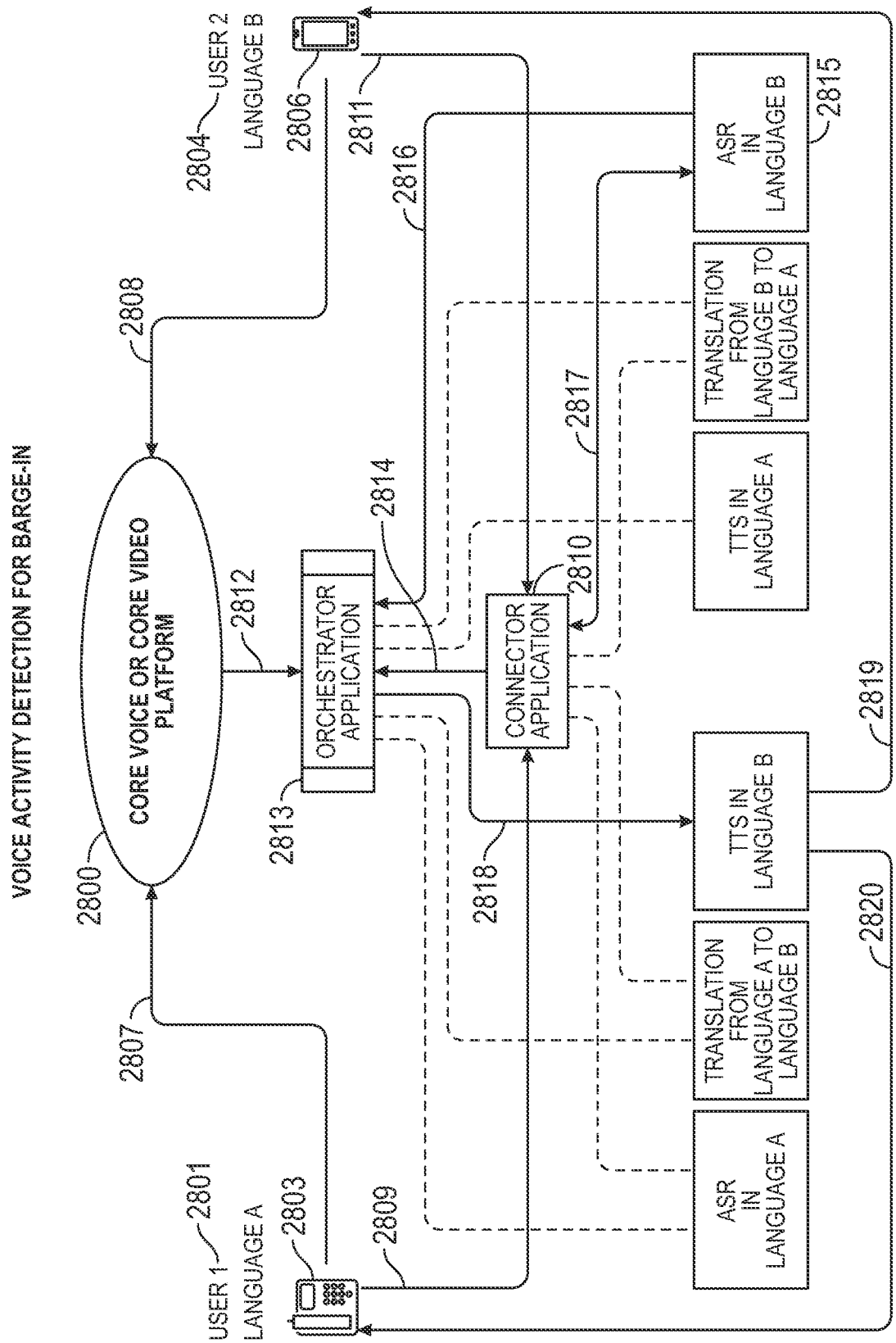

FIG. 28: Voice Activity Detection for Barge-In

FIG. 28 depicts the details on the corresponding voice activity detection during the barge-in feature. The system of the subject invention detects that the participant started speaking, when either:
The Automatic Speech Recognition (ASR) module returns [2816] [2817] its first partial transcript,
The Automatic Speech Recognition (ASR) module notifies [2816] [2817] that Voice Activity has been detected,
The Core Voice or Core Video platform [2800] notifies [2812] that Voice Activity has been detected,
Or the connector application detects voice [2814] using its own Voice Activity Detection (VAD) capability.

Figure 29:
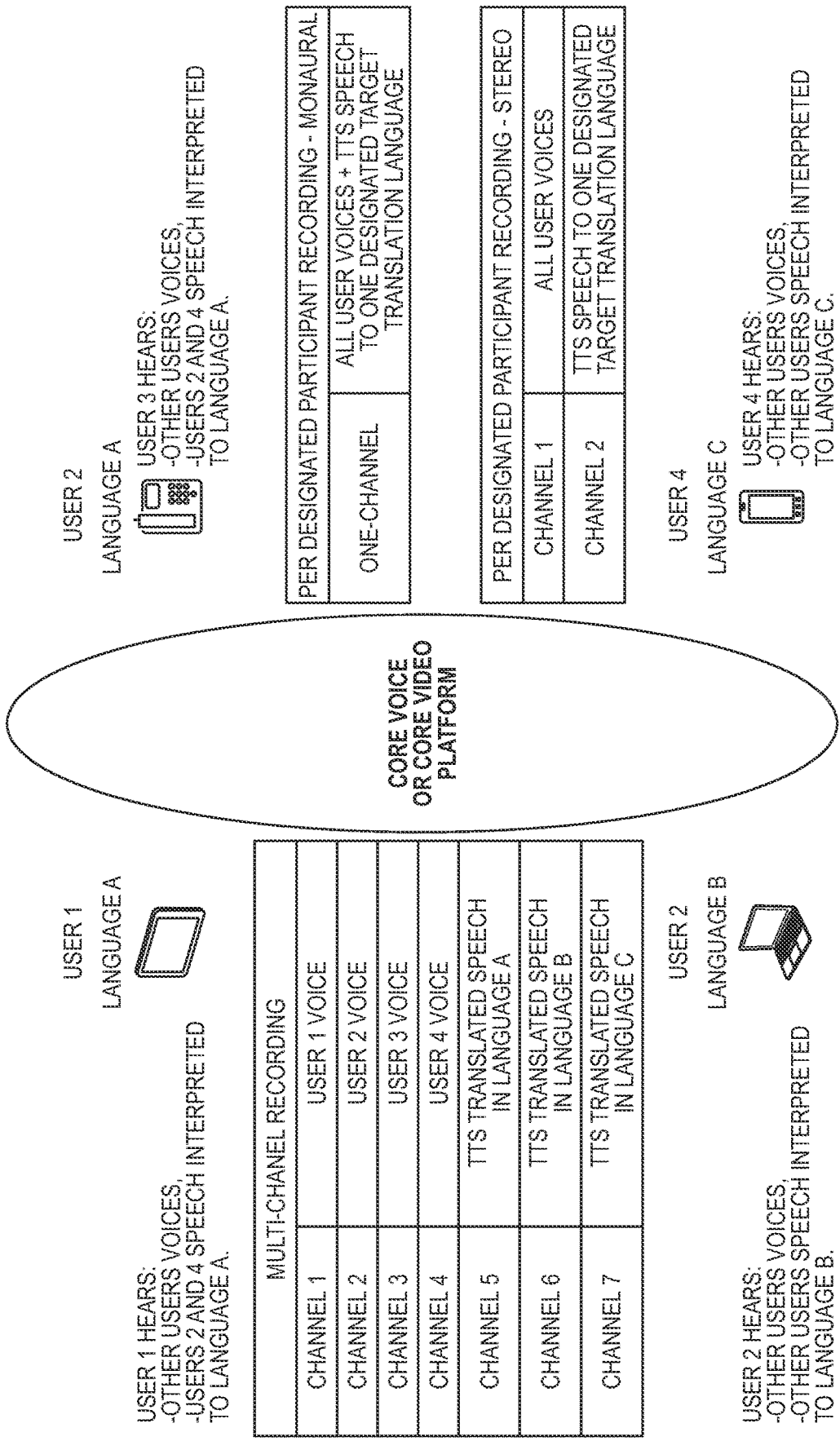
FIG. 29 is a diagram illustrating the different audio recording options for an audio-only or video conference in which language translation services are provided.

FIG. 29: Audio-Only Recording of Voice or Video Calls

Figure 30:
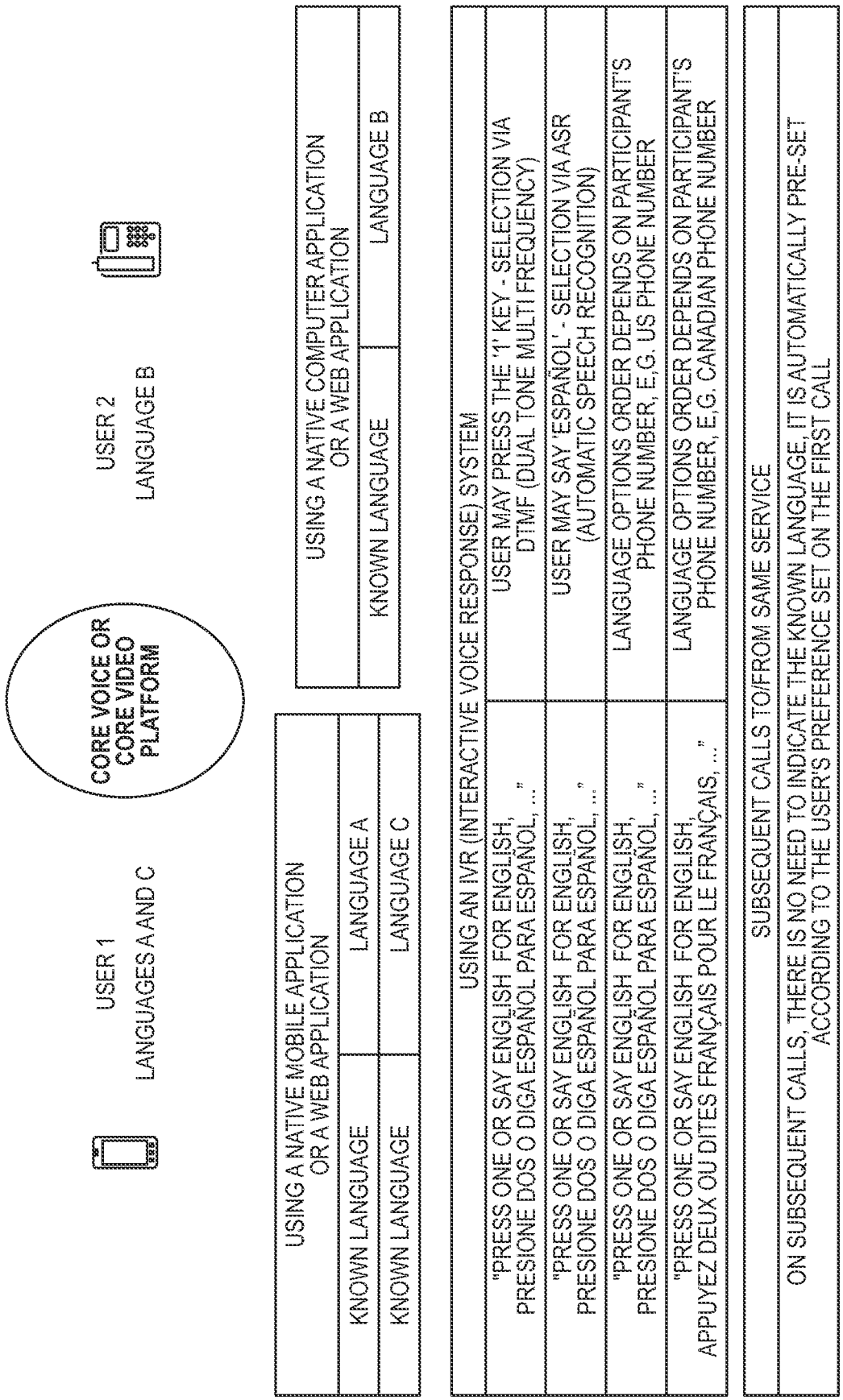
FIG. 30 is a diagram illustrating how languages are associated with participants in an audio or video conference in which language translation services are provided.

A system embodying the disclosed technology further provides for the option to record audio in a number of different ways. FIG. 29 depicts four Users and three tables showing how different channels are reserved for different recording purposes/environments of these Users:
Multi-channel audio recording
One channel per user's speech audio
One channel per translation TTS (Text-to-Speech) language
Per user—Monaural audio recording
Monaural recording with all users's speech audio and translation TTS played to a specific user
Per user—Two-channel/stereo audio recording
One channel with all users's speech audio
Other channel with translation TTS played to a specific user
For one-to-one device call or session—Monaural audio recording
Monaural recording with speech audio from both devices and translation TTS played to both devices
For one-to-one device call or session—Two-channel/stereo audio recording:
One channel with participants' voice audio from both devices, which may include multiple users speaking the same languages or different languages on the same device
Other channel with TTS played to both devices FIG. 30: Known Languages Selection An additional feature of the disclosed technology provides a participant the ability to indicate one or more known languages when entering into a communication session via the core voice or core video platform described earlier. FIG.

30 depicts two users and the various options (via tabular format) of how they can indicate their known language. The options include:

Via an application (web based, native mobile application, desktop application),

Via DTMF, using touch tones on a landline phone, VoIP phone, cell phone cellular/VoIP/SIP/WebRTC mobile applications, web applications, computer applications, Via voice, e.g. "Press 1 or say English for English, presione 2 o diga español para español" voice prompt, then the user says "English", or "español". First language choices in the list may depend on the users phone number. For example a user with a US phone number will have English and Spanish languages as the first choices, another user with a Canadian phone number will have English and French languages as first choices.

The language associations may be set for the caller and for the called party. Optionally, the users would not have to indicate known languages again on subsequent communications as associations between users and corresponding languages were previously established. Known spoken languages to the user do not get translated if the other user speaks a language known to the user.

Figure 31:
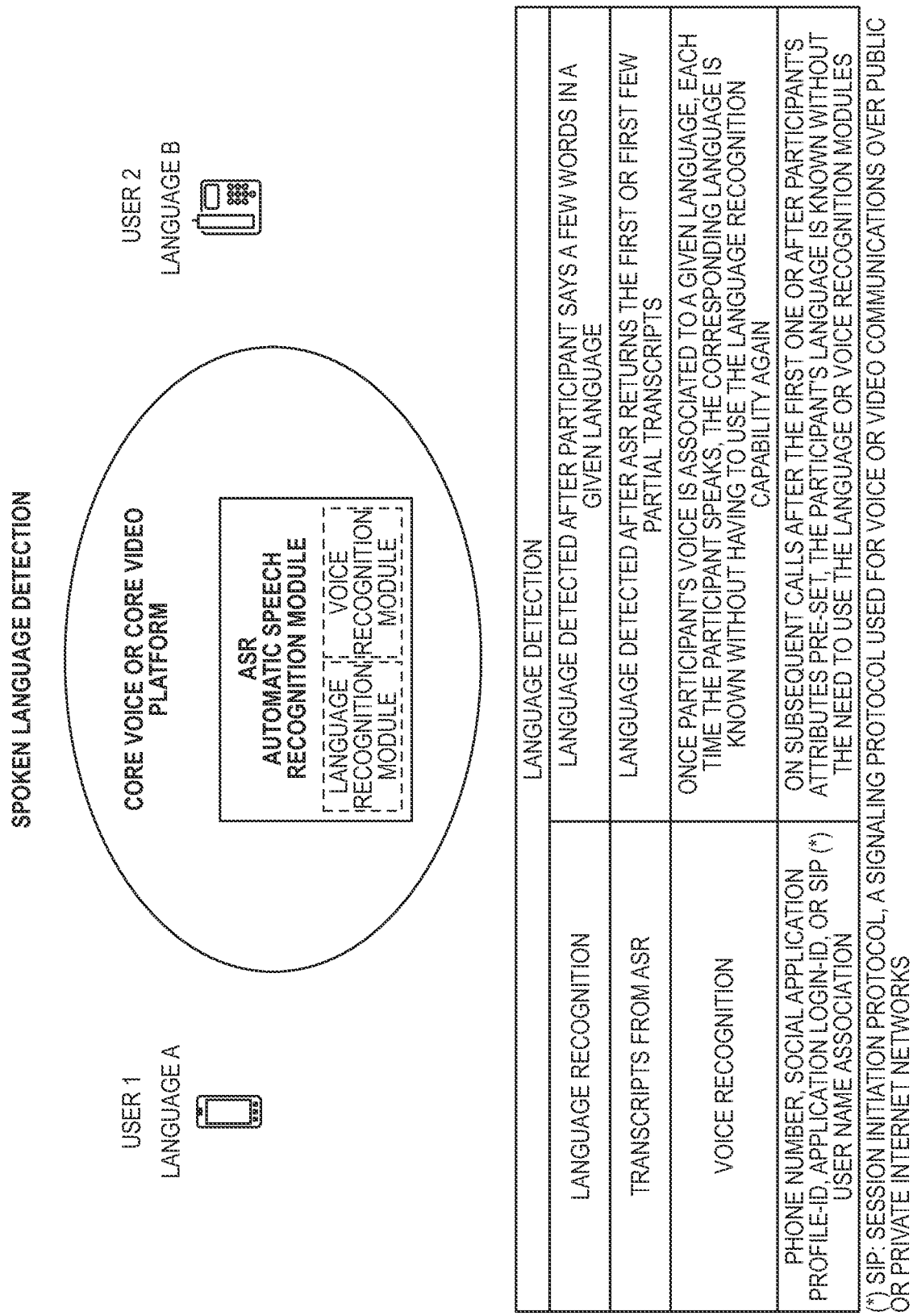
FIG. 31 is a diagram illustrating how languages are dynamically associated with participants in an audio or video conference in which language translation services are provided.

FIG. 31: Spoken Language Detection

Concepts to understand:

Speech recognition detects the words and sentences in a specific language when a person speaks and produces text transcripts.

Voice recognition detects who is speaking, or detects if a different person than the one expected is speaking. It is directly related to the voice biometrics of a person speaking.

Real-time dynamic detection or association of a user's language provides for:

multiple participants speaking different languages on a same device, face-to-face conversation with real-time translation on the same device without the need to press a button when it is the turn of another person to speak in a different language The language that Users 1 and 2 use to interact with a core voice or video platform in accordance with the disclosed technology invention can be dynamically set by referring to the table in FIG. 31. The options include:

By having the user start to say a few words, which is to detect the language from the speech recognition transcripts, By associating a language to a specific recognized voice using voice recognition/voice biometrics, By associating a language to the user's device phone number, social application profile ID, application login ID, or SIP (*) user name.

Figure 32:
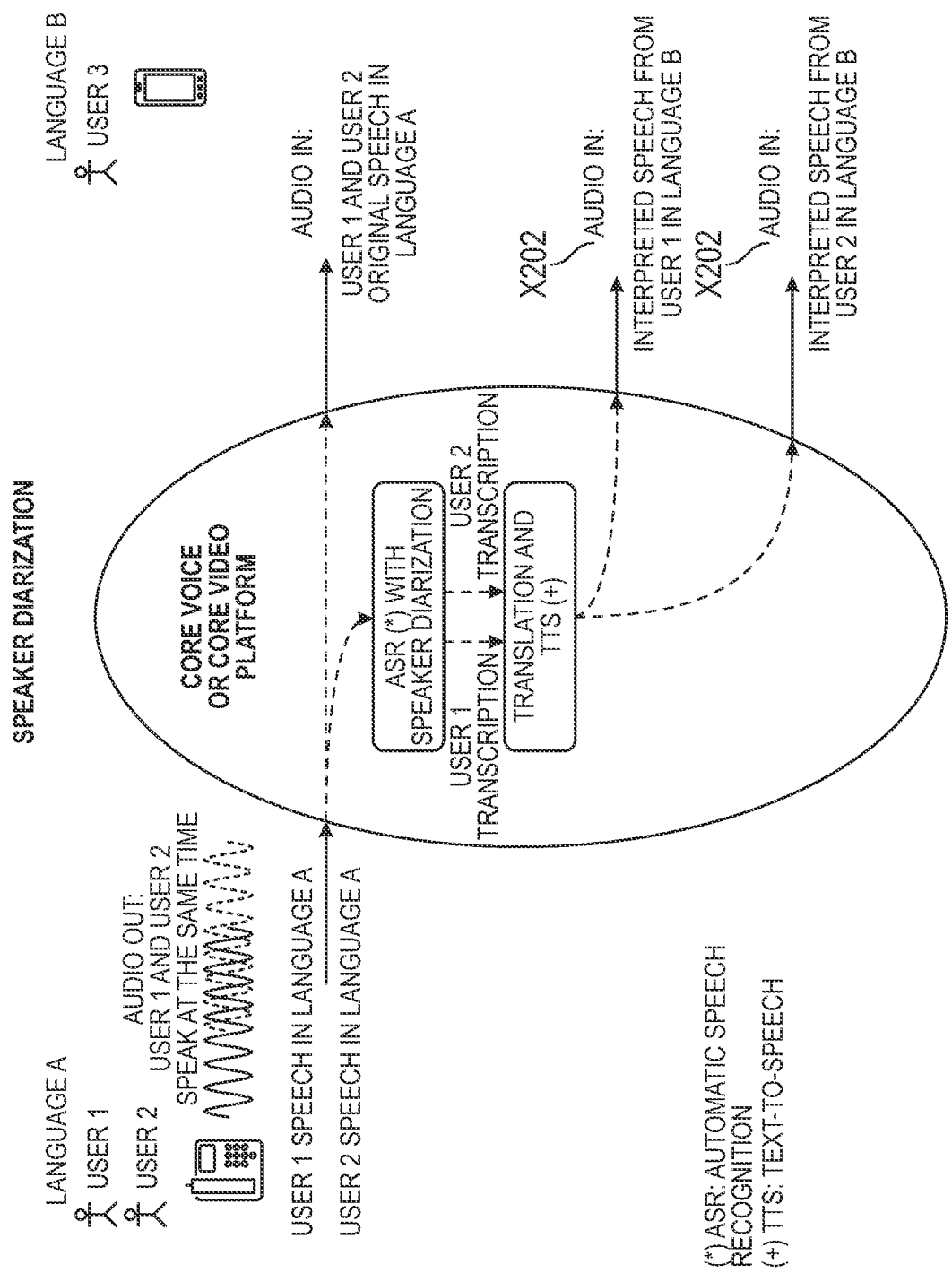
FIG. 32 is a diagram illustrating the signal flow when two participants next to each other speak at the same time to the same device in a conference in which language translation services are provided.

(*) SIP: Session Initiation Protocol, a signaling protocol used for voice and video communications om private or public internet networks FIG. 32: Speaker Diarization When supporting multiple users on the same device, speaker diarization is needed to separate the speech from multiple speakers speaking at the same time on the same device. FIG. 32 depicts this feature in detail. Diarization is accomplished in a core voice or video platform embodying the disclosed technology. Specifically, the ASR module separates the different user speech before sending such content for translation/transcription and TTS operations.

Each audio or video device is mapped one-to-one to a dedicated audio channel, for instance a WebSocket, WebRTC, or SIP connection, so there is no overlap or mixing of the audio streams from different devices which are fed to ASR (Automatic Speech Recognition) modules. Even if the original speech from different users were overlapping, the corresponding TTS translations will be played without overlap.

Figure 33:
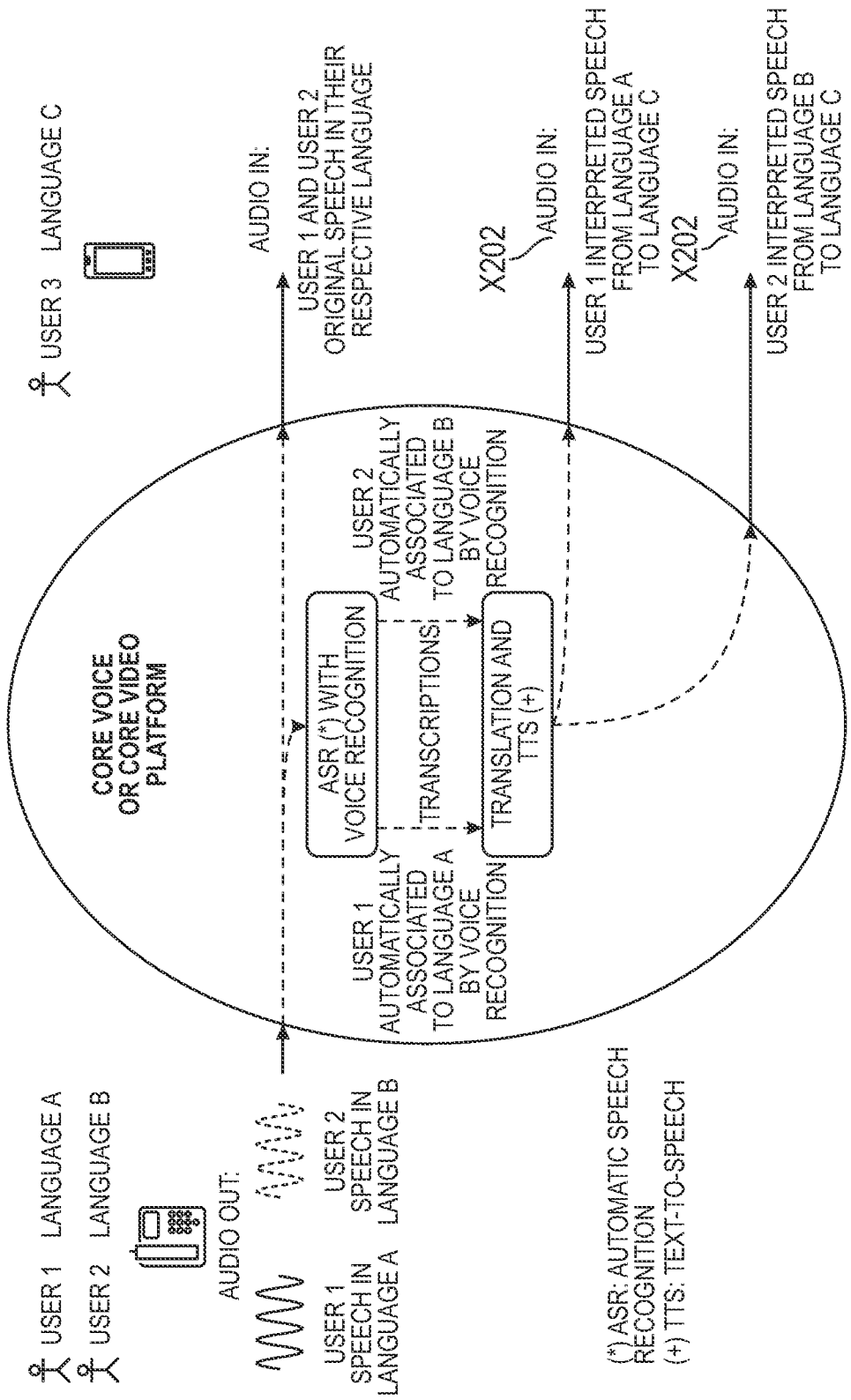
FIG. 33 is a diagram illustrating a first variant of the signal flow where multiple participants speaking different languages speak to the same device in a conference in which language translation services are provided.

FIG. 33: Multiple Users and Languages on the Same Device—Variant A

The problem presented above becomes more complex when users are speaking different languages. Associating a language to a user using voice recognition allows multiple participants speaking different languages to be on a same device. For example and as shown in FIG. 33, when multiple users [User 1] [User 2] are using and speaking from the same device, there is no need to press a button or key when another user starts to speak with another language. The ASR module still separates the different user speech before sending such content for translation/transcription and TTS operations and uses voice recognition to associate a user with a given language.

The user [User 3] on the other end of the call, will hear the relevant translations from a source language or from the other source language to the known target language depending on who is speaking between the users [User 1] [User 2] using the same device.

Figure 34:
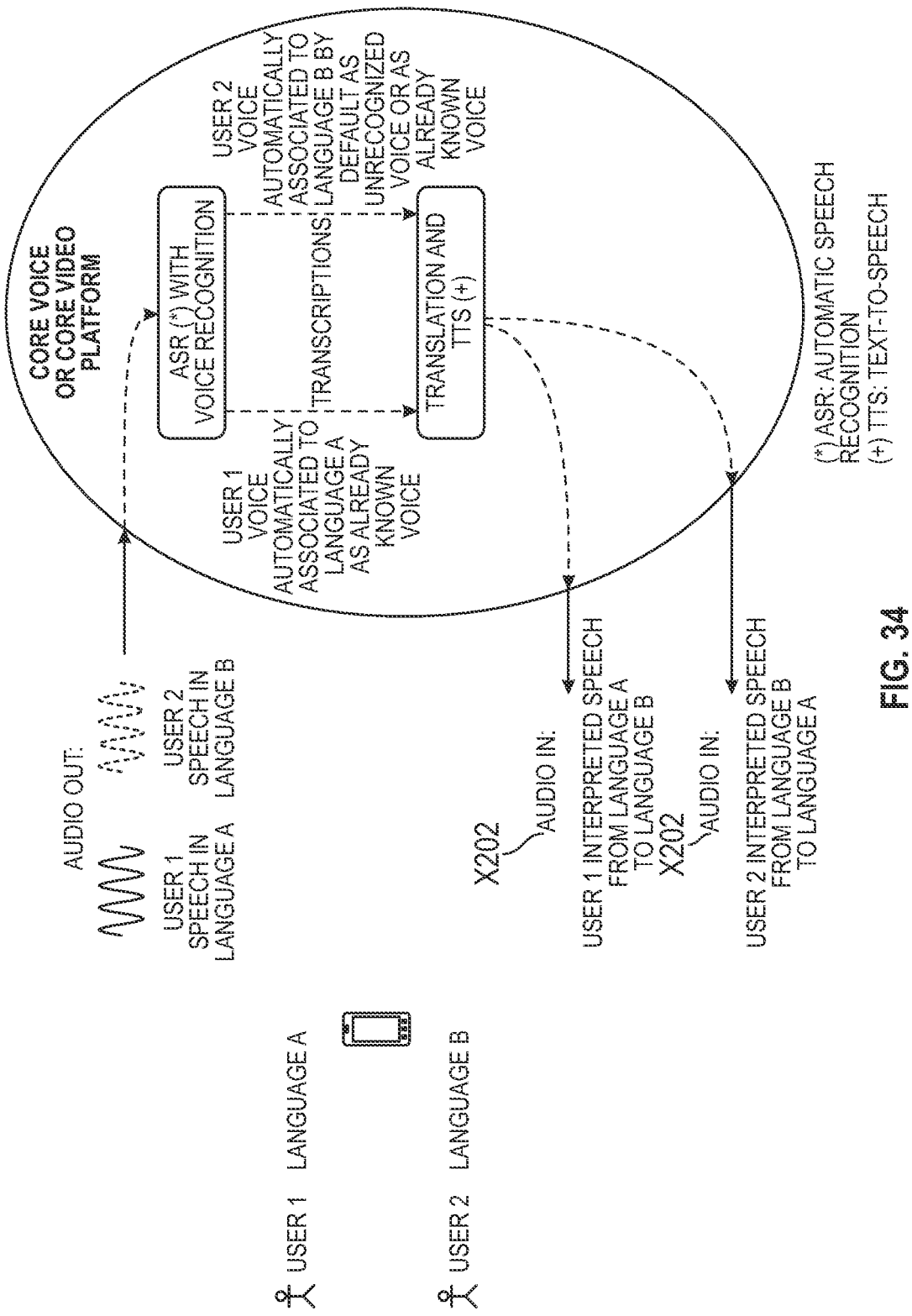
FIG. 34 is a diagram illustrating a second variant of the signal flow where multiple participants speaking different languages speak to the same device in a conference in which language translation services are provided.

FIG. 34: Multiple Users and Languages on the Same Device—Variant B

In an alternate scenario depicted in FIG. 34, associating a language to a user using voice recognition allows face-to-face conversation with real-time translation on the same device without the need to press a button when another person needs to speak in a different language.

When multiple users [User 1] [User 2] are using and speaking to the same device, there is no need to press a button or key when another user starts to speak with another language.

The relevant translations from a source language or from the other source language to the counterpart target language automatically occurs depending on who is speaking between the users [User 1] [User 2] speaking to the same device.

Figure 35:
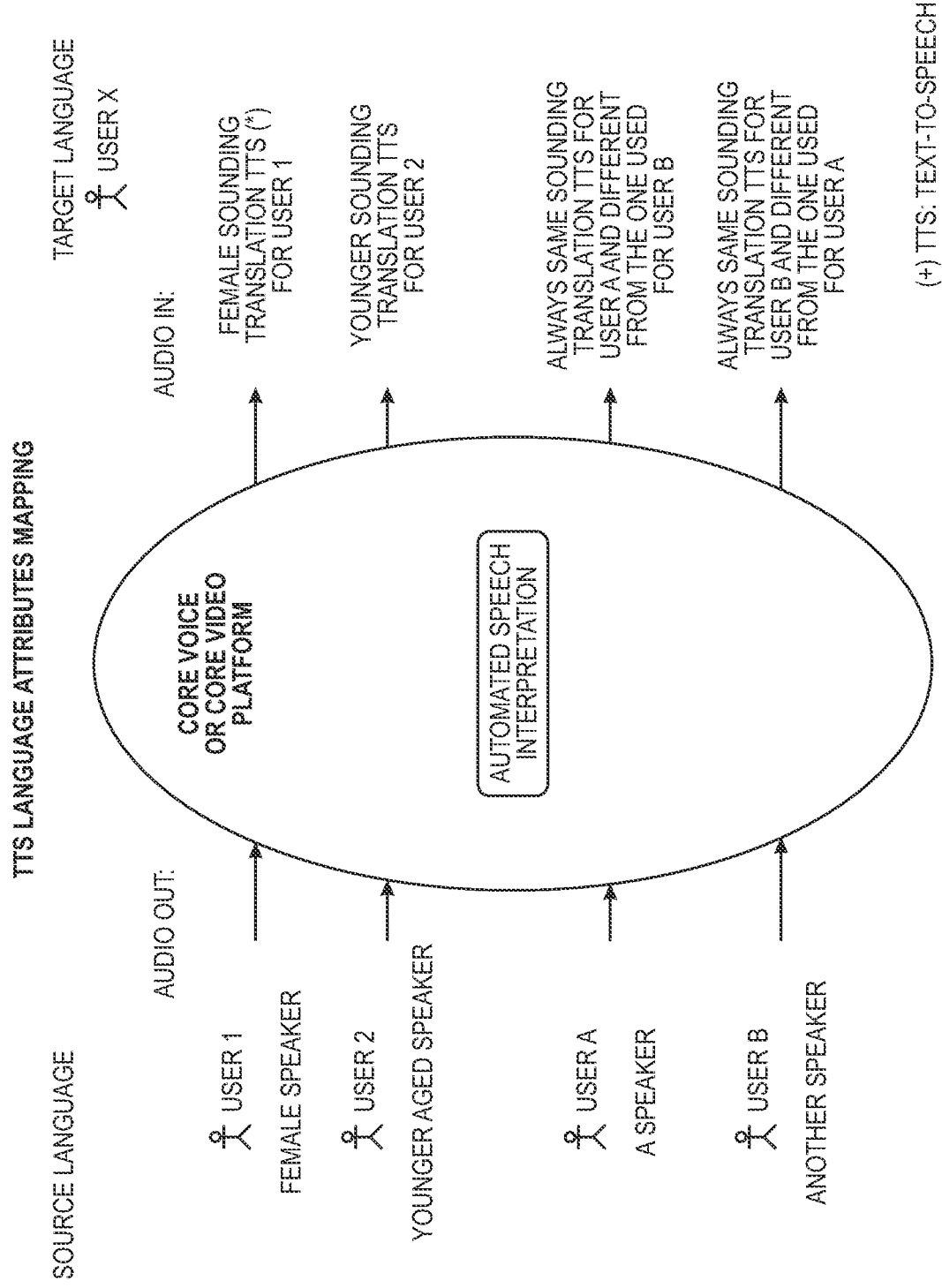
FIG. 35 is a diagram illustrating how translation text-to-speech characteristics are linked to the original speaker's voice attributes in a conference in which language translation services are provided.

FIG. 35: Text-to-Speech Attributes Depending on Original Speaker Attributes

The system may automatically select the target language text-to-speech (TTS) attributes depending on the original speaker attributes as per the mapping diagram of FIG. 35.

For instance,

The translation TTS voice sounds female when the original speaker is a female person, The translation TTS voice sounds younger when the original speaker is a younger person, When there are multiple speakers, each speaker will have a different translation TTS voice.

Figure 36:
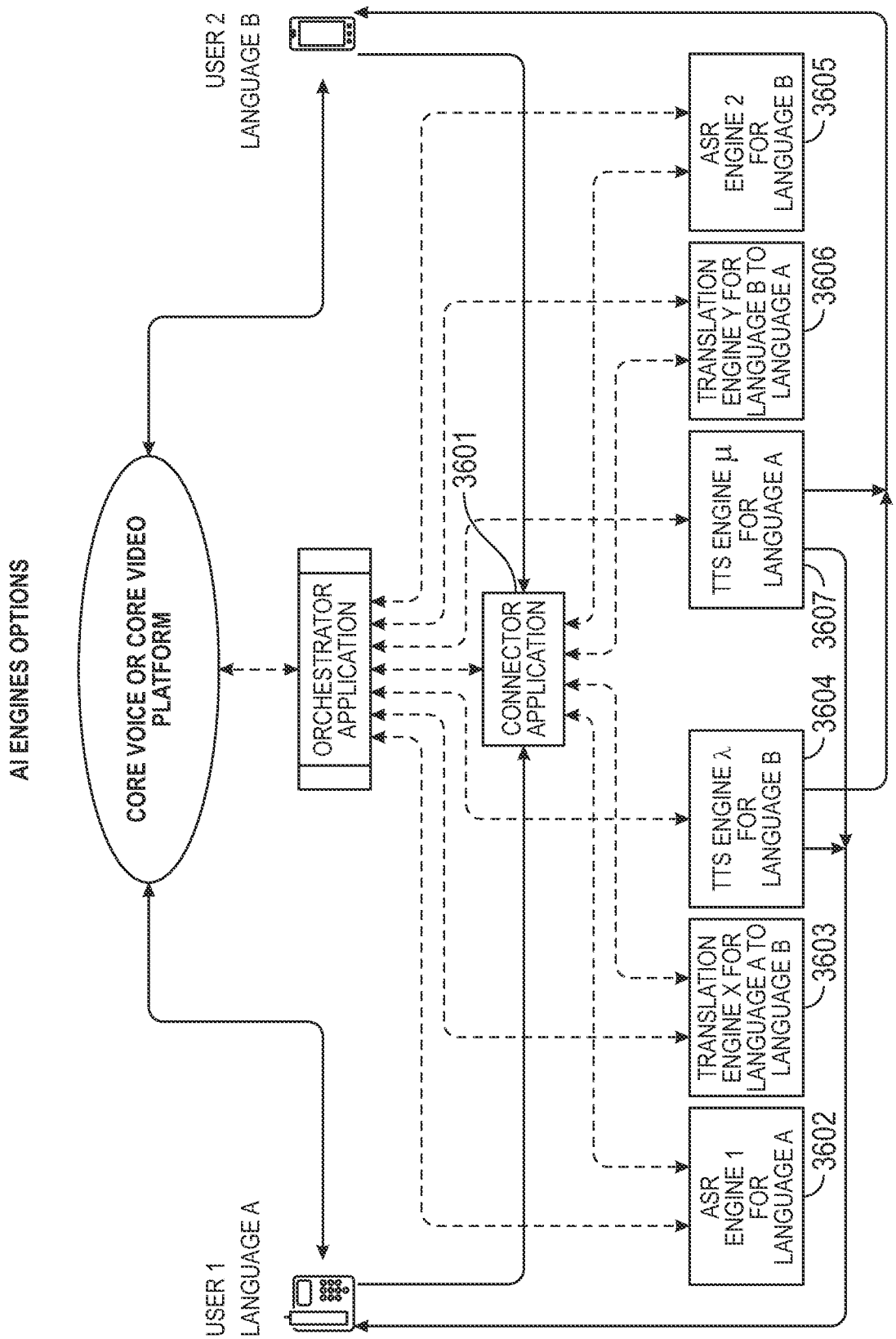
FIG. 36 is a diagram illustrating the options for the artificial intelligence components in a conference in which language translation services are provided.

FIG. 36: AI Engines Options

The Real-Time interpretation solution disclosed herein can dynamically select or statically pre-select the AI (Artificial Intelligence) engines for ASR (Automatic Speech Recognition), translation, and TTS (Text-to-Speech). FIG. 36 depicts an exemplary system of the subject invention with such components that can be subjected to this selection methodology.

The system selects the ASR engine per language locale based on a desired combination of:

Accuracy,

Speed,

Cost,

Region availability,

Closed network or publicly resources availability requirements,

Ability to set ASR custom vocabulary, for instance domain/field technical terms, proper nouns, brand names, product names.

The system selects the translation engine per source language locale/destination language locale pair based on a desired combination of:
Translation accuracy,
Spelling accuracy,
Cost,
Region availability, closed network or publicly accessible resources requirements,
Closed network or publicly resources availability requirements,
Ability to set translation custom vocabulary, for instance language expressions, domain/field technical terms, proper nouns, brand names, product names.

The system selects the TTS engine based on a desired combination of:
Cost,
Desired voice style,
Voice gender,
Better natural sounding, non-robotic voice
Region availability,
Closed network or publicly available resources requirements.
Ability to set TTS custom vocabulary, for better or adequate pronunciation,
SSML (Speech Synthesis Markup Language) support or not.

Figure 37:
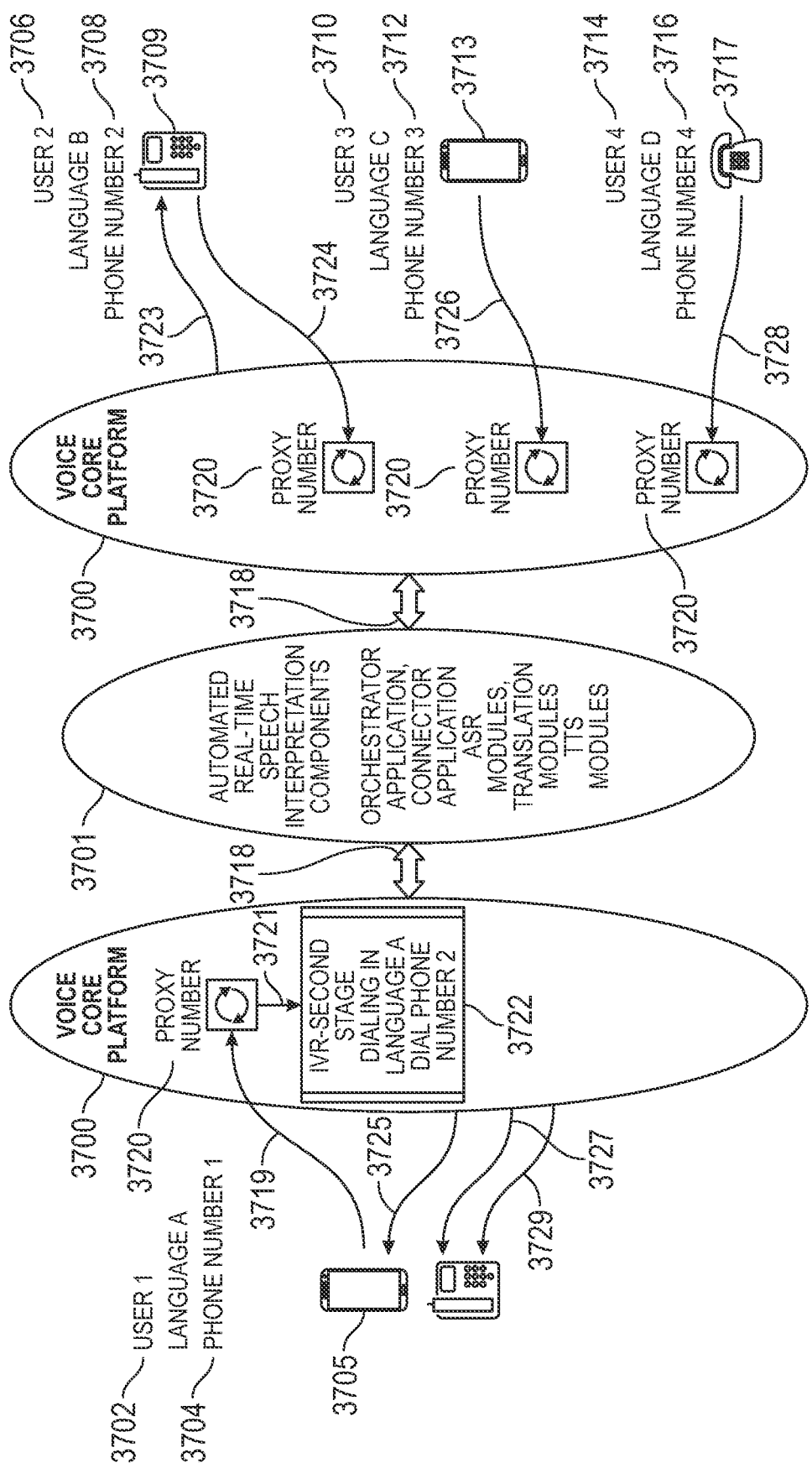
FIG. 37 is a diagram illustrating using phone numbers to place and receive calls in a conference in which language translation services are provided.

FIG. 37: Real-Time Interpretation Enabled Voice Calls—Using Phone Numbers

In FIG. 37, the same voice core platform 3700 is shown twice around the automated real-time speech components 3701 for easier understanding of the call flows and the proxy number [3720] is shown multiple times for easier understanding of the different call flows; it is the same and only one proxy number.

The voice core platform 3700 is handling calls to/from a proxy number [3720] which is dedicated to user 1 3702. The automated real-time speech components 3701 are connected [3718] to the voice platform 3700. User 1 3702 has a device whose phone number is phone number 1 3704. The user has dedicated an associated proxy phone number 3720 from the core voice platform which is different from the user's own device phone number 3704.

Using mobile phones for cellular calls, landline phones, VoIP (Voice over Internet Protocol) phones, a user can have outbound and inbound calls with real-time interpretation to/from other users speaking a different language with automatic language selection after initial setting of languages to phone numbers using an application, or an IVR (Interactive Voice Response) system.

A) User 1 Placing Calls:
User 1 3702 speaks language A, has a landline phone, a VoIP phone, or mobile phone 3705 which has "phone number 1" 3704. User 1 calls [3719] the proxy number 3720.
An IVR (Interactive Voice Response) 3722 answers the call, then User 1 3702 enters the phone number of the remote user to call—this is also known as "second-stage dialing". In this instance, phone number 2 3708 is entered. User 1 may have manually dialed digit by digit both the proxy number 3720 and "phone number 2" 3708, or it may have used a speed dial with both phone numbers.
User B is called [3723] at device 3709 and sees the proxy number 3720 as caller number. The call is established between User 1 3702 and User 2 3706 with real-time interpretation of their speech, with the option to have a TTS (Text-to-Speech) announcement to User B that the call will have real-time interpretation just after answering the call. The service knows the respective language of each user. When user 1 calls the proxy number, an IVR answers the call, then user 1 enters the remote party's phone number which also defines the remote party's language.

B) User 1 Receiving Calls:
Either User 2 3706, User 3 3710 or User 4 3714 calls User 1 3702 by dialing the proxy number 3720. The combination of the calling user's own phone number and the proxy number defines the calling user language. For example, caller phone number 3 3712 and proxy number 3720 define the caller user's language as language C. Similar situation holds true for User 2's Language B or User 4's Language D. Any user but User 1 3702 calling the proxy number 3720 will get connected to user 1.

User 1 is called, with the option to show either the proxy number 3720 or the caller's original phone number as caller number. The call is established between both users with real-time interpretation of their speech, with the option to have an announcement of caller's phone number and/or name played to User 1. The option to announce to the caller that the call will have real-time interpretation. The service knows the respective language of each user.

Selecting of languages via IVR is not shown in the diagram FIG. 37 but was previously discussed. One of the ways to allow a user to select their own language or the language of another user is via the voice prompts of an IVR application, for example as described earlier with respect to FIG. 30. In such case, the IVR may play the most relevant languages as first options by using the corresponding user's phone number, application language, or registration country. For example, is the user has a US phone number, English and Spanish could be the first selectable language options in the IVR voice prompts. If the user has a Canadian phone number, English and French could be the first options in the IVR voice prompts, FIG. 38: Real-Time Interpretation Enabled Voice or Video Calls—Native Mobile, Web, and Desktop Applications In FIG. 38, the voice core or video core platform and the messaging platform is referred to as a combined "platform" 3800 and is shown twice around the automated real-time speech components [3824] for easier understanding of the call flows. A few proxies [3826] [3827] [3828] are shown multiple times in the diagram for easier understanding of the different call flows; they are the same proxy for the same proxy type.

The platform 3800 is handling calls to/from different types of audio only or video calling devices, different types of applications, and different communication protocols. The automated real-time speech components 3824 are connected [3841] to the platform 3800.

User 1 3801 speaking Language A has a device 3803 running an application which can support either or a combination of:
Phone number as phone number 1 3804,
Social app user ID 1 3805, examples of social user ID are Viber number, Whatsapp number, Facebook ID,
SIP user name 3806, when using SIP phones, SIP applications such as softphones,
Login profile 1 3807, application defined, when for example using a WebRTC based native mobile application, web application, or desktop application.

Figure 38:
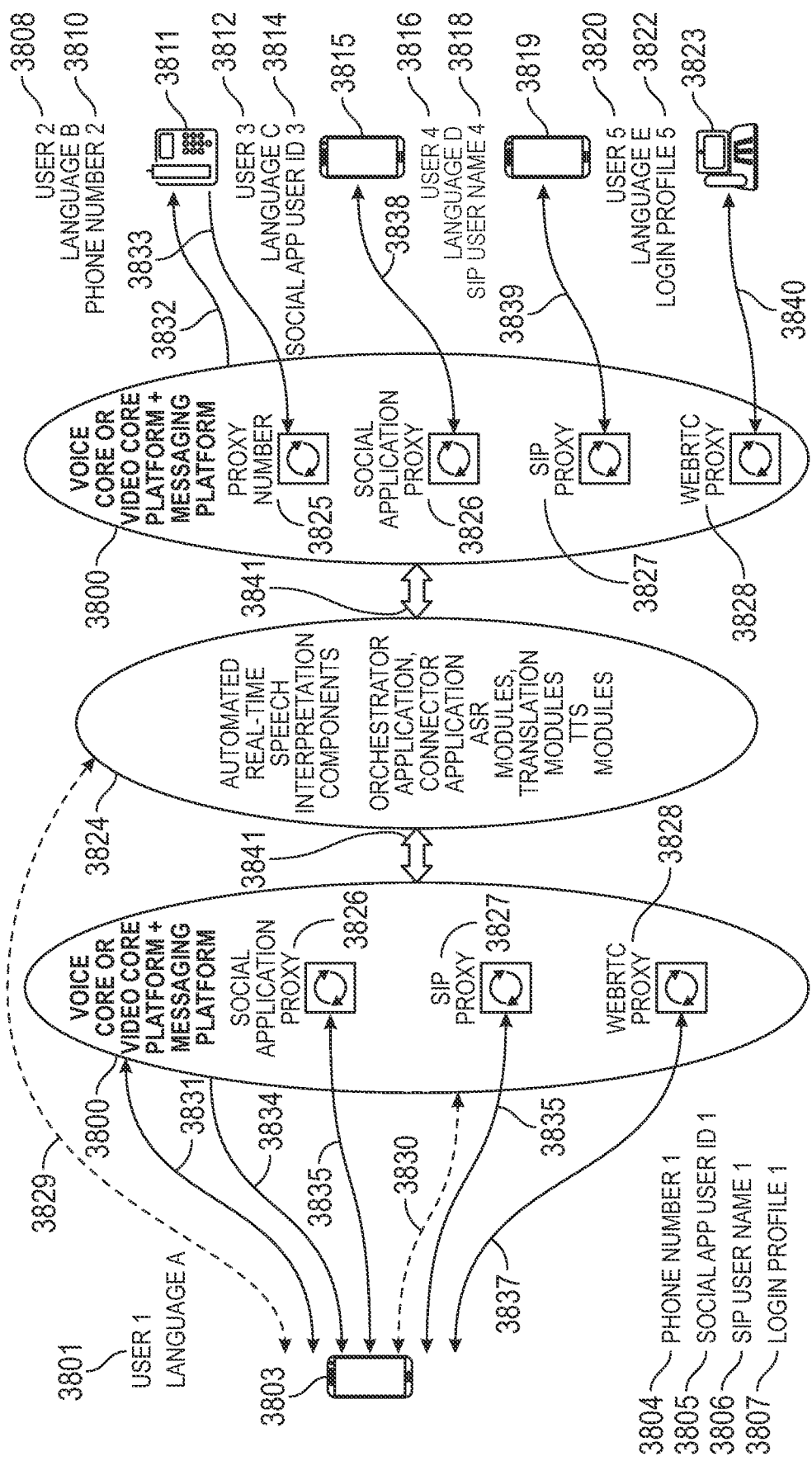
FIG. 38 is a diagram illustrating the use of different types of devices and applications in a conference in which language translation services for voice and messaging are provided.

Users 2, 3, 4 & 5 have similar, respective devices, phone numbers, social app user id's, SIP user names and login profiles as enumerated in FIG. 38.

The application running on User 1's device 3803 has direct programmatic interaction with the platform 3800 and/or the automated speech components [3824]. For that reason when User 1 needs to call another user's phone number, it does not need to call a proxy number nor do a second stage dialing, from the application it just calls user 2 phone number 3829, 3831, 3832.

User 2 calls the proxy number 3825 to reach user 1.

All users, including User 1, may each use different types of applications, different user identifiers, different communication protocols, and be able to establish audio-only or video communications with real-time interpreting of their speech. For example, user 1 3801 may place an outbound call to a phone number on the platform 3800 or is called by the platform 3800 to its device phone number 3804, and establish a call with user 3 3812 which get called on its Viber social application running on the device 3815, with real-time interpreting of their speech Language C. Devices may have video between them.

The following capabilities are not explicitly shown on the diagram:
- Devices may send and receive text messaging which get translated before getting forwarded to the intended recipient,
- Text messaging may be played as translated or non translated TTS to the intended recipients
- Speech may be transcribed and sent as translated or non translated text messaging to the intended recipients.
- Text messaging with or without translations may be exchanged between different types of applications, including SMS, MMS, social chat applications, within dedicated applications with messaging, WebRTC applications.

Figure 39:
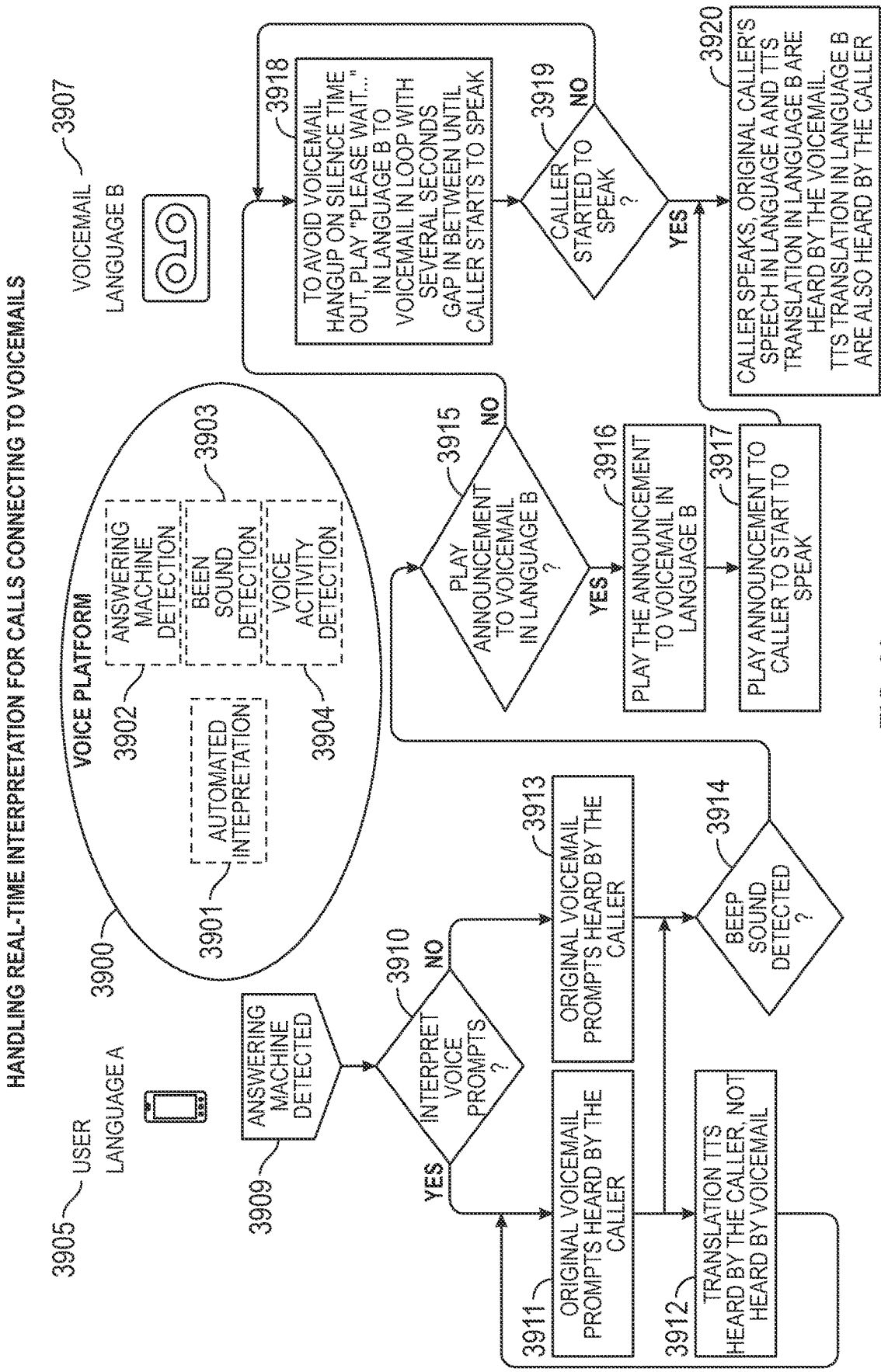
FIG. 39 is a diagram illustrating the signal flow of a call connected to a voicemail in which language translation services are provided.

FIG. 39: Handling Real-Time Interpretation for Calls Connecting to Voicemails For this embodiment, the automated speech interpretation modules 3901, the answering machine detection module 3902, the voicemail beep sound detection module 3903, and voice activity detection module 3904 are grouped under the voice platform 3900.

A user 3905 speaking language A calls a phone number which gets answered by a voicemail 3907 in language B. The answering machine detection module's 3902 function is to detect that a call is connected to a voicemail.

The processing is as shown in the flow chart on the diagram in FIG. 39 as Steps 3909-3920.
- Additional functional details from step 3913:
- Do not translate voicemail voice prompts
- Voicemail voice prompts are not interpreted, they are heard by the caller as they are,
- Caller may speak and speech is not interpreted,
- Caller may interact with the voicemail via DTMFs and voice,
- Before beep sound is detected, what the user says is not interpreted and heard as is by the voicemail,
- Once beep sound is detected, what the user says gets interpreted, the caller's original speech and translation TTS (Text-to-Speech) is heard and recorded by the voicemail.
- Additional functional details from step 3911:
- Translate voicemail voice prompts
- Original voicemail voice prompts are played and heard by the caller but at a lower audio volume
- Voicemail voice prompts are interpreted, corresponding translation TTS are played and heard by the caller at normal audio volume, they are not played to the voicemail, they are not heard by the voicemail,
- Once beep sound is detected, what the user says gets interpreted, the caller's original speech and translation TTS is heard and recorded by the voicemail.

FIG. 40: Handling Real-Time Interpretation for Voice and Video Calls Connecting with Voice Assistants In this embodiment, implementation of functionality to allow a user 4002 to interact with a voice service 4006 by speaking a different language (depicted as Language A) than the one natively supported by the voice service (depicted as Language B) is described. Self-help voice services, virtual assistants, virtual receptionists, voice bots, video calls and any other voice-based services are referred to as "voice services" and the person connected to a voice service is a "user".

A user 4002 establishes a voice or video call to the voice service 4006 via the voice or video platform 4004 or the voice service 4006 establishes a voice or video call to the user 4002. Original voice prompts from the voice service 4006 are played and heard by the caller at normal audio volume or optionally at a lower audio volume.

All voice prompts from the voice services are interpreted in real-time, the corresponding translation TTS:
- Are played to the user at normal audio volume,
- Are heard by the user at normal audio volume,
- Are not played to the voice services,
- Are not heard by the voice services,
- May be interrupted by the user by starting speaking, this is also known as "barge-in" (see FIG. 27).

The user's original speech:
- Is not played to the voice services,
- Is not heard by the voice services.

The user's translation TTS (*):
- Is played to the voice services,
- Is heard by the voice services.

Key presses (DTMF: Dual Tone Multi-Frequency) from the user are transmitted to the voice services, which may be used to interact with the voice services besides translation TTS.

FIG. 41: Handling Real-Time Interpreting for Calls Connecting with Call Centers, Contact Centers In this section, a call center or a contact center is referred to as "contact center." The person connected to a contact center is referred to as a "user" and the person on the contact center side is referred to as an "agent".

A user 4102 establishes a voice or video call to the contact center 4106 via the voice or video platform 4104 or the contact center 4106 establishes a voice or video call to the user 4102.

A) Without Deep Integration

Implementation of the real-time interpreting system with a contact center 4106 by allowing a user 4102 to speak a different language (Language A) than the one natively supported by the contact center's IVR (Interactive Voice Response) system as well as the agent's language which may be different too is described.

Original IVR prompts from the contact center are played and heard by the caller at normal audio volume or optionally at a lower audio volume. All voice prompts from the contact center IVR are interpreted in real-time, and the corresponding translation TTS:

Are played to the user at normal audio volume,
Are not played to the contact center
May be interrupted by the user by starting speaking, this is also known as "barge-in" (see FIG. 27).
While the user is still interacting with the call center IVR, i.e. before the call is transferred to a live agent, the user's original speech:
Is not played to the contact center,
Is not heard by the contact center.
The user's translation TTS (*) sentences:
Are played to the user.
Are played the contact center.
Key presses (DTMF: Dual Tone Multi-Frequency) from the user are transmitted to the contact center, which may be used to interact with the voice services besides translation TTS.

The real-time translation system is set up to recognize when a call is transferred to a live agent and to know the agent's spoken language. This is done by recognizing phrases played by the contact center IVR and/or key presses (DTMF) sent by the user to the contact center. Once the call is connected to a live agent, the real-time interpreting may switch to a new language pair between the user and the live agent which may be different from the user and IVR language pair.

B) With Different Levels of Integration

In the context of this section, a user profile stores their phone number, social chat ID, SIP user name, or login ID to distinguish them from different users. A user establishes a voice or video call to the contact center, or the contact center establishes a voice or video call to the user. Implementation of the real-time interpreting system and a contact center with a deeper level of integration to allow a user to have a better experience than the one described in previous section while speaking a different language than the one natively supported by the contact center's IVR (Interactive Voice Response) system as well as the agent's language which may be different too is described. Depending on the level of integration, some or all of the capabilities listed as follows will be supported and available.

A deeper level of integration means the contact center and this real-time interpreting system have additional channels and programmatic means to exchange operational information, to issue commands, to issue responses, to issue event notifications, which are in addition to the base channels of audio/video media, and channels for corresponding call control protocols.

Original IVR prompts from the contact center are not heard by the caller. All voice prompts from the contact center IVR are interpreted in real-time, and the corresponding translation TTS sentences:
Are played to the user,
Are not played to the contact center
May be interrupted by the user by starting speaking, this is also known as "barge-in"
While the user is still interacting with the call center IVR, i.e. before the call is transferred to a live agent, the user's original speech:
Is not played to the contact center.
The user's translation TTS (*) sentences:
Are played the contact center.
Key presses (DTMF: Dual Tone Multi-Frequency) from the user are transmitted to the contact center, which may be used to interact with the voice services besides translation TTS.

When a call is transferred to a live agent, the real-time interpreting may switch to a new language pair between the user and the live agent which may be different from the user and IVR language pair. From one call to the next, a different live agent may be interacting with the user, thus the corresponding language pair may be different and is automatically set.

On the first call, the user may need to indicate their language with a spoken word, with a key press (DTMF), or preset with the user's profile. Then on subsequent calls, the user no longer has to specify their language as the real-time interpreting system or the contact center has stored the information using the user's profile.

The user's profile may indicate that the user knows multiple languages which will decide if a call needs interpreting on subsequent calls as the agent's language may be one that the user knows.

Figure 42:
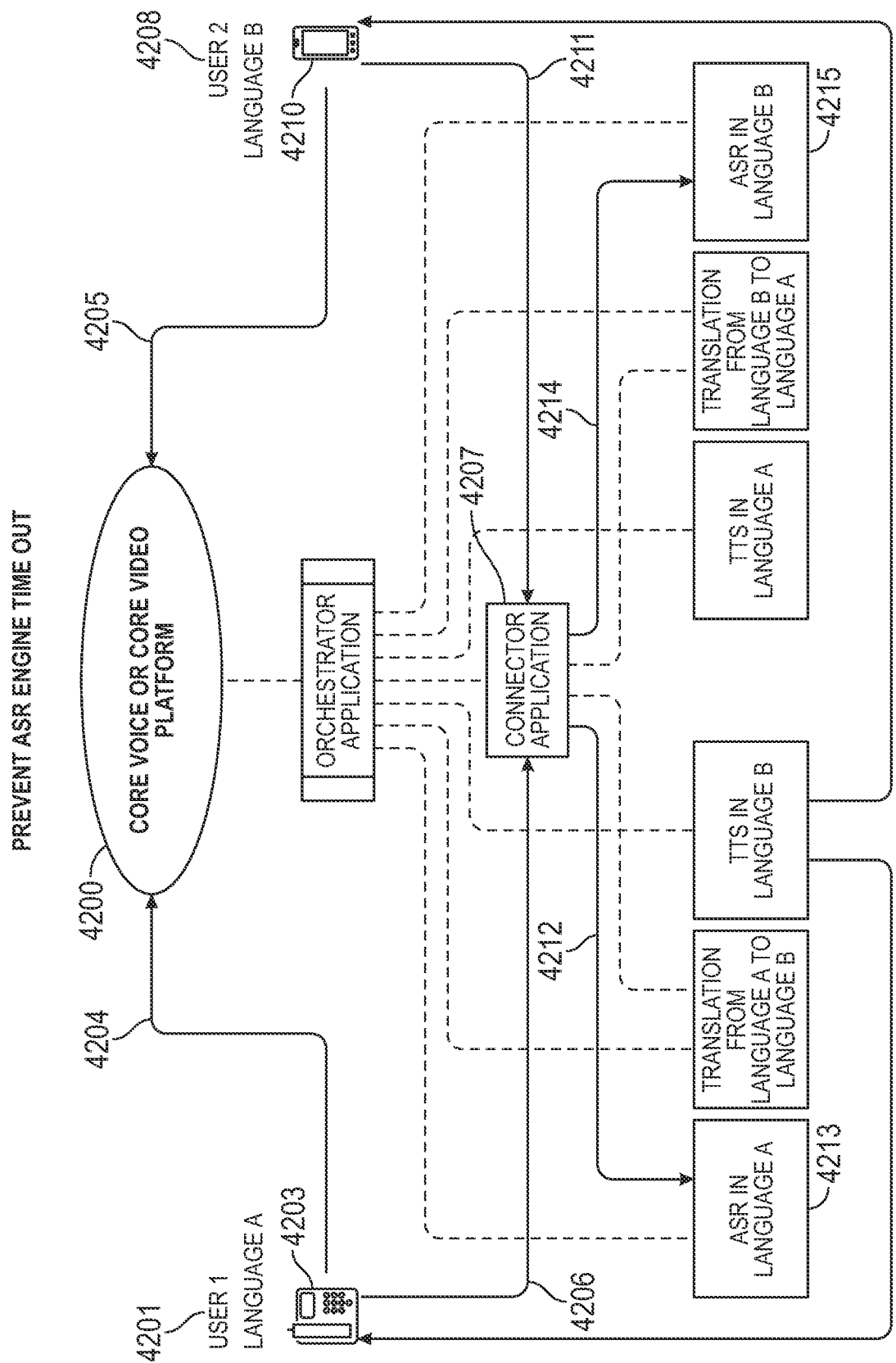
FIG. 42 is a diagram illustrating the handling of some automatic speech recognition on long periods of silence to avoid time out.

FIG. 42: ASR Engine Idle Timeout

Some ASR engines/modules time out after a period of no sound or voice detected. The connector application 4207 would need to regularly send [4212] [4214] non-silence audio payload instead of silence audio payload to keep the timer from expiring otherwise the ASR engine/module 4213, 4215 may stop transcribing. These non-silence audio payloads, with adequate dummy audio payload would not generate any or false transcription but prevents the ASR engines/modules from timing out.

Figure 43:
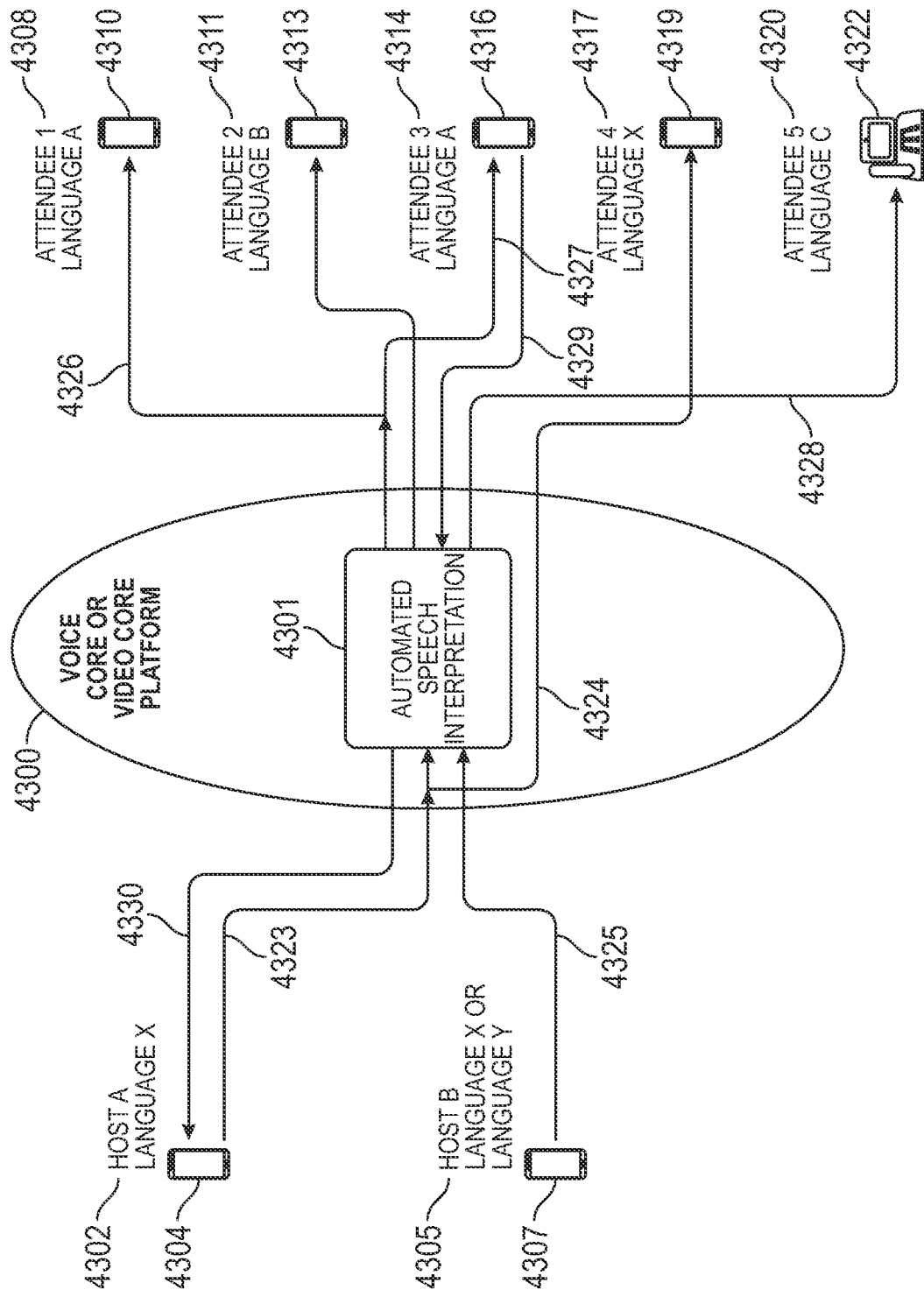
FIG. 43 is a diagram illustrating the signal flow for one or a few hosts with many attendees in which language translation services are provided.

FIG. 43: Interactivity Between One or a Few Hosts with Many Attendees

In this embodiment, real time interpretation in accordance with the disclosed technology between one or more hosts to many attendees is described. FIG. 43 depicts the various participants Languages and intervening platform to realize the desired results as follows:

A host speaks to many attendees. There could be more than one host and those hosts may speak the same or different languages. When a host speaks, the host's speech is automatically interpreted to each of the attendees' respective languages.

If multiple hosts speak at the same time, their respective translation TTS will never overlap but played one after another for a given destination language.

An attendee just listens to hosts. A host speech is interpreted or not to the attendee depending on whether the attendee speaks the same language.

Each attendee has the option to hear the host's original speech at normal or reduced audio volume, or not at all.

An attendee can ask to speak to the hosts by figuratively "raising their hand" through a web application or a native mobile application. A host will allow the attendee to speak, the attendee's reply speech is normally interpreted to the hosts. If multiple attendees "raise their hands", their requests will be automatically queued or selected out of sequential order by the hosts or moderators to allow them to speak.

In addition to voice or video+voice channels, instead of speaking to their device, the attendees may also send text messages that are forwarded to the hosts as translated text or as interpreted voice via TTS (Text-to-Speech). The hosts see the text requests or hear the translation TTS, then reply by speaking which in turn get their speech interpreted to all attendees A host may also send text messaging which will get translated to each attendee's language or played as translated TTS to each attendee. SSML (Speech Synthesis Markup Language) processing may be needed for translations TTS playback so they never fall behind if a host speaks very fast. All attendees and all hosts may see captions of speech transcripts, translation texts.

The described interactions in this section are for example used in amusement parks visits, trade shows conferences, tourist tours, real estate visits, in person or virtually, and other use cases.

Figure 44:
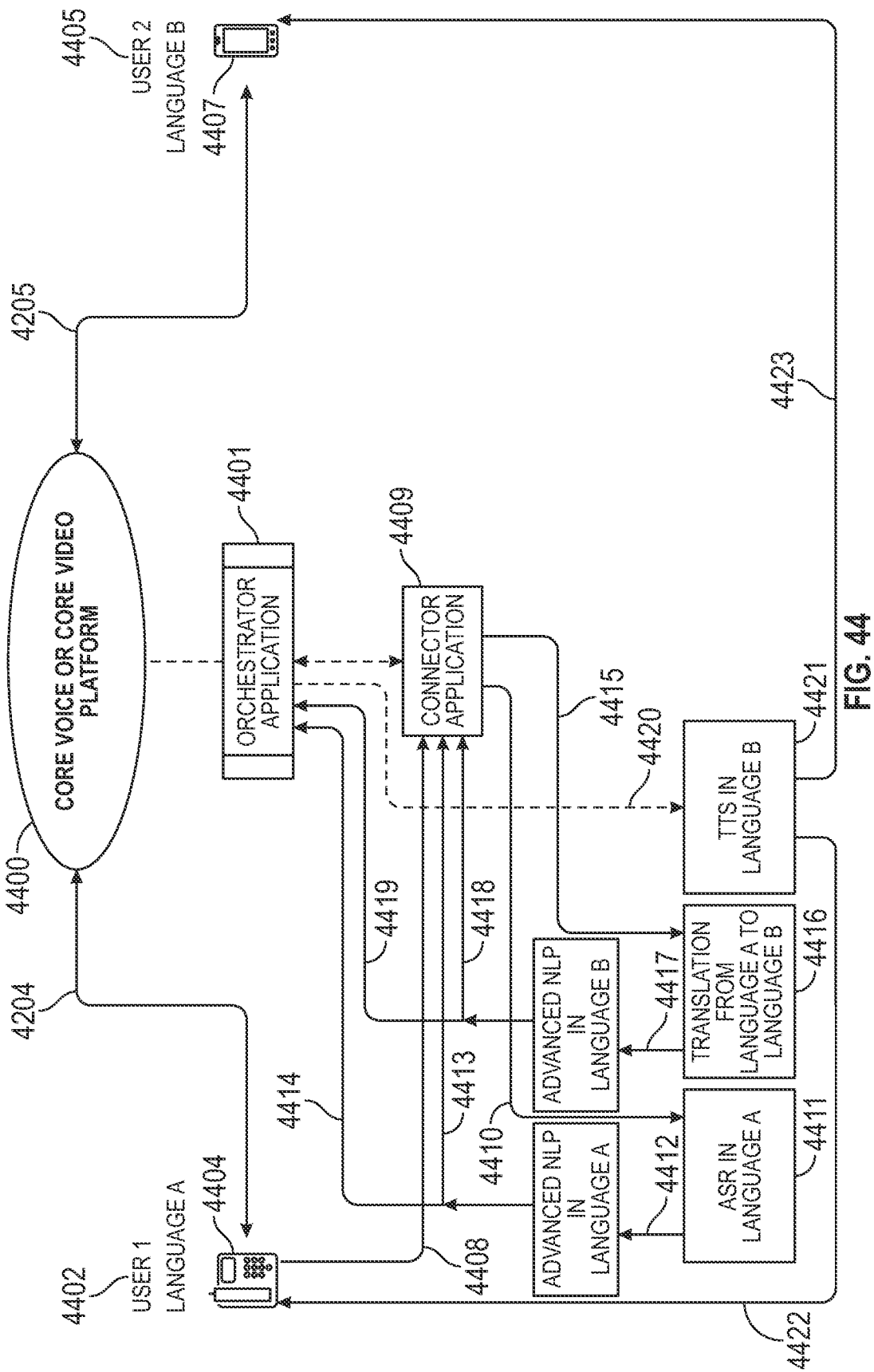
FIG. 44 is a diagram illustrating the steps for improving real-time speech interpreting accuracy.

FIG. 44: Improving Interpretation Accuracy

Real-time interpretation accuracy can be improved in accordance with the disclosed technology invention as depicted in FIG. 44. Media and signal paths are similar to those described earlier with detail of the improved design described below. The results depend on:

- The accuracy of ASR (Automatic Speech Recognition), resulting sentences, words spelling, punctuation, correct common and proper nouns spelling, for a given language locale.
- The accuracy of translation in terms of target language text or a given source language locale and target language pair.

In the goal of improving even further the translation accuracy:

- The ASR engine needs to have a flexible and efficient way to allow the addition of custom vocabulary for words known to be often incorrectly transcribed, domain/field technical terms, proper nouns, brand names, product names (not shown in the diagram).
- The translation engine needs to have a flexible and efficient way to allow the addition of custom vocabulary for words known to be often incorrectly translated, domain/field technical terms, proper nouns, brand names, product names, language expressions, false cognates, idiomatic expressions (not shown in the diagram).
- The output from an ASR module 4411 may be fed first into an advanced NLP (Natural Language Processing) module 4412 for better grammar and language expression, before feeding to the translation engine 4416. For example, the ASR module may return the transcript "What did you found?". Instead of directly feeding that sentence to the translation engine, the advanced NLP intermediate engine would generate "What did you find?" before feeding the content into the translation engine.
- Or the translation module may be limited or produce average translation accuracy for a given source language locale and target language pair, here the output from the translation engine may be fed again to another advanced NLP module, which in turn will feed its output to the TTS (Text-to-Speech) module 4421.
- When authorized by users and when compliant with local laws, allow us provider of the real-time interpreting solution to grade the accuracy of ASR, NLP and translations modules depending on the source and target language pairs by looking at past logs of transcripts and translation texts to grade and select over time the better modules in terms of accuracy, speed, and cost (not shown in the diagram).

The disclosed technology may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module" or "unit." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 45:
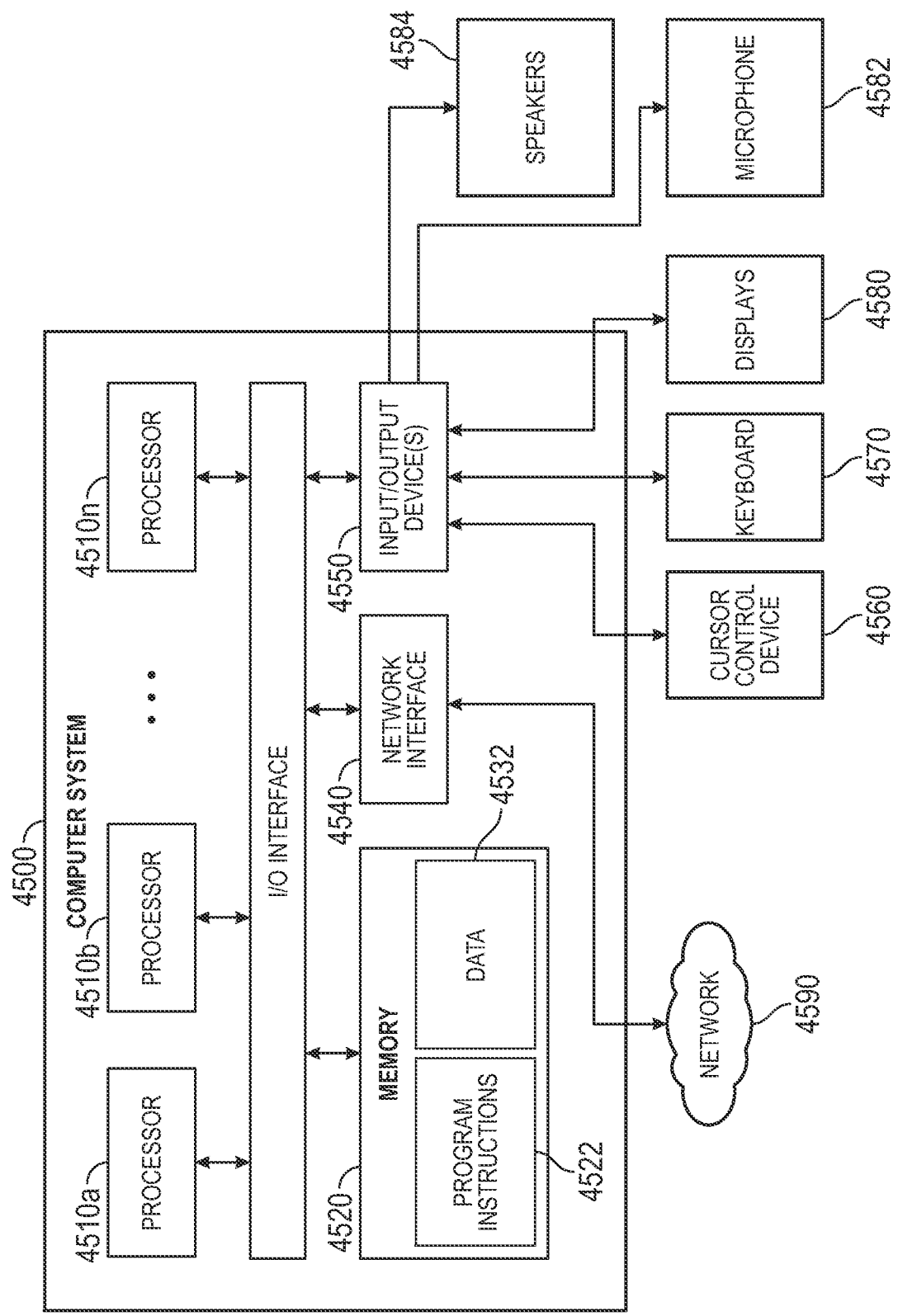
FIG. 45 is a block diagram of a computer system that can embody or be used to practice the invention.

FIG. 45 depicts a computer system 4500 that can be utilized in various embodiments of the present invention to implement the invention according to one or more embodiments. The various embodiments as described herein may be executed on one or more computer systems, which may interact with various other devices. One such computer system is the computer system 4500 illustrated in FIG. 45. The computer system 4500 may be configured to implement the methods described above. The computer system 4500 may be used to implement any other system, device, element, functionality or method of the above-described embodiments. In the illustrated embodiments, the computer system 4500 may be configured to implement the disclosed methods as processor-executable executable program instructions 4522 (e.g., program instructions executable by processor(s) 4510) in various embodiments.

In the illustrated embodiment, computer system 4500 includes one or more processors 4510a-4510n coupled to a system memory 4520 via an input/output (I/O) interface 4530. Computer system 4500 further includes a network interface 4540 coupled to I/O interface 4530, and one or more input/output devices 4550, such as cursor control device 4560, keyboard 4570, display(s) 4580, microphone 4582 and speakers 4584. In various embodiments, any of the components may be utilized by the system to receive user input described above. In various embodiments, a user interface may be generated and displayed on display 4580. In some cases, it is contemplated that embodiments may be implemented using a single instance of computer system 4500, while in other embodiments multiple such systems, or multiple nodes making up computer system 4500, may be configured to host different portions or instances of various embodiments. For example, in one embodiment some elements may be implemented via one or more nodes of computer system 4500 that are distinct from those nodes implementing other elements. In another example, multiple nodes may implement computer system 4500 in a distributed manner.

In different embodiments, the computer system 4500 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 4500 may be a uniprocessor system including one processor 4510, or a multiprocessor system including several processors 4510 (e.g., two, four, eight, or another suitable number). Processors 4510 may be any suitable processor capable of executing instructions. For example, in various embodiments processors 4510 may be general-purpose or embedded processors implementing any of a variety of instruction set architectures (ISAs). In multiprocessor systems, each of processors 4510 may commonly, but not necessarily, implement the same ISA.

System memory 4520 may be configured to store program instructions 4522 and/or data 4532 accessible by processor 4510. In various embodiments, system memory 4520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 4520. In other embodiments, program instructions and/or data may be received, sent or stored upon different types of computer-accessible media or on similar media separate from system memory 4520 or computer system 4500.

In one embodiment, I/O interface 4530 may be configured to coordinate I/O traffic between processor 4510, system memory 4520, and any peripheral devices in the device, including network interface 4540 or other peripheral interfaces, such as input/output devices 4550. In some embodiments, I/O interface 4530 may perform any necessary protocol, timing or other data transformations to convert data signals from one component (e.g., system memory 4520) into a format suitable for use by another component (e.g., processor 4510). In some embodiments, I/O interface 4530 may include support for devices attached through various types of peripheral buses, such as a variant of the Peripheral Component Interconnect (PCI) bus standard or the Universal Serial Bus (USB) standard, for example. In some embodiments, the function of I/O interface 4530 may be split into two or more separate components, such as a north bridge and a south bridge, for example. Also, in some embodiments some or all of the functionality of I/O interface 4530, such as an interface to system memory 4520, may be incorporated directly into processor 4510.

Network interface 4540 may be configured to allow data to be exchanged between computer system 4500 and other devices attached to a network (e.g., network 4590), such as one or more external systems or between nodes of computer system 4500. In various embodiments, network 4590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 4540 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 4550 may, in some embodiments, include one or more display terminals, keyboards, keypads, touchpads, scanning devices, voice or optical recognition devices, or any other devices suitable for entering or accessing data by one or more computer systems 4500. Multiple input/output devices 4550 may be present in computer system 4500 or may be distributed on various nodes of computer system 4500. In some embodiments, similar input/output devices may be separate from computer system 4500 and may interact with one or more nodes of computer system 4500 through a wired or wireless connection, such as over network interface 4540.

In some embodiments, the illustrated computer system may implement any of the operations and methods described above.

Those skilled in the art will appreciate that the computer system 4500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 4500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 4500 may be transmitted to computer system 4500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for providing real-time language interpretation in an audio or video communication session, comprising:
    a communications platform for connecting first and second parties in an audio or video communication session, wherein the communications platform receives spoken audio input in a first language from the first party and spoken audio input from the second party;
    a transcription module operatively connected to the communications platform that is configured to generate separate transcriptions of the spoken audio input provided by the first and second parties;
    a translation module operatively connected to the transcription module and configured to receive a transcription of the first party's spoken audio input from the transcription module and to create a translated transcription of the first party's spoken audio input in a second language; and
    a text-to-speech module operatively connected to the translation module that is configured to generate a spoken audio version of the first party's translated transcription in the second language;
    wherein the communications platform is configured to provide to the second party, at approximately the same time, both the first party's spoken audio input in the first language and the spoken audio version of the first party's translated transcription in the second language; and
    wherein when the second party begins to provide spoken audio input while the communication platform is still providing the first party's translated transcription in the second language to the second party, the communication platform stops providing the first party's translated transcription in the second language to the second party.

2. The system of claim 1 further comprising a captioning unit that receives the transcriptions of the spoken audio input provided by the first and second parties and the translated transcription of the first party's spoken audio input and that adapts the transcriptions for closed captioned display on one or more devices.

3. The system of claim 1 wherein the spoken audio input of the first party is provided to the transcription module via a first WebSocket session, and wherein the spoken audio input of the second party is provided to the transcription module via a second WebSocket session.

4. The system of claim 1, wherein the spoken audio input received from the second party is in the second language, wherein the translation module is also configured to receive a transcription of the second party's spoken audio input and to create a translated transcription of the second party's spoken audio input in the first language, wherein the text-to-speech module is also configured to generate a spoken audio version of the second party's translated transcription in the first language, and wherein the communication platform provides to the first party, at approximately the same time, both the second party's spoken audio input in the second language and the spoken audio version of the second party's translated transcription in the first language.

5. The system of claim 1, wherein the communications platform provides the first party's spoken audio input in the first language to the second party at a first volume level and provides the spoken audio version of the first party's translated transcription in the second language to the second party at a second volume level that is higher than the first volume level.

6. The system of claim 1, wherein the communications platform causes a notification tone to be provided to the first party during a period between when the first party stops providing spoken audio input and when the provision of the first party's translated transcription in the second language to the second party ends.

7. The system of claim 1, wherein the communications platform receives spoken audio input from a third party in the first language, wherein the translation module is also configured to receive a transcription of the third party's spoken audio input and to create a translated transcription of the third party's spoken audio input, and wherein the translation module is also configured to create a translated transcription of the third party's spoken audio input, wherein the text-to-speech module is also configured to generate a spoken audio version of the third party's translated transcription in the second language, wherein the spoken audio version of the first party's translated transcription is rendered in a first voice, and wherein the spoken audio version of the third party's translated transcription is rendered in a second voice that is different from the first voice.

8. The system of claim 7, wherein the communications platform also provides the spoken audio version of the third party's translated transcription to the second party.

9. A method of connecting multiple participants to an audio or video communication session and of providing selected translations to the session participants, comprising:

receiving, from a first communication device, first spoken audio input in a first language provided by a first participant;

receiving, from a second communication device, second spoken audio input in a second language provided by a second participant;

obtaining a first transcription of the first spoken audio input;

obtaining a first translated transcription of the first spoken audio input that is in a second language;

obtaining a spoken audio version of the first translated transcription in the second language;

causing the second communications device to play, at approximately the same time, both the first spoken audio input and the spoken audio version of the first translated transcription;

receiving, from the second communication device, third spoken audio input provided by the second participant while the second communications device is playing the spoken audio version of the first translated transcription; and causing play of the spoken audio version of the first translated transcription by the second communication device to end when receipt of the third spoken audio input begins.

10. The method of claim 9, wherein the sending step comprises causing the first spoken audio input to be played by the second communication device at a first volume and causing the first spoken audio version of the first translated transcription to be played by the second communication device at a second volume that is higher than the first volume.

11. The method of claim 9, further comprising causing a notification tone to be played by the first communication device between the time that receipt of the first spoken audio input ends and the time that playback of the spoken audio version of the first translated transcription ends.

12. The method of claim 9, further comprising:
obtaining a second transcription of the second spoken audio input;
obtaining a second translated transcription of the second spoken audio input that is in the first language;
obtaining a spoken audio version of the second translated transcription in the first language; and
causing the first communications device to play, at approximately the same time, both the second spoken audio input and the spoken audio version of the second translated transcription.

13. The method of claim 12, further comprising:
sending the first translated transcription to the second communication device for display to the second participant; and
sending the second translated transcription to the first communication device for display to the first participant.

14. The method of claim 9, further comprising:
receiving, from the first communication device, third spoken audio input in the first language provided by a third participant;
obtaining a second transcription of the third spoken audio input;
obtaining a second translated transcription of the third spoken audio input that is in the second language;
obtaining a spoken audio version of the second translated transcription in the second language, wherein the spoken audio version of the first translated transcription is rendered in a first voice, and wherein the spoken audio version of the second translated transcription is rendered in a second voice that is different from the first voice; and causing the second communications device to play, at approximately the same time, both the third spoken audio input and the spoken audio version of the second translated transcription.

15. The method of claim 14, wherein receiving from the first communication device the first spoken audio input provided by the first participant and the third spoken audio input provided by the third participant comprises receiving a single stream of audio data from the first communication device, and wherein obtaining a first transcription of the first spoken audio input and obtaining a second transcription of the third spoken audio input comprises causing voice recognition techniques to be employed to analyze the received single stream of audio data to separate the first spoken audio input from the third spoken audio input.

16. The method of claim 9, further comprising:
receiving, from a third communication device, third spoken audio input in the first language provided by a third participant;
obtaining a second transcription of the third spoken audio input;
obtaining a second translated transcription of the third spoken audio input that is in the second language;
obtaining a spoken audio version of the second translated transcription in the second language, wherein the spoken audio version of the first translated transcription is rendered in a first voice, and wherein the spoken audio version of the second translated transcription is rendered in a second voice that is different from the first voice; and
causing the second communications device to play, at approximately the same time, both the third spoken audio input and the spoken audio version of the second translated transcription.

17. The method of claim 16, further comprising causing a notification tone to be played by the first communication device and the third communication device between the time that receipt of the third spoken audio input ends and the time that playback of the spoken audio version of the second translated transcription ends.

18. A non-transitory computer-readable medium containing a set of instructions that, when performed by one or more processors, cause the one or more processors to perform a method of connecting multiple participants to an audio or video communication session and of providing selected translations to the session participants, the method comprising:
receiving, from a first communication device, first spoken audio input in a first language provided by a first participant;
receiving, from a second communication device, second spoken audio input in a second language provided by a second participant;
obtaining a first transcription of the first spoken audio input;
obtaining a first translated transcription of the first spoken audio input that is in a second language;
obtaining a spoken audio version of the first translated transcription in the second language;
causing the second communications device to play, at approximately the same time, both the first spoken audio input and the spoken audio version of the first translated transcription receiving, from the second communication device, third spoken audio input provided by the second participant while the second communications device is playing the spoken audio version of the first translated transcription, and causing play of the spoken audio version of the first translated transcription by the second communication device to end when receipt of the third spoken audio input begins.

\* \* \* \* \*